(12) United States Patent
Sawaguchi

(10) Patent No.: US 7,345,017 B2
(45) Date of Patent: Mar. 18, 2008

(54) FUNCTIONAL SUBSTANCES DERIVED FROM OLIGOOLEFINS HAVING FUNCTIONAL GROUPS AT THE ENDS

(75) Inventor: Takashi Sawaguchi, Yokohama (JP)

(73) Assignee: San-El Kougyou Corporation, Misato-Shi (JP)

( * ) Notice: Subject to any disclaimer, the term of this patent is extended or adjusted under 35 U.S.C. 154(b) by 0 days.

(21) Appl. No.: 11/654,751

(22) Filed: Jan. 18, 2007

(65) Prior Publication Data

US 2007/0117738 A1 May 24, 2007

Related U.S. Application Data

(60) Continuation of application No. 11/440,900, filed on May 25, 2006, now Pat. No. 7,229,957, which is a division of application No. 10/416,615, filed on May 13, 2003, now Pat. No. 7,125,834.

(30) Foreign Application Priority Data

| Nov. 24, 2000 | (JP) | 2000-358224 |
| Nov. 24, 2000 | (JP) | 2000-358225 |
| Nov. 24, 2000 | (JP) | 2000-358226 |
| Nov. 24, 2000 | (JP) | 2000-358227 |
| Oct. 30, 2001 | (JP) | 2001-331937 |
| Nov. 6, 2001 | (JP) | 2001-340118 |
| Nov. 8, 2001 | (JP) | 2001-343123 |
| Nov. 22, 2001 | (WO) | PCT/JP01/10244 |

(51) Int. Cl.
  *C11D 3/37* (2006.01)
  *C07C 2/02* (2006.01)
  *C08F 10/04* (2006.01)
  *C08F 110/08* (2006.01)

(52) U.S. Cl. .................. 510/475; 585/10; 585/506; 585/510; 526/348.6

(58) Field of Classification Search ............... 510/475; 585/10, 506, 510; 526/348.6
See application file for complete search history.

(56) References Cited

U.S. PATENT DOCUMENTS 5,191,044 A * 3/1993 Rath et al. .................. 526/212

\* cited by examiner

*Primary Examiner*—Brian Mruk
(74) *Attorney, Agent, or Firm*—Ohlandt, Greeley, Ruggiero & Perle, L.L.P

(57) ABSTRACT

An amphiphilic functional substance with lipophilicity, affinity for supercritical $CO_2$, and if necessary hydrophilicity comprising an oligoolefin chain and a perfluoroalkyl group(s) at a single end thereof or at both ends thereof with or without the intervention of a poly(oxyalkylene) chain, which enables the utilization of supercritical $CO_2$ as a reaction medium; a photopolymerizable functional substance comprising an oligoolefin chain and a reversible photopolymerization/dissociation group(s) at a single end thereof or at both ends thereof and a functional substance comprising a photo- and/or thermodissociable polymer obtained by photopolymerization of the aforementioned photopolymerizable functional substance, which can be utilized as recycle polymers; a hydrolyzable functional substance comprising a polymer obtained by chain-elongating plural oligoolefin chains through ester linkages, which can be utilized as a recycle polymer; and a functional substance capable of forming a microphase separation structure comprising a polymaleimide comprising an oligoolefin chain and a polydimethylsiloxane chain which are bonded to form an imide linkage, which can be utilized as a functional product such as an electronic material. There is also provided novel oligo(1-butene) containing a terminal vinylidene group, which is useful as a raw material in producing the group of functional substances described above.

1 Claim, 35 Drawing Sheets

*Fig.* 4

FUNCTIONAL SUBSTANCES DERIVED FROM OLIGOOLEFINS HAVING FUNCTIONAL GROUPS AT THE ENDS

CROSS-REFERENCED APPLICATIONS

This application claims priority from and is a Continuation of U.S. patent application Ser. No. 11/440,900, filed on May 25, 2006 now U.S. Pat. No. 7,229,957, which is a Divisional of U.S. patent application Ser. No. 10/416,615, Filed May 13, 2003 now U.S. Pat. No. 7,125,834, all of which are incorporated herein in their entirety.

BACKGROUND OF THE DISCLOSURE

1. Technical Field

The present disclosure relates to novel functional substances. More particularly, it relates to novel substances comprising as segments thereof, oligoolefin chains derived from oligoolefins containing terminal vinylidene double bonds obtained from the highly controlled thermal decomposition of polyolefins, the substance exhibiting various functionalities.

2. Background Art

In Japanese Unexamined Patent Publication SHO 55-084302 (JP 55-084302 A), the present inventors proposed a process for producing α·ω-diene-oligomers by the thermal decomposition of polymer materials including poly (α-olefins); and they also reported in Macromolecules, 28, 7973 (1995) and others that the highly controlled thermal decomposition of polyolefins produced monodispersed oligoolefins containing vinylidene double bonds at their both ends or at their single ends. At that time it was only demonstrated that the thermal decomposition of isotactic polypropylenes produced propylene oligomers containing terminal double bonds. Even thereafter it has only been reported that the thermal decomposition of polyisobutylenes produced oligoisobutylenes containing terminal double bonds (Polymer, 37, 3697 (1996)).

1-Butene is produced as a by-product in the manufacture of isobutylene or butadiene. On the other hand, poly(1-butene), which is a polymeric form of 1-butene, is produced in very small quantities due to its limited utilities, because it displays characteristics different from those of polyisobutylene or those of polybutadiene or polypropylene of which the carbon number of the monomer unit is one less. Reactivity with other monomers or polymers is imparted to poly(1-butene) by introducing to its terminus, a functional group such as a double bond, a hydroxyl group or a carboxyl group. It can thus be expected that novel utilities of poly(1-butene) will be developed based on its characteristics. However, it is extremely difficult to introduce a functional group to the specific position of a polymer chain by utilizing polymer reaction.

Although it is unexpectedly difficult to polymerize between the above-mentioned oligoolefins at their terminal vinylidene double bonds and to make them gain higher molecular weights, the terminal vinylidene double bonds can further be modified into functional groups by hydroxylation or maleic acid modification (Annual Meeting of Polymer Society, Abstracts, 47, (7), 1255 (1998)). It is expected that novel substances with various functionalities can be created from the oligoolefins containing such terminal functional groups by utilizing their reactivity.

Once the substances having various functionalities have been developed, waste polymers such as polymer pellets, which raise an environmental problem, can be utilized as the polymers that will be subjected to the highly controlled thermal decomposition.

Among the functional substances, there are amphiphilic substances that are provided with both lipophilicity and affinity for supercritical $CO_2$, and further preferably with hydrophilicity.

Carbon dioxide ($CO_2$) is an indispensable substance for the living matters just as water is. On the other hand, the $CO_2$ gas emitted as a result of vast consumption of the carbon resources has been responsible for global warming; therefore, the emission regulation has been discussed at international conferences. The regulation for the emission of $CO_2$ gas has made it an urgent need to recover the $CO_2$ generated by the combustion of carbon fuels and to reutilize it.

Creation of the new C1 chemical technology is contemplated as one of the $CO_2$ reutilization techniques. The realization, however, requires a great amount of energy, which results in the emission of $CO_2$ afresh. Another $CO_2$ reutilization technique is proposed that a supercritical $CO_2$ fluid be utilized as an extraction/reaction medium. The utilization of supercritical $CO_2$ as solvent can eliminate environmental problems such as toxicity and inflammability by getting rid of organic solvents. It also can possibly realize the operations that are difficult to attain by ordinary solvents. Great expectations are, therefore, drawn.

The utilization of supercritical $CO_2$ as solvent cannot be done unless various substances having the affinity for supercritical $CO_2$ are available. Accordingly, there is a need for surfactants provided with lipophilicity, affinity for supercritical $CO_2$ and, if necessary, with hydrophilicity. Up till the present time, no surfactant has been reported to satisfy the need.

The alternative is a polymer having functionality resulting from the elongation of an oligoolefin chain.

As stated above, it is extremely difficult to extend the oligoolefin chain by directly polymerizing the terminal vinylidene double bonds of highly controlled thermal decomposition products from polymers.

The present inventors reported in J. Polymer Science, 34, 36525 (1996), the synthesis of a block copolymer of oligopropylene containing vinyl groups at both ends thereof and polydimethylsiloxane containing hydroxyl groups at both ends thereof which are synthesized through polymer reaction. This block copolymer, however, needs a supplementary test in order to prove that it is indeed a block copolymer.

In Macromolecules, 12, 848, 853 (1979) there is reported that anthracene or a pyrimidine base (such as uracil or thymine) undergoes dimerization and dissociation reversibly under selected wavelengths of irradiated light.

It is an object of the present disclosure to provide novel substances comprising as segments thereof, oligoolefin chains of oligoolefin obtained from the highly controlled thermal decomposition of polyolefins as well as to provide processes for their production.

The aforementioned functional substances include a functional substance with exhibited amphiphilicity comprising an oligoolefin chain and a perfluoroalkyl group at an end thereof, a photopolymerizable functional substance comprising a telechelic oligomer containing a reversible photopolymerization/dissociation group, a photo- and/or thermodissociable functional substance comprising the foregoing polymer, a hydrolyzable oligoolefin/oligoolefin block copolymer and a polymaleimide comprising an oligoolefin chain and a polydimethylsiloxane chain.

Another object of the invention is to provide oligo(1-butene) containing a terminal vinylidene double bond.

SUMMARY OF THE DISCLOSURE

The present disclosure resides in a functional substance characterized in that it is selected from the group consisting of:

a functional substance with exhibited amphiphilicity comprising an oligoolefin chain and a perfluoroalkyl group(s) at a single end thereof or at both ends thereof and represented by the following general formula (3):

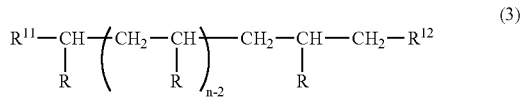

wherein R and n represent the same meanings as previously defined; and $R^{11}$ represents H—, $CH_3$—, HO—$CH_2$— or $R_{12}$—$CH_2$—,
wherein $R^{12}$ is

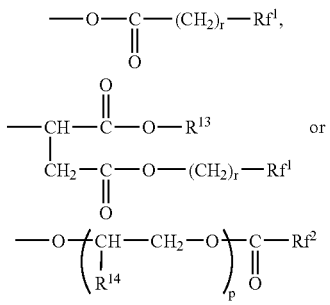

further wherein $R^{13}$ represents H—, $Rf^1$—$(CH_2)_r$— or a poly(oxyalkylene) group; $R^{14}$ represents H— or $CH_3$—; $Rf^1$ and $Rf^2$ each independently represents a perfluoroalkyl-containing group of from 1 to 20 carbon atoms; r is 0 or 1; and p is defined by 2p (the total of the left and the right)/n being in the range of from 0.1 to 10, the functional substance being a substance comprising within a molecule thereof, at least one oligoolefin chain containing a functional group (including an epoxy group), derived from an oligoolefin containing a vinylidene group(s) at a single end thereof or at both ends thereof and represented by the following general formula (1):

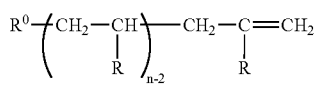

wherein $R^0$ represents

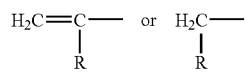

; R represents an alkyl group of from 1 to 3 carbon atoms, a phenyl group, a mixed group of methyl and ethyl or a mixed group of methyl and hydrogen; and n represents an integer of from 2 to 100, said oligoolefin produced by the highly controlled thermal decomposition of polyolefins, as well as derived from an oligoolefin containing a terminal functional group obtained from modification of the vinylidene double bond of the foregoing oligoolefin and represented by the following general formula (2):

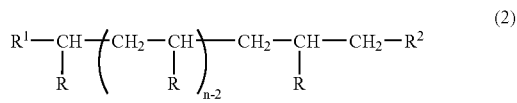

wherein R and n represent the same meanings as previously defined; $R^1$ represents H—, $R^2$—$CH_2$— or $R^3$—$CH_2$—; $R^2$ represents —OH or

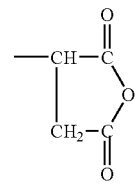

; and $R^3$ represents a hydrogen atom, an alkyl group of from 1 to 8 carbon atoms or an alkenyl group of from 1 to 8 carbon atoms, a functional substance with exhibited photopolymerizing capability comprising a telechelic oligoolefin comprising an oligoolefin chain and a reversible photopolymerization/dissociation group at an end thereof and represented by the following formula (4):

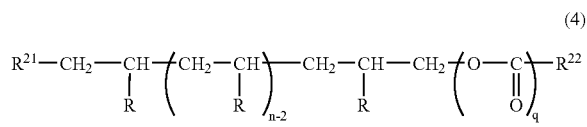

wherein R and n represent the same meanings as previously defined; $R^{21}$ represents R22—$(C(O)O)_q$— or $R^{23}$, wherein $R^{23}$ represents hydrogen, a hydroxyl group, an alkyl group of from 1 to 8 carbon atoms or an alkenyl group of from 1 to 8 carbon atoms; q is 0 or 1; $R^{22}$ represents an anthranyl group when q is 1 and represents a photolabile group selected from pyrimidyl, uracyl or thymidyl and capable of dimerization upon exposure to an active ray having a long wavelength of 300 nm or greater when q is 0, a functional substance with exhibited photo- and/or thermo-dissociation capability comprising a polymer formed by photopolymerizing two molecules or more of the telechelic oligoolefin containing a reversible photopolymerization/dissociation group and represented by the above-mentioned formula (4), said functional substance comprising a repeating unit of the following the general formula (5):

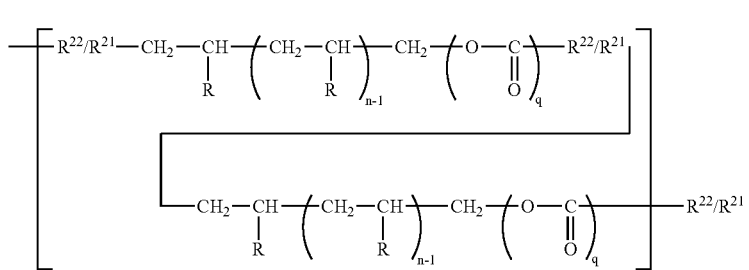

wherein R, n, q, $R^{21}$ and $R^{22}$ represent the same meanings as previously defined, a functional substance with exhibited hydrolysable capability comprising a multiblock copolymer of an oligoolefin comprising a repeating unit of the general formula (6):

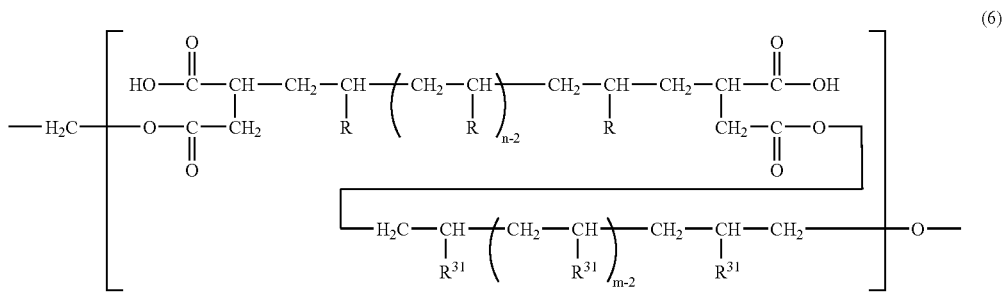

wherein R and n represent the same meanings as previously defined; $R^{31}$ may be the same as or different from R and represents an alkyl group of from 1 to 3 carbon atoms or a phenyl group; and m may be the same as or different from n and represents an integer of from 1 to 100, and a functional substance capable of forming a microphase separation structure comprising a polymaleimide comprising an oligoolefin chain and a polydimethylsiloxane chain together comprising a repeating unit of the general formula (7):

wherein R and n represent the same meanings as previously defined; c is an integer of from 1 to 10; and h is an integer of from 1 to 100.

Another aspect of the present disclosure resides in oligo(1-butene), which is a thermal decomposition product of poly(1-butene), having an average terminal vinylidene group number per molecule ($f_{TVD}$ value) of from 1.53 to 1.75, a number-average molecular weight ($M_n$) of from 1,000 to 5,000, and polydispersity (or a degree of dispersion in molecular weight distribution) ($M_w/M_n$) of 2.5 or less and comprising oligo(1-butene) containing vinylidene groups at both ends thereof and oligo(1-butene) containing a vinylidene group at a single end thereof, said oligo(1-butene) represented by the following formula (1a):

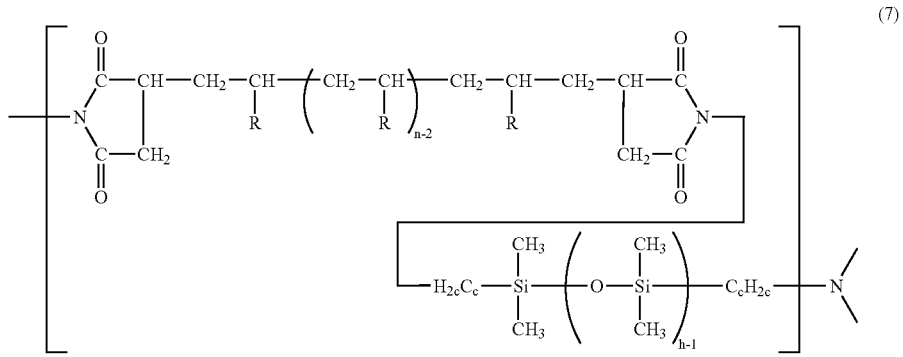

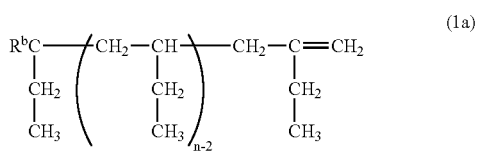

wherein $R^b$ represents $H_2$— or $H_2C$=and n is an integer of from 15 to 100.

DETAILED DESCRIPTION OF THE PREFERRED EMBODIMENT

The present disclosure employs as the starting material, an oligoolefin containing a vinylidene group(s) at a single end thereof or at both ends thereof and represented by the following general formula (1):

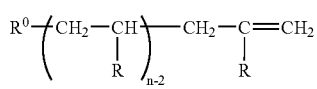

(1)

wherein $R^0$ represents

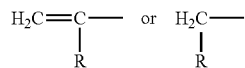

; R represents an alkyl group of from 1 to 3 carbon atoms, a phenyl group, a mixed group of methyl and ethyl or a mixed group of methyl and hydrogen; and n represents an integer of from 2 to 100.

The oligoolefin is produced by the highly controlled thermal decomposition of aliphatic polyolefins such as polypropylene, poly(1-butene), poly(1-pentene), propylene/ethylene copolymers, and propylene/1-butene copolymers or of aromatic polyolefins such as styrene; R in the general formula (1) is a methyl group, an ethyl group, a propyl group, a mixed group of methyl/hydrogen, a mixed group of methyl/ethyl or a phenyl group, each of which is correspondingly derived from one of the aforementioned starting polymers; and the oligoolefin comprises an oligoolefin chain and a vinylidene group(s) at a single end thereof or at both ends thereof, wherein the number n of repeating monomer unit is an integer of from 2 to 100. This oligoolefin has little polydispersity ($M_w/M_n$) and retains the stereospecificity of the starting polymer very well.

The oligoolefin containing a terminal vinylidene group is produced by the highly controlled thermal decomposition method in which the starting polyolefin is thermally decomposed under the passage of an inert gas such as nitrogen or argon at a temperature of from 300 to 450° C., preferably from 350 to 400° C. for from 30 to 240 minutes, preferably from 40 to 180 minutes while volatile fractions are removed.

The present disclosure encompasses terminal vinylidene group containing oligo(1-butene) (1PB-VD) including oligo(1-butene) containing vinylidene groups at both ends thereof and oligo(1-butene) containing a vinylidene group at a single end thereof, said oligo(1-butene) each represented by the general formula (1a) described below which corresponds to a novel substance of the above-mentioned general formula (1) wherein R is ethyl:

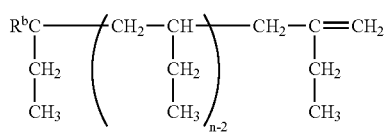

(1a)

wherein $R^b$ represents $_2H-$ or $H_2C=$ and n is an integer of from 15 to 100.

Figure 3:
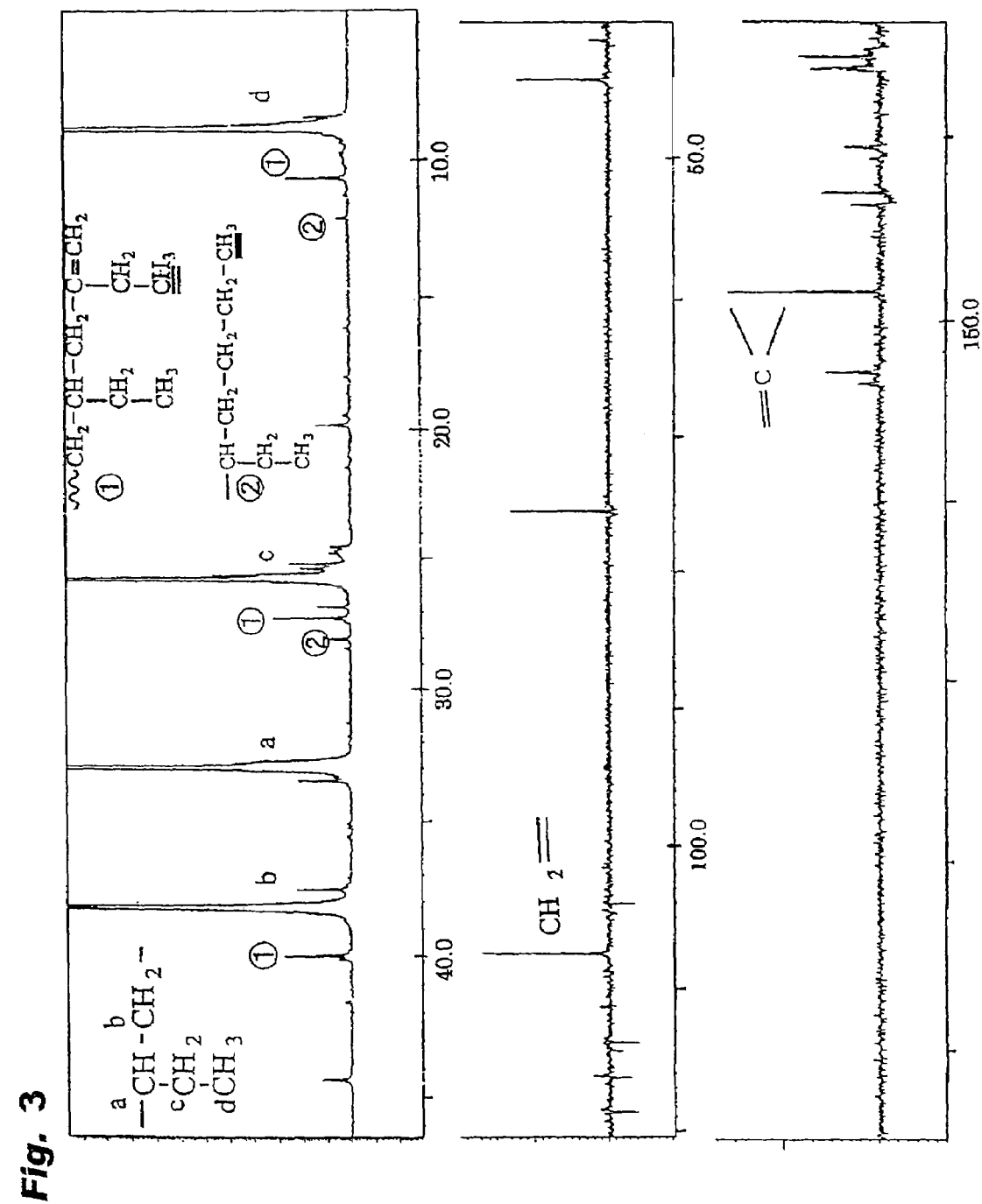
FIG. 3 shows a $^{13}$C-NMR spectrum of the thermal decomposition product of poly(-butene) obtained in Example 1-1 (oligo(1-butene) containing a terminal vinylidene group).

The terminal vinylidene group containing oligo(1-butene) (1PB-VD) is a thermal decomposition product produced by the highly controlled thermal decomposition of poly(1-butene) under the conditions described above; and it has an average terminal vinylidene group number per molecule ($f_{TVD}$ value) of from 1.53 to 1.75 as calculated on the basis of the $^{13}$C-nuclear magnetic resonance (NMR) spectrum shown in FIG. 3 and comprises a mixture of IPB-VD containing vinylidene groups at both ends thereof and IPB-VD containing a vinylidene group at a single end thereof.

Figure 5:
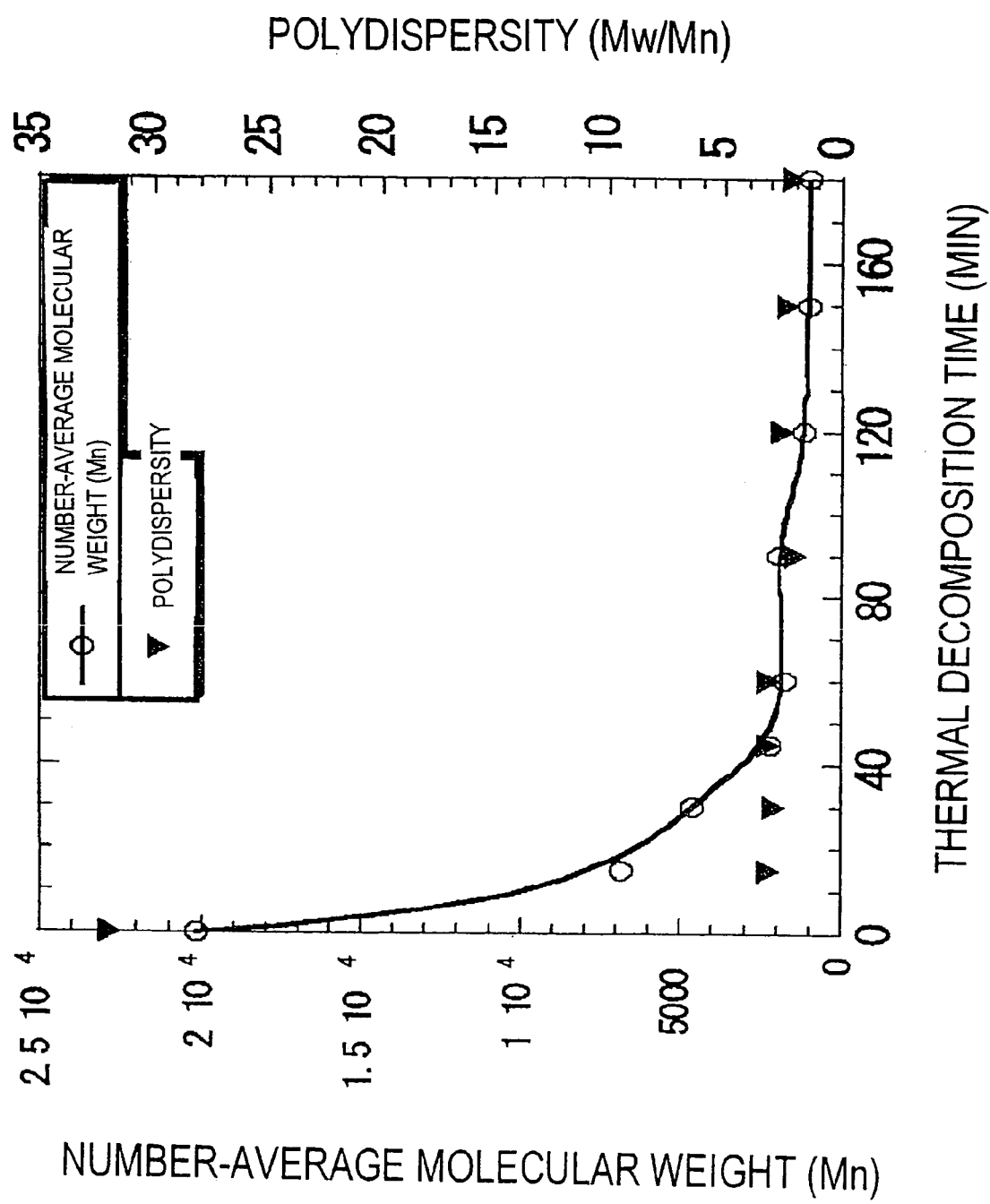
FIG. 5 shows a curve representing the number-average molecular weight ($M_n$) vs the polydispersity ($M_w/M_n$) for the thermal decomposition product of poly(1-butene) obtained in Example 1-1 (oligo(1-butene) containing a terminal vinylidene group).

This IPB-VD has a number-average molecular weight ($M_n$) of from 1,000 to 5,000 by gel permeation chromatography (GPC) shown in FIG. 5 as well as has polydispersity ($M_w/M_n$) of 2.5 or less. Thus, it retains the stereospecificity of the poly(1-butene) prior to thermal decomposition very well.

The average terminal vinylidene group number per one molecule ($f_{TVD}$ value) of the thermal decomposition product represents a generated ratio of the oligo (1-butene) containing vinylidene groups at both ends thereof to the oligo (1-butene) containing a vinylidene group at a single end thereof. When the thermal decomposition temperature of the starting poly(1-butene) is constant, the ratio varies between 1.53 and 1.75 as the thermal decomposition time lapses.

The number-average molecular weight ($M_n$) of the thermal decomposition product is from 1,000 to 5,000, preferably from 1,000 to 2,500 and its polydispersity ($M_w/M_n$) is 2.5 or less, preferably 2.0 or less. $M_n$ and $M_w/M_n$ both lower rapidly with the lapse of the thermal decomposition time, and they will converge to almost constant values, i.e., Mn to about 1,000 and $M_n/M_w$ to about 1.8, respectively. The thermal decomposition product does not exhibit a clear glass transition point (Tg).

The terminal vinylidene group containing oligo(1-butene) of this invention can preferably be used as a starting material for the synthesis of the functional substances of this invention similarly to the terminal vinylidene group containing oligopropylene (iPP-VD) which is a highly controlled thermal decomposition product of polypropylene as well as to the terminal vinylidene group containing oligostryrene (S-VD) which is a highly controlled thermal decomposition product of polystyrene.

The functional substances of this invention employ as the direct starting material for synthesis, the terminal vinylidene group containing oligoolefins described above or oligoolefins derived from the foregoing oligoolefins by modifying their vinylidene double bonds and introducing functional groups thereto, the oligoolefin comprising an oligoolefin chain and an —OH group(s) or an acid anhydride group(s) at a single end thereof or at both ends thereof, and represented by the following general formula:

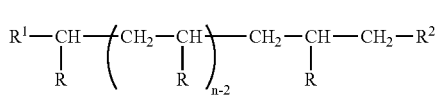

(2)

wherein R and n represent the same meanings as previously defined in the general formula (1); $R^1$ represents H—, $R^2$—$CH_2$— or $R^3$—$CH_2$—; $R^2$ represents —OH or

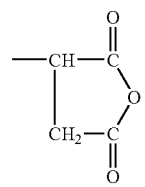

; and $R^3$ represents a hydrogen atom, an alkyl group of from 1 to 8 carbon atoms or an alkenyl group of from 1 to 8 carbon atoms.

The oligoolefins of the general formula (2) include an oligoolefin comprising an oligoolefin chain and an —OH group(s) at a single end thereof or at both ends thereof and represented by the following formula (2a):

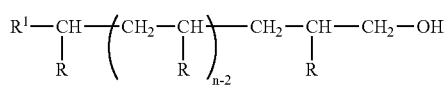

(2a)

wherein R, n and $R^1$ represent the same meanings as previously defined, and is obtained as follows: the terminal vinylidene group containing oligoolefin of the general formula (1) is subjected to hydroboration in THF as solvent on its terminal vinylidene group by addition of $BH_3$.THF-THF and then, it is oxidized by addition of sodium hydroxide and hydrogen peroxide water to modify the terminal vinylidene group into an —OH group.

The oligoolefins of the general formula (2) also include an oligoolefin comprising an oligoolefin chain and an acid anhydride group(s) through maleic acid modification at a single end thereof or at both ends thereof, said oligoolefin represented by the following formula (2b):

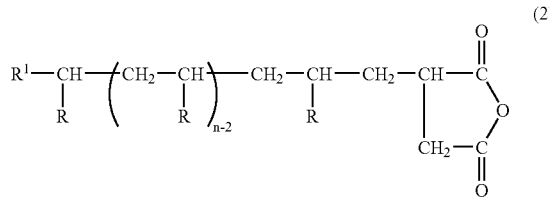

(2b)

wherein R, n and $R^1$ represent the same meanings as previously defined, and is obtained as follows: the terminal vinylidene group containing oligoolefin of the general formula (1) and maleic anhydride are allowed to react in an organic solvent such as decaline in the presence of an antioxidant to modify the terminal vinylidene group with maleic acid.

The first group member of the functional substances according to this invention is represented by the following general formula (3):

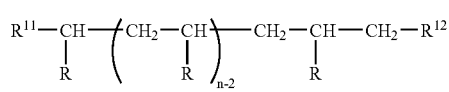

(3)

wherein R and n represent the same meanings as previously defined; and $R^{11}$ represents H—, $CH_3$—, HO—$CH_2$— or $R_{12}$—$CH_2$—, wherein $R^{12}$ is

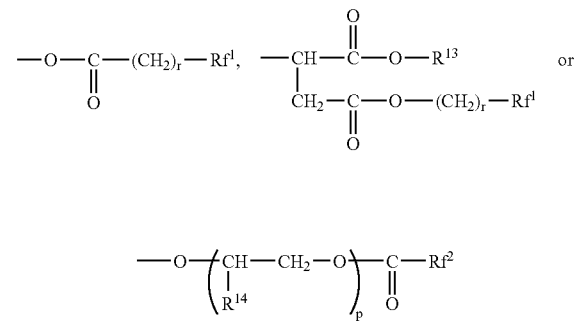

further wherein $R^{13}$ represents H—, $Rf^1$—$(CH_2)_r$— or a poly(oxyalkylene) group; $R^{14}$ represents H— or $CH_3$—; $Rf^1$ and $Rf^2$ each independently represents a perfluoroalkyl of from 1 to 20 carbon atoms; r is 0 or 1; and p is defined by 2p (the total of the left and the right)/n being in the range of from 0.1 to 10, and is obtained as follows: the terminal functional group of the oligoolefin of the formula (2) is utilized to introduce at least one perfluoroalkyl group into a single end or both ends of the oligoolefin chain with or without the intervention of the poly(oxyalkylene) chain.

The functional substance of this invention is provided with a lipophilic segment comprising an oligoolefin chain and with a water-repelling and supercritical $CO_2$ affinity segment comprising the perfluoroalkyl group $Rf^1$ or $Rf^2$, further preferably with a hydrophilic segment comprising a poly(oxyalkylene) chain. Thus, the functional substances of this invention exhibit amphiphilicity and can suitably be employed as surfactants in various kinds of reaction in which supercritical $CO_2$ is used as solvent.

The functional substances of this invention include:

a functional substance comprising an oligoolefin chain and a perfluoroalkyl group(s) $Rf^1$ at a single end thereof or at both ends thereof and represented by the following general formula (3a):

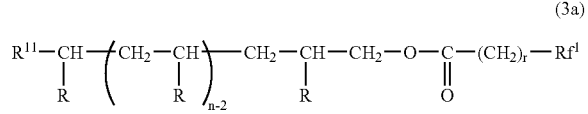

(3a)

; a functional substance comprising an oligoolefin chain and a perfluoroalkyl group(s) $Rf^1$ at a single end thereof or at both ends thereof and represented by the following general formula (3b):

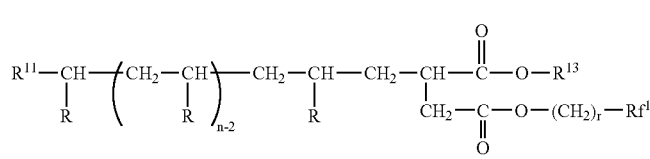

(3b)

; a functional substance comprising an oligostyrene chain and a perfluoroalkyl group $Rf^2$ at a single end thereof via a poly(oxyalkylene) group and represented by the following general formula (3c):

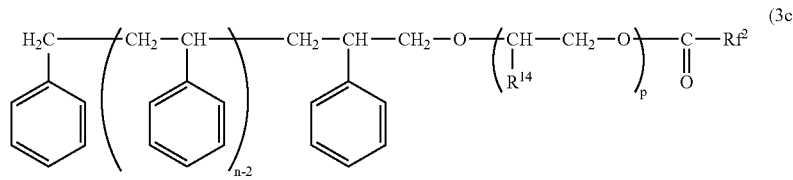

(3c)

; a functional substance comprising an oligoolefin chain and a perfluoroalkyl(s) group $Rf^2$ at a single end thereof or at both ends thereof via a poly(oxyalkylene) group and represented by the following general formula (3d):

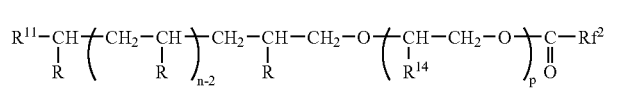

(3d)

In the functional substances of the general formulae (3a) and (3b) as described above, R represents an alkyl group of from 1 to 3 carbon atoms (i.e., methyl from propylene, ethyl from poly(1-butene) or propyl from poly(1-pentene)), or a phenyl group from polystyrene. "n" represents the number of repeating monomer units and is normally 2 or an integer of from 1 to 100, preferably from 10 to 50, which may appropriately be selected based on the "R" as well as on the required lipophilicity.

$R^{11}$ is as previously defined in the general formula (3) and "r" is 0 or 1, preferably 0. $Rf^1$ is a perfluoroalkyl group having a straight or branched chain of from 1 to 20 carbon atoms, preferably of from 3 to 10 carbon atoms and represented by formula $F_{a+1}C_a$— wherein "a" is an integer of from 1 to 20, and the carbon atom number may appropriately be selected based on the required water repellency and affinity for supercritical $CO_2$ among others.

The general formula (3a) encompasses a functional substance of the formula wherein $R^{11}$ is $Rf^1$—$(CH_2)_r$—C(O)O—$CH_2$—, comprising an oligoolefin chain and perfluoroalkyl groups $Rf^1$ at both ends thereof and a functional substance of the formula wherein $R^{11}$ is H—, $CH_3$— or HO—$CH_2$—, comprising an oligoolefin chain and a perfluoroalkyl group $Rf^1$ at a single end thereof.

The general formula (3b) encompasses a functional substance of the formula wherein $R^{11}$ is $Rf^1$—$(CH_2)_r$—OC(O)—CH(COO$R^{13}$)—$CH_2$— and $R^{13}$ is —$Rf^1$, comprising an oligoolefin chain and four perfluoroalkyl groups $Rf^1$ at both ends thereof, a functional substance of the formula wherein $R^{13}$ is —H or a poly(oxyalkylene) group, comprising an oligoolefin chain and two perfluoroalkyl groups $Rf^1$ at both ends thereof, and a functional substance of the formula wherein $R^{11}$ is H—, $CH_3$—$CH_2$— or HO—$CH_2$— and $R^{13}$ is a poly(oxyalkylene) group, comprising a star structure. Here, the poly(oxyalkylene) group represents poly(oxyalkylene), such as poly(oxyethylene) or poly(oxypropylene), wherein the one —OH group is blocked with alkyl, perfluoroalkyl, or the like. The poly(oxyalkylene) group is a hydrophilic group and the length of the oxyalkylene chain may appropriately be selected based on the required hydrophilicity.

The functional substance of the general formula (3a) may be produced by the quantitative esterification between an oligoolefin of the general formula (2a) comprising an oligoolefin chain and an —OH group at an end thereof and the corresponding perfluoroalkylcarboxylic acid of the general formula $F_{a+1}C_a$—$(CH_2)_r$—C(O)OH wherein "a" is an integer of from 1 to 20.

The functional substance of the general formula (3b), a substance of the formula wherein $R^{13}$ is —H, may be produced by the quantitative esterification between a maleic acid-modified oligoolefin of the general formula (2b) containing a terminal acid anhydride group and the corresponding perfluoroalkylalcohol of the general formula $F_{a+1}C_a$—$(CH_2)_r$—OH wherein "a" is an integer of from 1 to 20.

Then, the quantitative esterification between the carboxyl group liberated in the above-mentioned reaction and the corresponding perfluoroalkylalcohol can introduce —$Rf^1$ into $R^{13}$. The liberated carboxyl group may also be subjected to ring-opening polymerization with an alkylene oxide such as ethylene oxide or propylene oxide, or alternatively, the carboxyl group may be quantitatively esterified with the corresponding polyalkylene glycol such as polyethylene glycol or polypropylene glycol, thereby allowing the introduction of a poly(oxyalkylene) group into $R^{13}$.

The functional substance of the following general formula (3c):

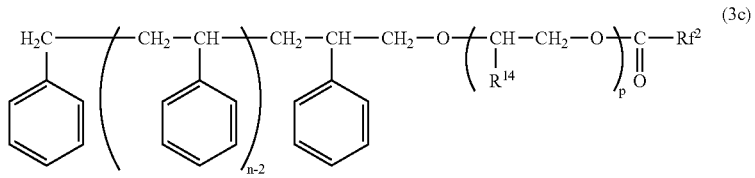

is a block copolymer of the BA type having the structure where an oligostyrene of the general formula (2a) wherein R is phenyl, containing an —OH group at a single end thereof and an oligo(or poly)(oxyalkylene) are etherified, and the terminal hydroxyl group is converted into a perfluorocarboxylic acid ester.

The number "n" of the styrene monomer repeating units is not particularly limited and it is only dependent on the oligostyrene containing a vinylidene group at a single end thereof that is available as the starting material. Normally, "n" is in the range of from 2 to 10. The oligostyrene may be substituted with a variety of substituents within its molecule. Specifically, there are mentioned those of which the benzene ring is substituted with alkyl, alkoxy, halogen or the like, and those of which the α-position of the styrene ring is substituted with alkyl, alkoxy or the like. Here, the perfluoroalkyl group $Rf^2$ may either be a straight chain perfluoroalkyl or a branched perfluoroalkyl of from 1 to 20 carbon atoms, preferably of from 3 to 10 carbon atoms. The oligo(or poly)(oxyalkylene) chain is oligo(or poly)(oxyethylene) of the formula wherein $R^{14}$ is —H, or oligo(or poly) (oxypropylene) of the formula wherein $R^{14}$ is —CH$_3$ and it is preferably oligo(or poly)(oxyethylene). The number "p" of the oxyalkylene repeating units is also not particularly limited and it is only dependent on the quantity of the alkylene oxide used in ring-opening polymerization to form the oligo(or poly)(oxyalkylene) chain. Normally, "p" is in the range of from 1 to 50.

The oligostyrene of the general formula (2a) containing an —OH group at a single end thereof is allowed to undergo ring-opening polymerization with an alkyleneoxide (such as ethylene oxide or propylene oxide) in the presence of a catalyst and the terminal —OH group is further esterified by addition of perfluoroalkylcarboxylic acid, whereby the functional substance encompassed by the general formula (3c) may be produced. As to the ring-opening polymerization conditions such as the quantity of the alkylene oxide to be reacted, the selection of the catalyst system, reaction time and reaction temperature, New Polymer Experimental Studies 2, "Syntheses and Reactions of Polymers (1): The synthesis of addition/condensation type polymers," Kyoritsu Publisher, 1995 may be consulted.

The functional substance of the following general formula (3d):

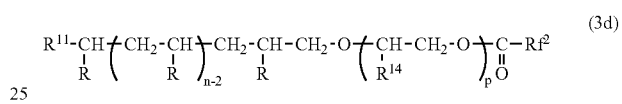

is a block copolymer of the B-A-B type having the structure comprising an oligoolefin of the formula wherein $R^{11}$ is:

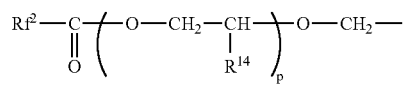

R is a single group of —CH$_3$, a mixed group of —CH$_3$/—H, or a mixed group of —CH$_3$/—C$_2$H$_5$ and perfluoroalkyl groups at both ends thereof flanking the oligoolefin via a poly(oxyalkylene) chain.

The number "n" of repeating monomer units of the oligoolefin chain is an integer of from 15 to 100 and it may be varied within the aforementioned range, depending on the purpose of use, the kind of organic medium, or the like. The oxyalkylene chain is poly(oxyethylene) or poly(oxypropylene) correspondingly when $R^{14}$ is —H or —CH$_3$. The number "p" of oxyalkylene repeating units is defined by 2p (the total of the left and the right)/n being in the range from 0.1 to 10.

The amphiphilicity of the functional substance encompassed by the general formula (3) is characterized by its ability to lower the surface tension and the ability to form molecular aggregates. Specifically, the surface tension of an aqueous dispersion of the functional substance may be measured and its concentration dependency may be determined. Such measurement can then determine the critical micelle concentration (referred to as "CMC" hereafter). Further, the mean particle size of micelle in the aqueous dispersion of the functional substance may be measured and its concentration dependency may be determined. Such measurement can then confirm the formation of molecular aggregates having specific sizes.

Since the functional substances encompassed by the general formula (3) exhibit amphiphilicity, they can have applications as hydrophilic/lipophilic surfactants, dispersants, emulsifiers, surface modifiers for polymer materials, etc. They also display the capability to form unique molecular aggregates; therefore, their application to new functional materials is likewise possible.

The second group member of the functional substances according to this invention is represented by the following general formula (4):

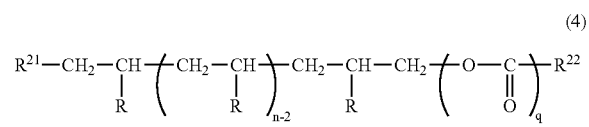

(4)

and is characterized in that it comprises an oligoolefin chain and a reversible photopolymerization/dissociation group at least at one end thereof.

The reversible photopolymerization/dissociation group $R^{22}$ is a photolabile group capable of dimerization upon exposure to an active ray having a long wavelength of 300 nm or greater such as an anthranyl group or a pyrimidine base (e.g., uracyl or thymidyl).

R in the general formula (4) is an alkyl group of from 1 to 3 carbon atoms, such as methyl, ethyl, propyl or phenyl. Specifically, the bracket represents the monomer unit of an oligoolefin chain such as an aliphatic oligoolefin chain including oligopropylene, oligo(1-butene) and oligo(1-pentene) or an aromatic oligoolefin chain including styrene. The repeating number "n" is from 1 to 100, preferably from 10 to 50.

$R^{21}$ is the reversible photopolymerization/dissociation group $R^{22}$ or an —$R^{23}$ group wherein $R^{23}$ is hydrogen, a hydroxyl group, an alkyl group of from 1 to 8 carbon atoms (such as methyl, ethyl, propyl, butyl, t-butyl, pentyl, hexyl, cyclohexyl, heptyl or nonyl), an alkoxy group (such as methoxy, ethoxy, propoxy or butoxy), an alkenyl group (such as vinyl) or an aryl group, each of which is a non-photolabile group.

The telechelic oligoolefin containing a reversible photopolymerization/dissociation group may be produced by reacting an oligoolefin of the formula (2a) comprising an oligoolefin chain and an —OH group(s) at a single end thereof or at both ends thereof with anthronic acid chloride, pyrimidine hydrochloride, uracil hydrochloride or thymine hydrochloride.

The telechelic oligoolefin containing a reversible photopolymerization/dissociation group may be photopolymerized by exposure to an active ray with a long wavelength of 300 nm or greater, and the photopolymerized telechelic oligoolefin polymer dissociates to the telechelic oligoolefin of formula (4) by exposure to an active ray with a short wavelength of less than 300 nm and/or heating.

The third group member of the functional substances according to this invention is the functional substance capable of reversibly dissociating by light and/or heat comprising a repeating unit of the general formula (5):

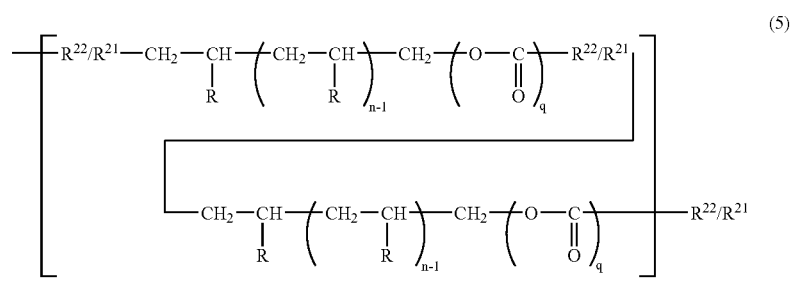

(5)

wherein R, n, q, $R^{21}$ and $R^{22}$ represent the same meanings as previously defined, said functional substance comprising a polymeric form obtained by polymerization of two or more molecules of the telechelic oligoolefin of the general formula (4) containing a reversible photopolymerization/dissociation group.

The polymer may be produced through photopolymerization by exposing the telechelic oligoolefin of the general formula (4) to an active ray having a wavelength of 300 nm or greater where a ray having a wavelength of less than 300 nm has been cut with a filter, in an appropriate solvent in the presence of a sensitizer if necessary.

These polymers inherit the characteristics of the oligoolefin that constitutes the backbone of the telechelic oligoolefin very well and are provided with substantially the same characteristics as those of the polyolefin. Accordingly, they can be used as base resins in the manufacture of a variety of molded products. It can also be expected that they will be utilized as photosensitive polymers taking advantage of their ability to photopolymerize.

These polymers can readily dissociate by exposure to an active ray of less than 300 nm or by heating to regenerate the telechelic oligoolefins of the general formula (4) and they can be utilized as recycle polymers.

The fourth group member of the functional substances according to this invention is a multiblock copolymer of the general formula (6):

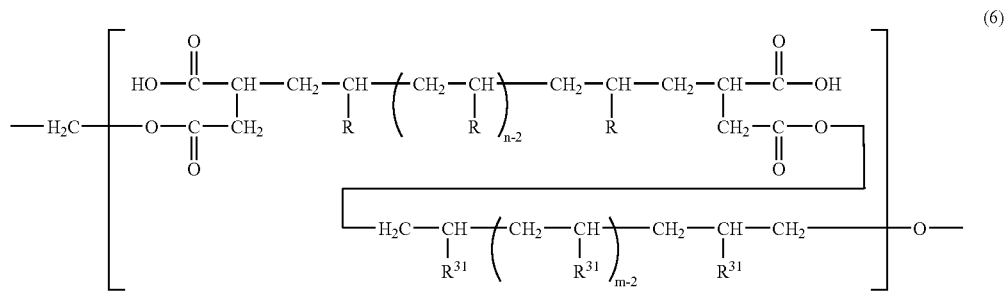

(6)

comprising an oligoolefin chain elongated via ester linkages.

This polymer is a block copolymer where an oligoolefin of the general formula (2b) with maleic acid modifications at both ends thereof (OL-MA) and an oligoolefin of the general formula (2a) containing hydroxyl groups at both ends thereof (OL-OH) are esterified and OL-MA and OL-OH are alternately arranged.

R and $R^{31}$ in the above formula are each independently an alkyl group of from 1 to 3 carbon atoms, such as methyl, ethyl, propyl or phenyl. The bracket represents the monomer unit of the oligoolefin chain such as an aliphatic oligoolefin chain including oligopropylene, oligo(1-butene) or oligo(1-pentene), or an aromatic oligoolefin chain including styrene. "n" and "m" represent the number of the repeating monomer units. "n" and "m" are from 1 to 100, preferably from 10 to 50.

The oligoolefin chain of the OL-MA block and the oligoolefin chain of the OL-OH block may be the same or different. For example, when R and $R^{31}$ are both methyl and n=m, an oligopropylene/oligopropylene copolymer containing the same oligoolefin chain results. When either of R and $R^{31}$ is methyl and the other is phenyl, an oligopropylene/oligostyrene copolymer results. When both R and $R^{31}$ are methyl (i.e., they are the same) but the repeating numbers "n" and "m" are different, an oligopropylene/oligostyrene copolymer results. Any of the aforementioned copolymers may be suitable.

These combinations may be appropriately selected according to the required functions. Since this block copolymer has an ester linkage between the blocks, it can be hydrolyzed to give OL-MA and OL-OH, and thus, it is provided with the capability of being recycled.

The copolymerization described above is a conventional esterification between a carboxylic anhydride and an alcohol and it can be carried out by a method known in the art. For example, the copolymer may be synthesized by reacting OL-MA and OL-OH in toluene as solvent in the presence of p-toluenesulfonic acid.

The fifth group member of the functional substances according to this invention is a polymaleimide comprising a repeating unit of the general formula (7):

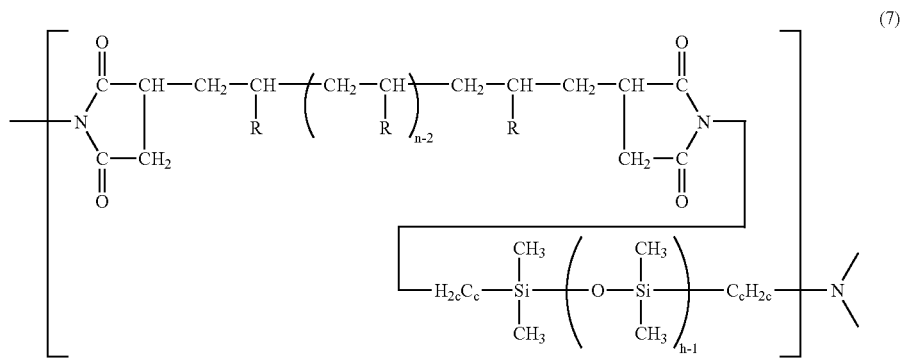

(7)

said polymaleimide obtained by an imide linkage formation between the oligoolefin chain and the polydimethylsiloxane chain.

The multiblock copolymer of the general formula (7) is such that R in the formula is an alkyl group of from 1 to 3 carbon atoms, such as methyl, ethyl, propyl or phenyl, the bracket represents the monomer unit of an oligoolefin chain such as an aliphatic oligoolefin chain including oligopropylene, oligo(1-butene) or oligo(1-pentene), or an aromatic oligoolefin chain including oligostyrene and it comprises as one segment, an oligoolefin chain with a repeating number "n" of being from 1 to 100, preferably from 10 to 50.

The other segment comprises the polydimethylsiloxane chain comprising a repeating number "h" of from 1 to 100 (preferably from 2 to 6) of a dimethylsiloxane unit containing alkylene groups with "c" in the formula being from 1 to 10 (preferably from 2 to 6) at both ends thereof. Both segments are linked via an imide linkage.

The multiblock copolymer comprises the oligoolefin segment and the siloxane segment that is immiscible with the former segment; therefore, it is a copolymer that forms a microphase separation structure. It can be expected that the copolymers find use in the field of various materials such as electric or electronic materials utilizing their characteristics, and modifiers of known resins.

The multiblock copolymer of the general formula (7) may be produced according to the method described below.

An oligoolefin of the general formula (2b) with maleic acid modifications at both ends thereof and a diaminoalkylpolydimethylsiloxane of the general formula (8):

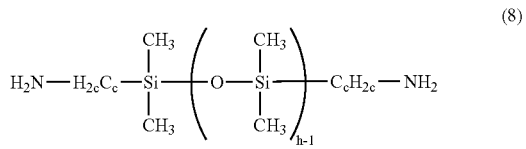

wherein c and h represent the same meanings as previously defined, to generate a polyamic acid comprising as a repeating unit of the general formula (9):

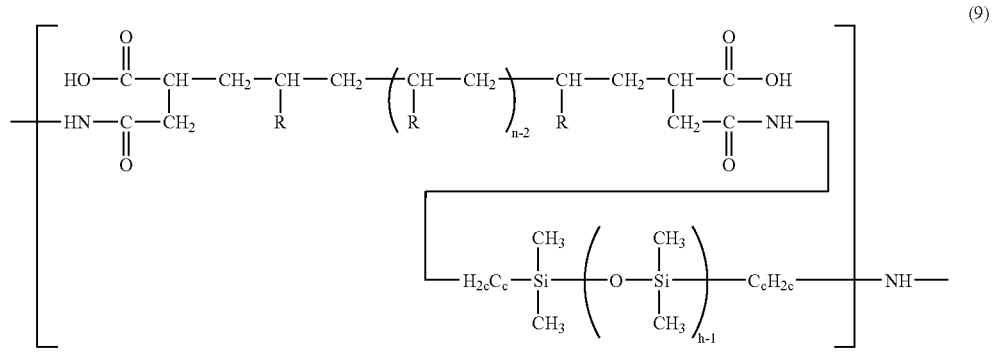

wherein R, n, c, and h represent the same meanings as previously defined, and this polyamic acid is cyclized by heating, thus allowing for the production.

Commercial products of different grades are available as the diaminoalkylpolydimethylsiloxanes of the general formula (8) and they can appropriately be selected and used according to the purposes.

The reaction generating the amide acid from the maleic acid-modified oligoolefin and the diamonoalkylpolydimethylsiloxane can employ a known reaction generating a polyamic acid from various tetracarboxylic acids and diamines. Also known is the reaction by which the amide acid is cyclized by heating to form an imide.

The chemical structures of the functional substances according to this invention are characterized by the determination of their molecular weights and various spectroscopic measurements.

Specifically, conventional gel permeation chromatography (hereafter referred to as "GPC") allows the determination of the molecular weights of the obtained polymers as well as of molecular weight distribution. In addition, if necessary, particular portions may be fractionated and made for samples that will be subjected to the detailed analysis (e.g., IR and NMR).

Further, finer chemical structures can be determined by infrared absorption spectroscopy (hereafter referred to as "IR"), nuclear magnetic resonance spectroscopy (hereafter referred to as "NMR") and the like. For example, in the IR of the oligostyrene of the general formula (3c) the structure of the functional substance may be qualitatively determined by the coexistence of absorption due to a styrene group and absorption due to an ether group. The absorption intensities due to the styrene and ether groups and a suitable calibration curve may be used to quantify the repeating number "n" of the olefin units and the repeating number "p" of the oxyalkylene units. Similarly, in the NMR the structure of the functional substance may be qualitatively determined by the coexistence of the absorption due to a styrene group (e.g., aromatic hydrogen, methylene and methine) and the absorption due to an ether group (e.g., methylene). Their integrated values may be used to quantify the repeating number "n" of the olefin units and the repeating number "p" of the oxyalkylene units.

EXAMPLES

The present disclosure will be described in more detail by referring to the examples. However, the scope of this invention is in no way limited by the following examples.

Example 1

Oligoolefin Containing a Terminal Vinylidene Group(s)

Example 1-1

Oligo(1-butene) Containing a Terminal Vinylidene Group(s) (Thermal Decomposition of Isotactic Poly(1-Butene))

A two-necked flask was charged with 1.0 g of isotactic poly(1-butene) (product name: P2000 available from Mitsui Chemicals, Inc.), and it was evacuated to about 2 mm Hg, substituted with $N_2$ and then heated to 370° C. under the passage of $N_2$. The thermal decomposition time was adjusted to 30, 45, 60, 90, 120, 150 and 180 minutes and volatile fractions generated under the reaction conditions were absorbed by chloroform and collected. The residue in the flask after the thermal decomposition time had elapsed was heat-dissolved with xylene and then filtrated while hot. The filtrate was dropped into methanol. The resulting precipitate was collected by suction filtration and dried at reduced pressure.

The infrared spectrum (IR spectrum) and the $^1$H-NMR spectrum of the collected product of thermal decomposition confirmed that the thermal decomposition product was isotactic oligo(1-butene) containing a terminal vinylidene group(s).

Figure 1:
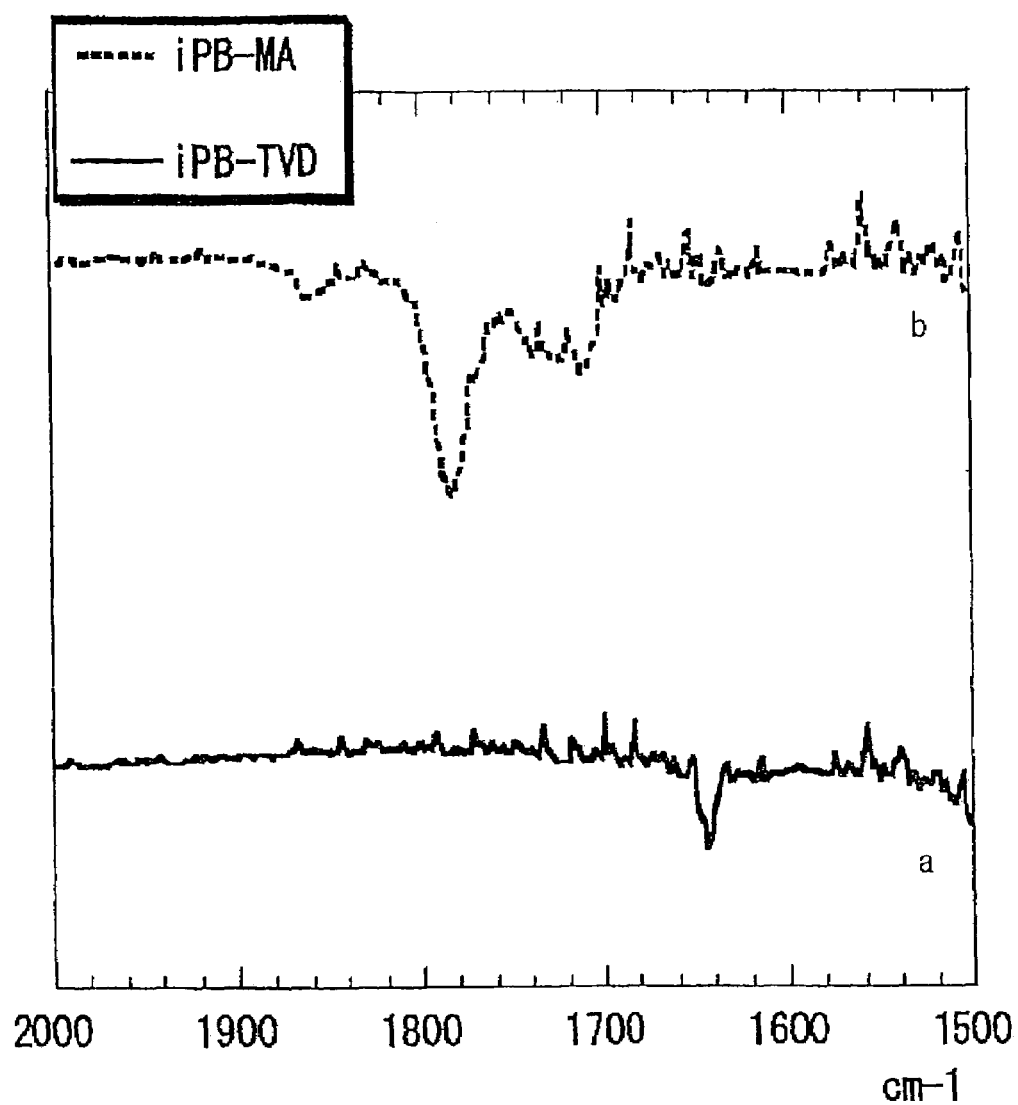
FIG. 1 shows IR spectra of the thermal decomposition product of poly(1-butene) obtained in Example 1-1 (oligo (1-butene) containing a terminal vinylidene group) and oligo(1-butene) with a terminal maleic acid modification synthesized in Example 3-1, wherein "a" represents the oligo(1-butene) containing a terminal vinylidene group and "b" represents the oligo(1-butene) with the terminal maleic acid modification.
Figure 2:
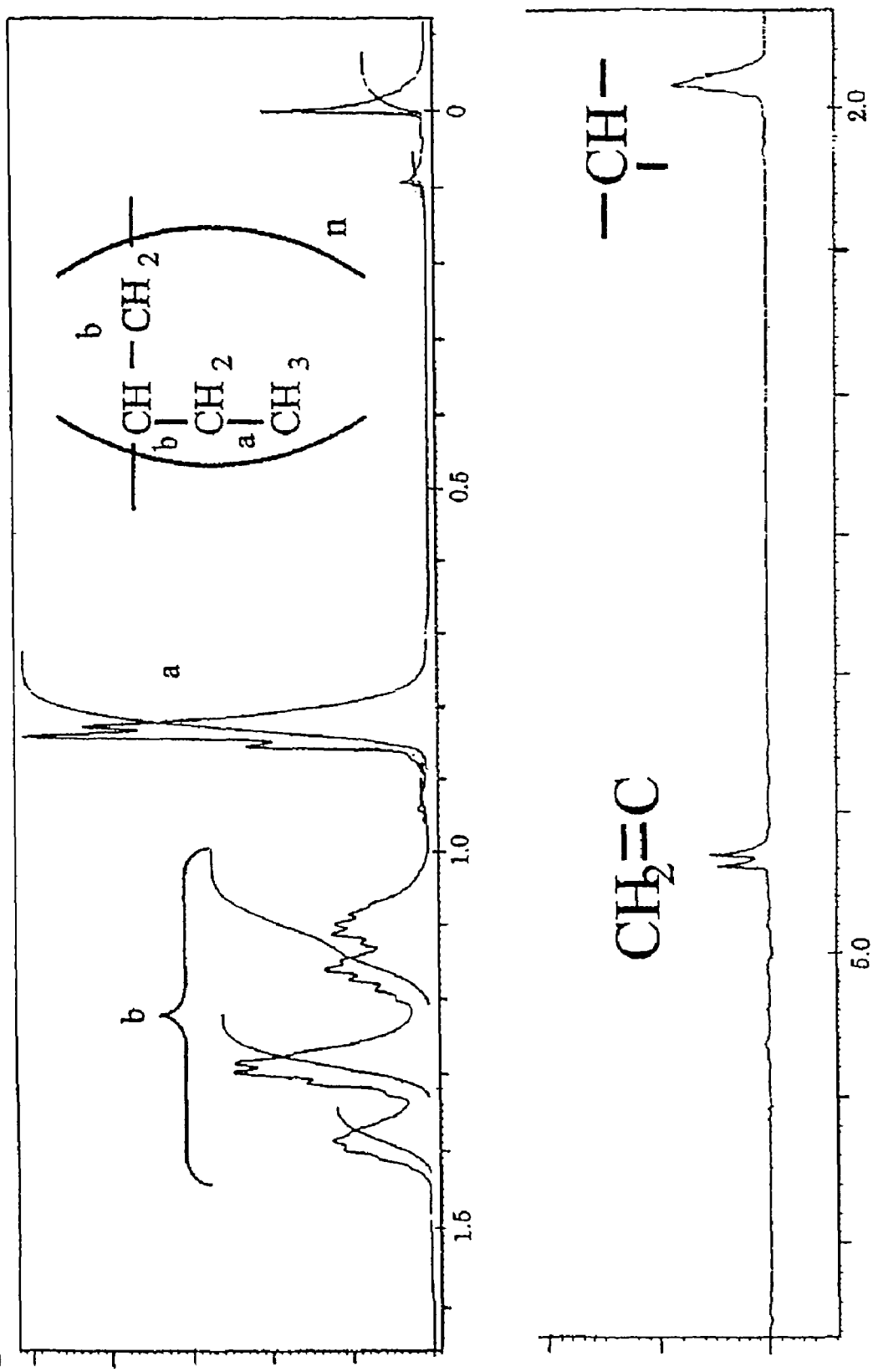
FIG. 2 shows a $^1$H-NMR spectrum of the thermal decomposition product of poly(1-butene) obtained in Example 1-1 (oligo(1-butene) containing a terminal vinylidene group).

FIG. 1 shows the IR spectrum of the thermal decomposition product and FIG. 2 shows its $^1$H-NMR spectrum.

Figure 4:
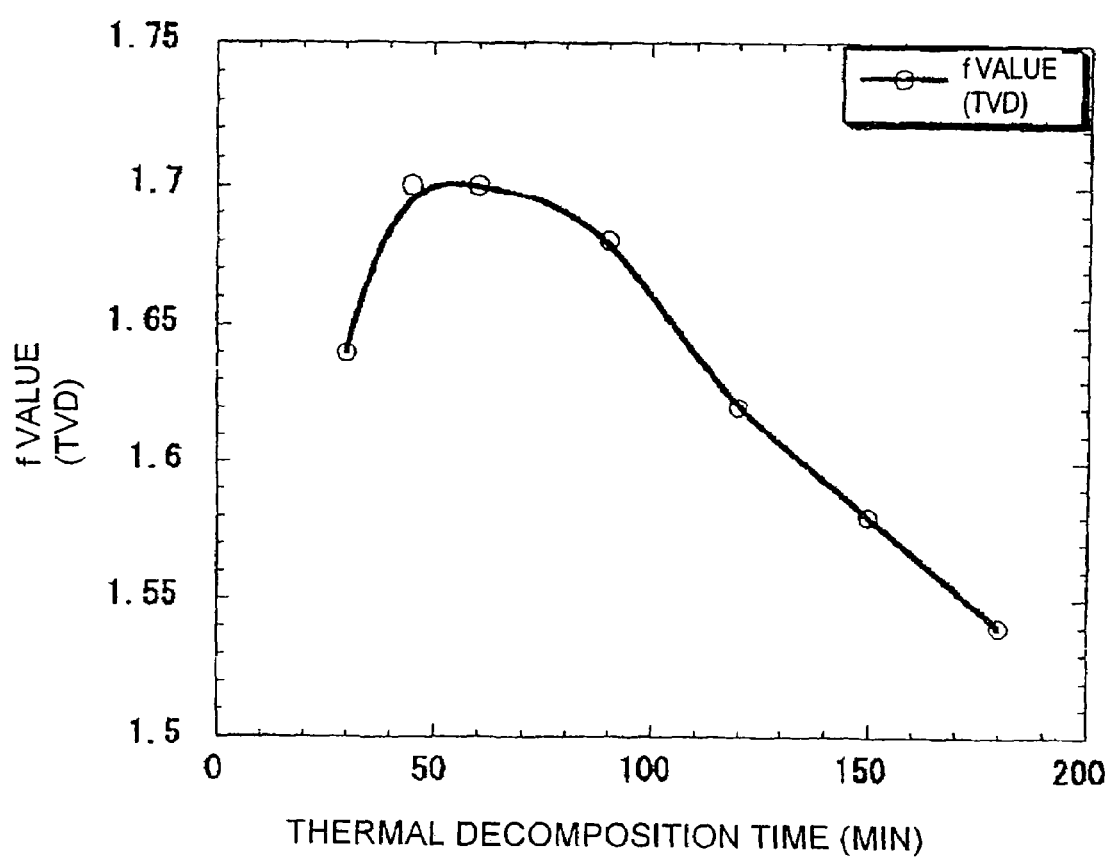
FIG. 4 shows a curve representing the average terminal vinylidene group number ($f_{TVD}$ value) vs the thermal decomposition time for the thermal decomposition product of poly(1-butene) obtained in Example 1-1 (oligo(1-butene) containing a terminal vinylidene group).

The $^{13}$C-NMR spectrum of the thermal decomposition product showed the presence of a terminal vinylidene group and a terminal saturated methyl group. This confirmed that the thermal decomposition product was a mixture of oligo (1-butene) of the general formula (1) containing vinylidene groups at both ends thereof and oligo(1-butene) of the general formula (2) containing a vinylidene group at a single end thereof. The average terminal vinylidene group number ($f_{TVD}$ value) per one molecule of the thermal decomposition product was calculated based on the ratio of signal intensities for the side chain methyl of the terminal vinylidene group and the terminal saturated methyl group, which varied between 1.53 and 1.75 depending on the thermal decomposition time. FIG. 3 shows the $^{13}$C-NMR spectrum and FIG. 4 shows variations in the $f_{TVD}$ value with decomposition time.

GPC of the thermal decomposition product indicated that the number-average molecular weight ($M_n$) and the polydispersity ($M_w/M_n$) rapidly dropped as the thermal decomposition time elapsed and $M_n$ and $M_w/M_n$ converged to 1000 and 1.8, respectively. FIG. 5 shows variations in $M_n$ as well as in $M_w/M_n$ with decomposition time.

Figure 6:
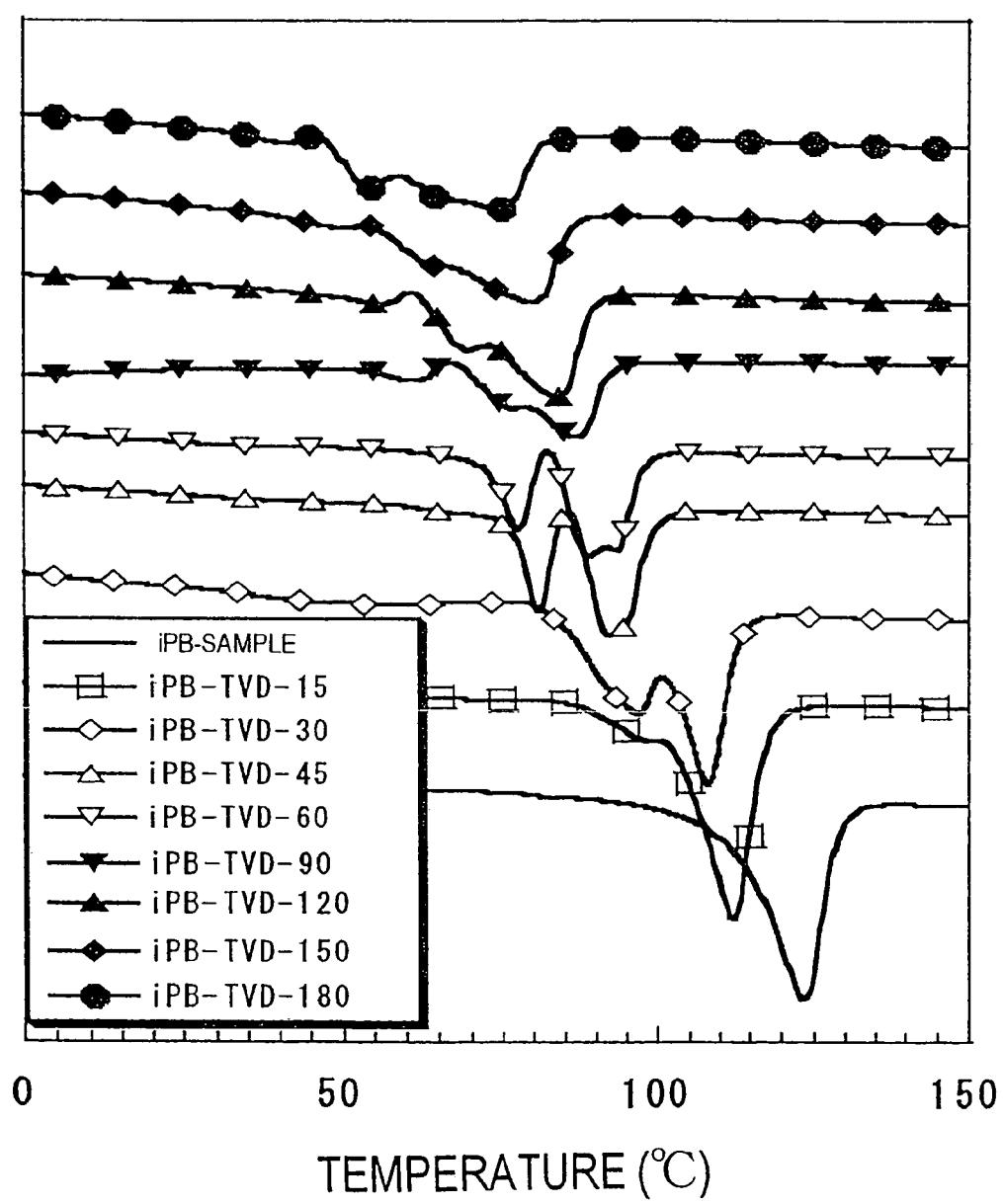
FIG. 6 shows DSC curves of the thermal decomposition product of poly(1-butene) obtained in Example 1-1 (oligo (1-butene) containing a terminal vinylidene group).
Figure 7:
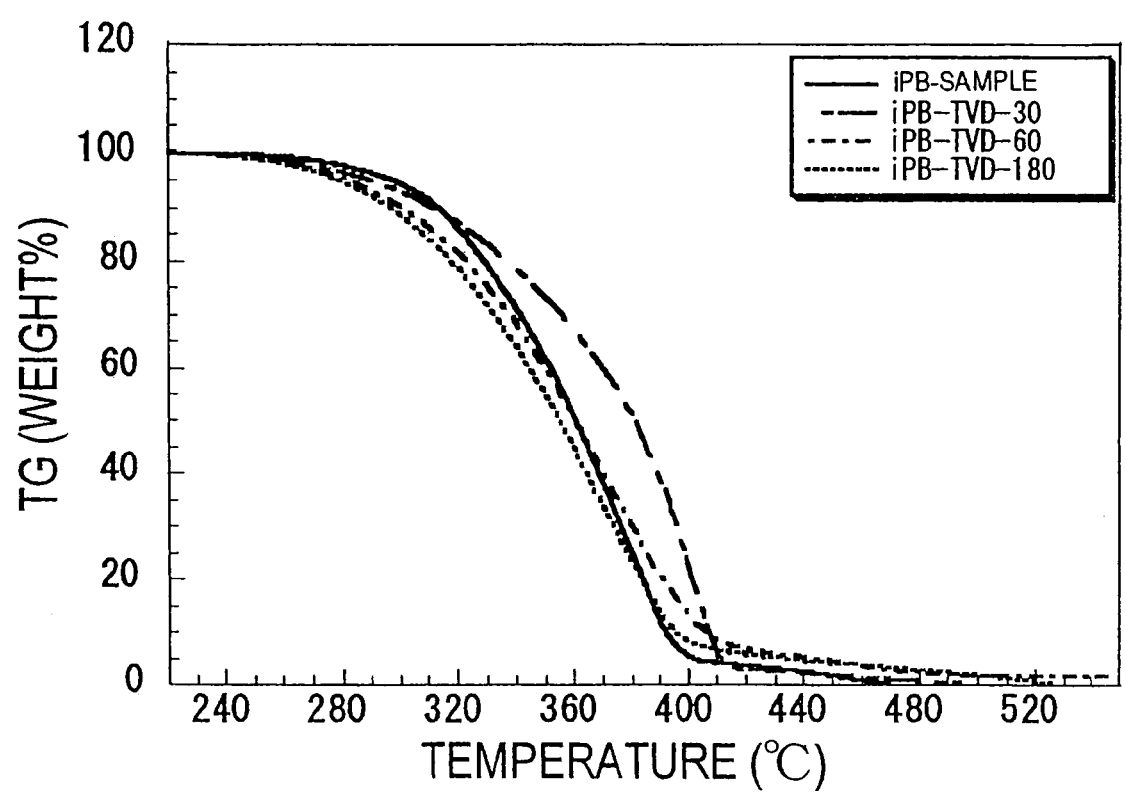
FIG. 7 shows TG curves of the thermal decomposition product of poly(1-butene) obtained in Example 1-1 (oligo (1-butene) containing a terminal vinylidene group).
Figure 8:
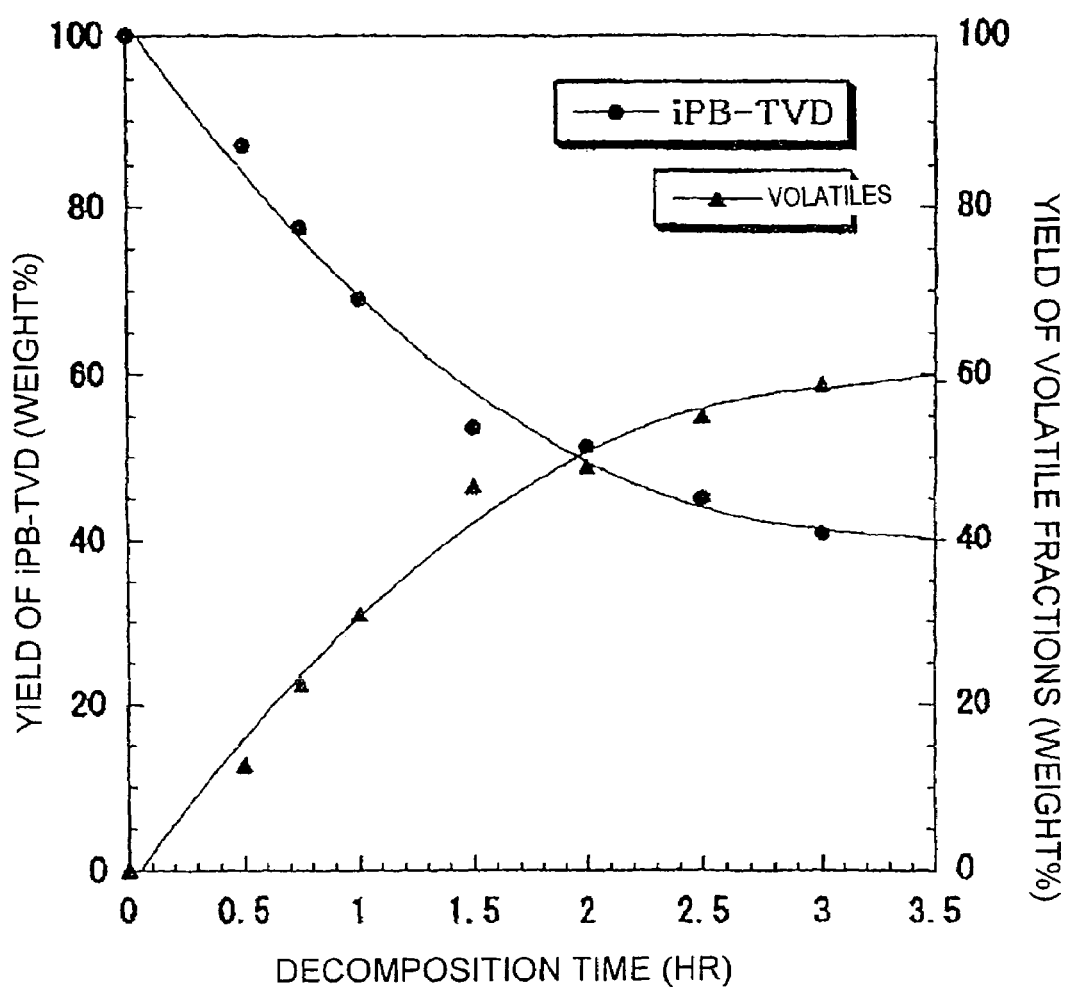
FIG. 8 shows a curve representing the yield vs the thermal decomposition time for the thermal decomposition product of poly(1-butene) obtained in Example 1-1 (oligo(1-butene) containing a terminal vinylidene group).

Furthermore, the DSC curves of the thermal decomposition products showed shifts of the endothermic peaks to the low temperature side with the elapse of decomposition time and did not show clear glass transition temperatures (Tg). The beginning temperature of weight decrease in a TG curve was almost the same as that for the starting material P2000. FIG. 6 shows the DSC curves with decomposition time, FIG. 7 shows the TG curves and FIG. 8 shows the yields of the thermal decomposition products.

Example 1-2

Styrene Dimer (SD) and Trimer (ST) Containing a Vinylidene Group at a Single End Thereof Polystyrene was thermally decomposed at 370° C. for 3 hours to give styrene dimer (SD) and trimer (ST) containing a vinylidene group at a single end thereof in the respective yields of 20 wt % and 30 wt %.

Example 1-3

Oligopropylene Containing Vinylidene Groups at Both Ends Thereof (iPP-VD)

The volatile product from the highly controlled thermal decomposition of isotactic polypropylene (mm:mr:rr=98:1:1) having a number-average molecular weight ($M_n$) of 111×10 and $M_w/M_n$ of 8.39 was distilled and reprecipitated to give the monodispersed oligopropylene containing vinylidene groups at both ends thereof (iPP-VD) and having a number-average molecular weight ($M_n$) of 1.43×10$^3$ and $M_w/M_n$ of 1.11.

Example 2

Hydroxylation of Terminal Vinylidene Double Bond

Example 2-1

Oligopropylene Containing —OH Groups at Both Ends Thereof (iPP-OH)

Commercial isotactic polypropylene was subjected to the highly controlled thermal decomposition to give an oligopropylene containing vinylidene double bonds at both ends thereof and having a number-average molecular weight ($M_n$) of 1.66×10$^3$ (n=39.5), dispersibility $M_w/M_n$ of 1.35, a terminal vinylidene double bond number ($f_{TVD}$) per molecule of 1.66. The oligopropylene was dispersed in tetrahydrofuran (THF), and upon addition of borane THF complex, it was heated at 55° C. under a nitrogen stream and reacted for 5 hours, whereby hydroboration was achieved. An aqueous sodium hydroxide solution and hydrogen peroxide water were then added to oxidize the terminal double bond, and the oligopropylene containing -OH groups at both ends thereof (iPP-OH) was synthesized.

Example 2-2

Styrene Dimer (SD-OH) and Trimer (ST-OH) Containing an OH-Group at a Single End Thereof The styrene dimer (SD) and trimer (ST-OH) both containing a vinylidene group at a single end thereof as obtained in Example 1-2 were respectively dissolved in distilled THF, a borane THF complex-THF solution was added thereto and it was reacted at 70° C. at stirring for 5 hours. To each of the resulting hydroborated SD and ST THF solutions was added hydrogen peroxide water and sodium hydroxide. Reaction was allowed to proceed at a temperature of 50° C. for 20 hours to give the styrene dimer (SD-OH) and trimer (ST-OH) containing an OH-group at a single end thereof.

The IR spectrum of the obtained SD-OH displayed disappearance of the absorption at around 1650 and 895 cm$^{-1}$ due to the terminal vinylidene group of the starting material and appearance of the broad absorption at around 3400 cm$^{-1}$ due to the —OH group. In addition, the $^1$H-NMR spectrum displayed almost complete disappearance of the signal at around 5.0-5.5 ppm due to the terminal vinylidene group as found in the starting SD and appearance of a signal at around 3.5-4.0 ppm due to the methylene adjacent to a hydroxyl group. Hydroxylation progressed almost quantitatively.

Example 2-3

Oligopropylene Containing —OH Groups at Both Ends Thereof (iPP-OH)-2

The oligopropylene containing vinylidene groups at both ends thereof (iPP-VD) obtained in Example 1-3 was dispersed in THF as solvent, to which was added dropwise BH$_3$-THF complex. After hydroboration was carried out under a nitrogen gas atmosphere, oxidation with an aqueous NaOH solution and hydrogen peroxide water converted the terminal vinylidene group to a hydroxyl group, affording the oligopropylene containing —OH groups at both ends thereof (iPP-OH)-2.

Example 2-4

Oligopropylene Containing —OH Groups at Both Ends Thereof (iPPv-OH)

Isotactic polypropylene was subjected to the highly controlled thermal decomposition to give a propylene oligomer containing vinylidene double bonds at both ends thereof (n=34) and having a number-average molecular weight of 1.43×10$^3$, polydispersity of 1.11. The oligopropylene containing —OH groups at both ends thereof was dispersed in tetrahydrofuran (THF), and upon addition of a THF solution of BH$_3$.THF complex, it was hydroborated. An aqueous sodium hydroxide solution and hydrogen peroxide water were then added to oxidize the terminal double bonds at both ends, and the oligopropylene containing —OH groups at both ends thereof (iPPv-OH) was synthesized.

Example 2-5

Oligopropylene Containing —OH Groups at Both Ends Thereof (sPPv-OH)

Syndiotactic polypropylene was subjected to the highly controlled thermal decomposition to give a propylene oligomer containing vinylidene double bonds at both ends thereof and having a number-average molecular weight of $4.84 \times 10^3$ (as converted to polystyrene), polydispersity of 1.43, and a terminal vinylidene double bond number ($f_{TVD}$) per molecule of about 1.73. The propylene oligomer containing vinylidene groups at both ends thereof was dispersed in tetrahydrofuran (THF), and upon addition of a THF BH$_3$.THF complex solution, it was hydroborated. An aqueous sodium hydroxide solution and hydrogen peroxide water were then added to oxidize the terminal double bonds at both ends, and the oligopropylene containing —OH groups at both ends thereof (sPPv-OH) was synthesized.

Example 3

Maleic Acid Modification of Terminal Vinylidene Double Bond

Example 3-1

Oligo(1-butene) with a Terminal Maleic Acid Modification (1-PB-MA)

The molar ratio of the oligo(1-butene) containing a terminal vinylidene group with $M_n$ of 3000 as obtained in Example 1-1/maleic anhydride/butylhydroxytoluene(BHT) was set at 1/10/0.5 and reaction was allowed to proceed in decahydronaphthalene as solvent at 180° C. for 24 hours under a nitrogen gas atmosphere. After the reaction was complete, the reaction solution was poured into acetone with being filtered while hot. The resulting precipitate was suction-filtered and dried at reduced pressure.

In the IR spectrum of the product obtained above, the absorption peak due to the terminal vinylidene group of the starting oligo(1-butene) containing a terminal vinylidene group was disappeared and an absorption peak due to acid anhydride was newly observed. This confirmed that the reaction product was oligo(1-butene) with a terminal maleic acid modification (1-PB-MA). The IR spectrum of the oligo(1-butene) with a terminal maleic acid modification (1-PB-MA) is shown in FIG. 1.

Example 3-2

Oligopropylene with a Terminal Maleic Acid Modification (iPP-MA)-1

The oligopropylene containing vinylidene groups at both ends thereof from the same lot used for Example 2-1/maleic anhydride/butylhydroxytoluene(BHT) was allowed to react at a molar ratio of 1/42/1.68 in decahydronaphthalene as solvent at 190° C. for 24 hours. The reaction mixture was filtered while hot and reprecipitated in acetone. Suction filtration and drying at reduced pressure produced iPP-MA.

Example 3-3

Oligopropylene with a Terminal Maleic Acid Modification (iPP-MA)

Isotactic polypropylene was subjected to the highly controlled thermal decomposition to give an oligopropylene containing vinylidene bonds at both ends thereof (n=38) and having a number-average molecular weight ($M_n$) of 1600, polydispersity of ($M_w/M_n$) of 1.73, and an average terminal vinylidene double bond number ($f_{TVD}$) of 1.78. The molar ratio of the oligopropylene/maleic anhydride/antioxidant was set at 1/42/1.68 and reaction was allowed to proceed in decahydronaphthalene as solvent at 190° C. for 24 hours under a nitrogen atmosphere with stirring maintained. After the reaction was complete, the reaction solution was poured into acetone with being filtered while hot to precipitate polymer. This polymer was filtered and separated and dried at reduced pressure to give the oligopropylene with a maleic acid modification (iPP-MA).

Example 4

Synthesis of Functional Substances

Example 4-1

Oligopropylene Containing Perfluoroalkyl Groups at Both Ends Thereof (iPP-DRF8)

iPP-OH-1 synthesized in Example 2-1 and n-C$_8$F$_{17}$COOH (RF8) were allowed to react for 2 hours in toluene as solvent in the presence of p-toluenesulfonic acid as catalyst at reflux with the removal of the water being formed. After the reaction was complete, the reaction product was precipitated by methanol, filtered and collected, and dried at reduced pressure to give the product.

In the IR spectrum of the product, the peak belonging to the —OH group found in the spectrum of the starting iPP-OH was disappeared and new peaks belonging to ester and perfluoroalkyl groups were noted. This confirmed that the product was the oligopropylene containing perfluoroalkyl groups at both ends thereof (iPP-DRF8) the terminal —OH group of which had been esterified with n-C$_8$F$_{17}$COOH (RF8). Both $^1$H-NMR and $^{13}$C-NMR spectra also proved iPP-DRF8.

Figure 9:
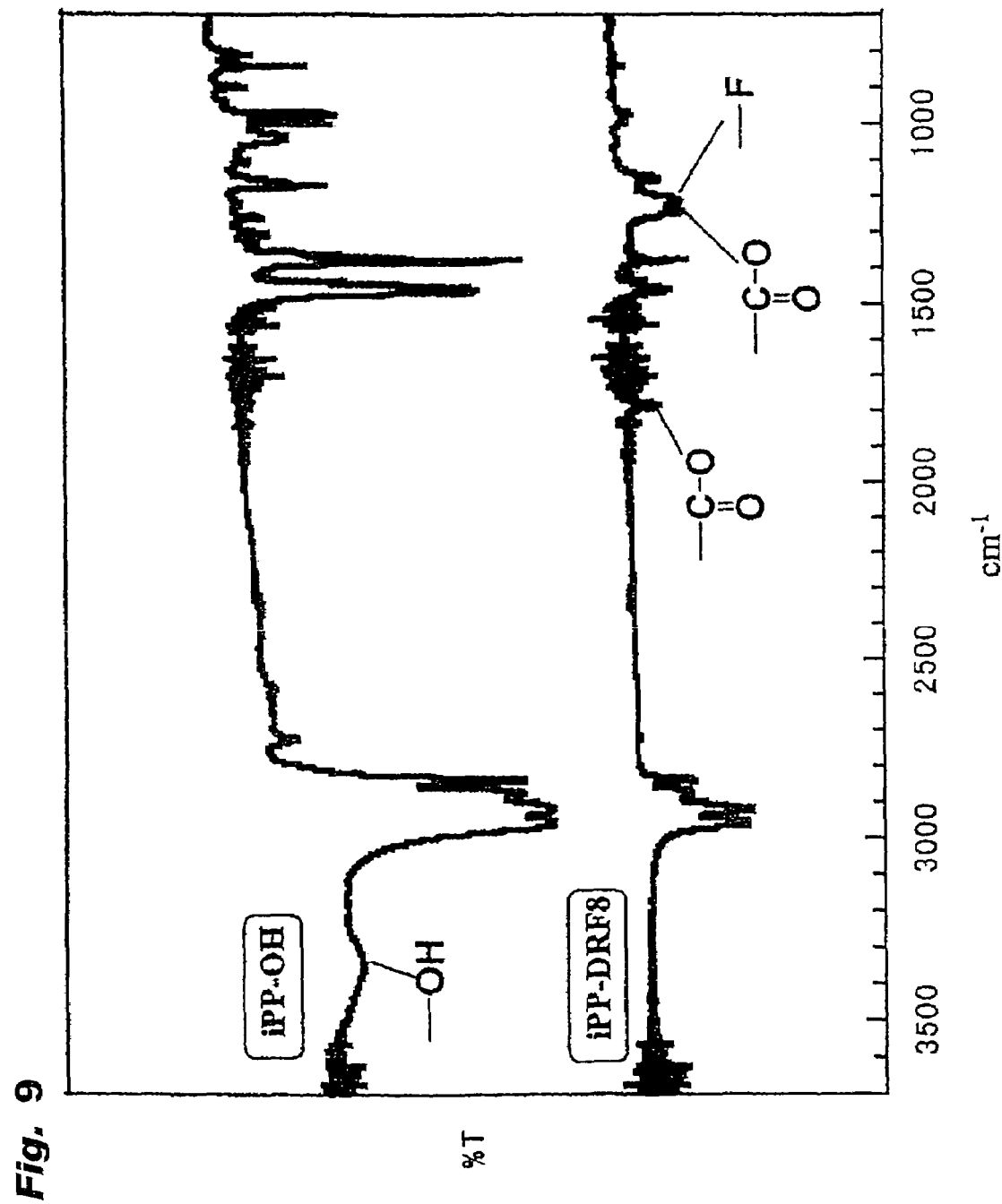
FIG. 9 shows IR spectra of iPP-OH synthesized in Example 2-1 and iPP-DRF8 synthesized in Example 4-1.
Figure 10:
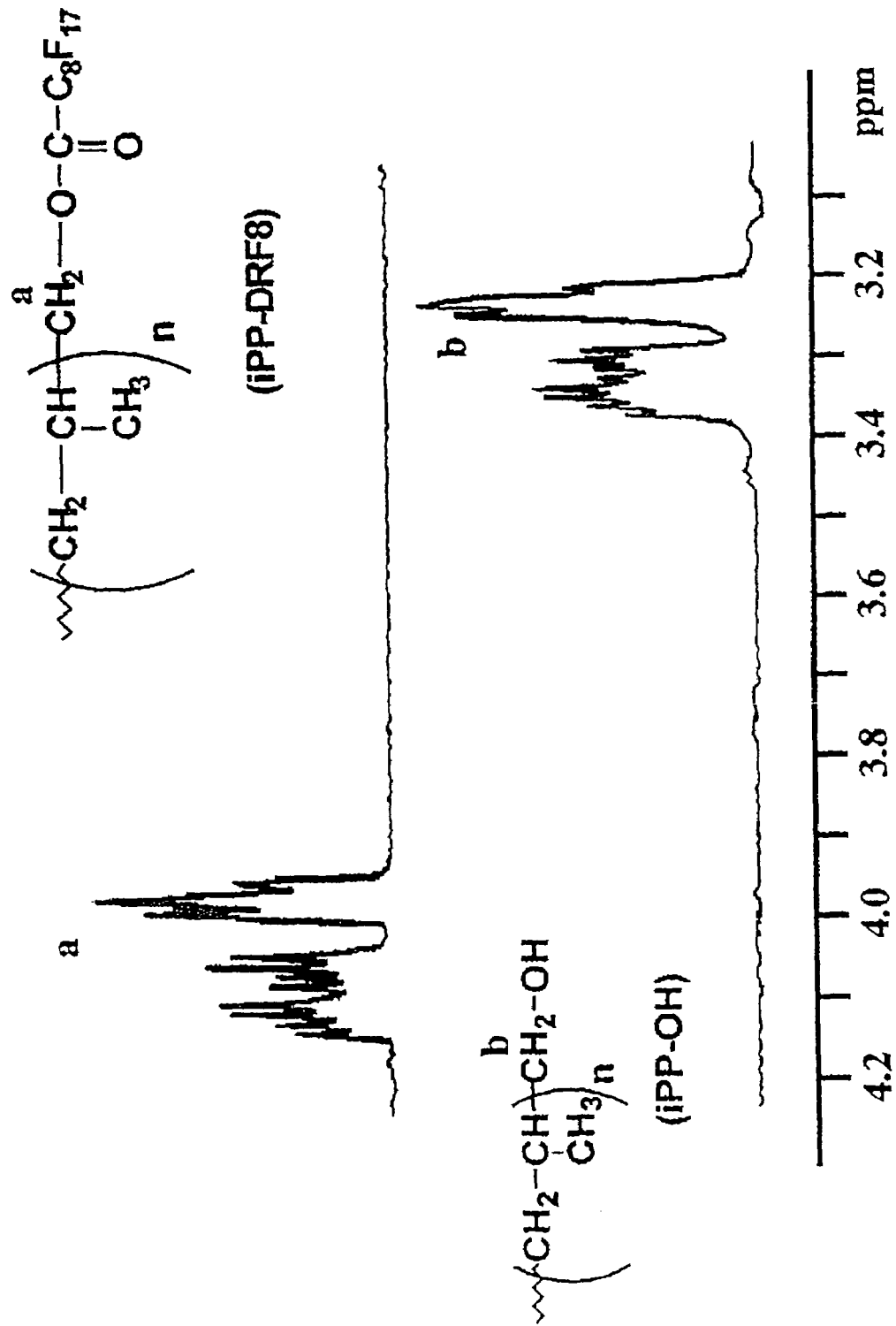
FIG. 10 shows $^1$H-NMR spectra of the iPP-OH synthesized in Example 2-1 and the iPP-DRF8 synthesized in Example 4-1.
Figure 11:
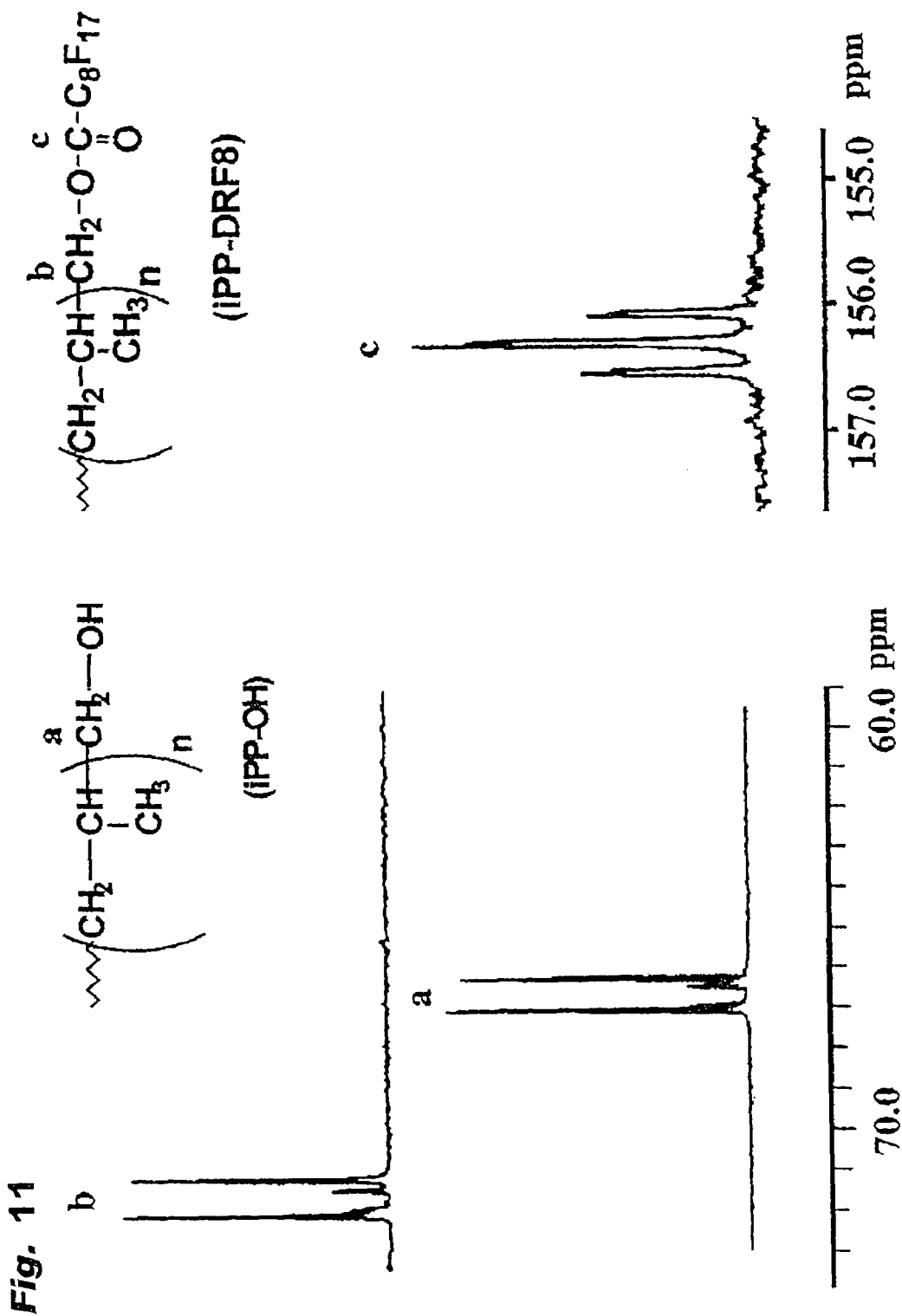
FIG. 11 shows $^{13}$C-NMR spectra of the iPP-OH synthesized in Example 2-1 and the iPP-DRF8 synthesized in Example 4-1.

FIG. 9 shows the IR spectra of iPP-OH used and iPP-DRF8 formed. FIGS. 10 and 11 show $^1$H-NMR and $^{13}$C-NMR spectra, respectively.

Example 4-2

Oligopropylene Containing Perfluoroalkyl Groups at Four Ends Thereof (iPP-TCRF8)

iPP-MA-1 synthesized in Example 3-2 and threefold molar (per one carbonyl) equivalents of n-C$_8$F$_{17}$CH$_2$OH (CRF8) were allowed to react for 6 hours in toluene as solvent in the presence of p-toluenesulfonic acid as catalyst at reflux with the removal of the water being formed. After the reaction was complete, the reaction product was precipitated by methanol, filtered and collected, and dried at reduced pressure to give the product.

In the IR spectrum of the product, the peaks due to maleic anhydride found in the spectrum of the starting iPP-MA were disappeared and new peaks due to ester and perfluoroalkyl groups were noted. This confirmed that the product was the oligopropylene containing perfluoroalkyl groups at four ends thereof (iPP-TCRF8) the terminal MA group of which had been esterified with n-$C_8F_{17}CH_2OH$ (CRF8). Both $^1$H-NMR and $^{13}$C-NMR spectra also proved iPP-TRCF8.

Figure 12:
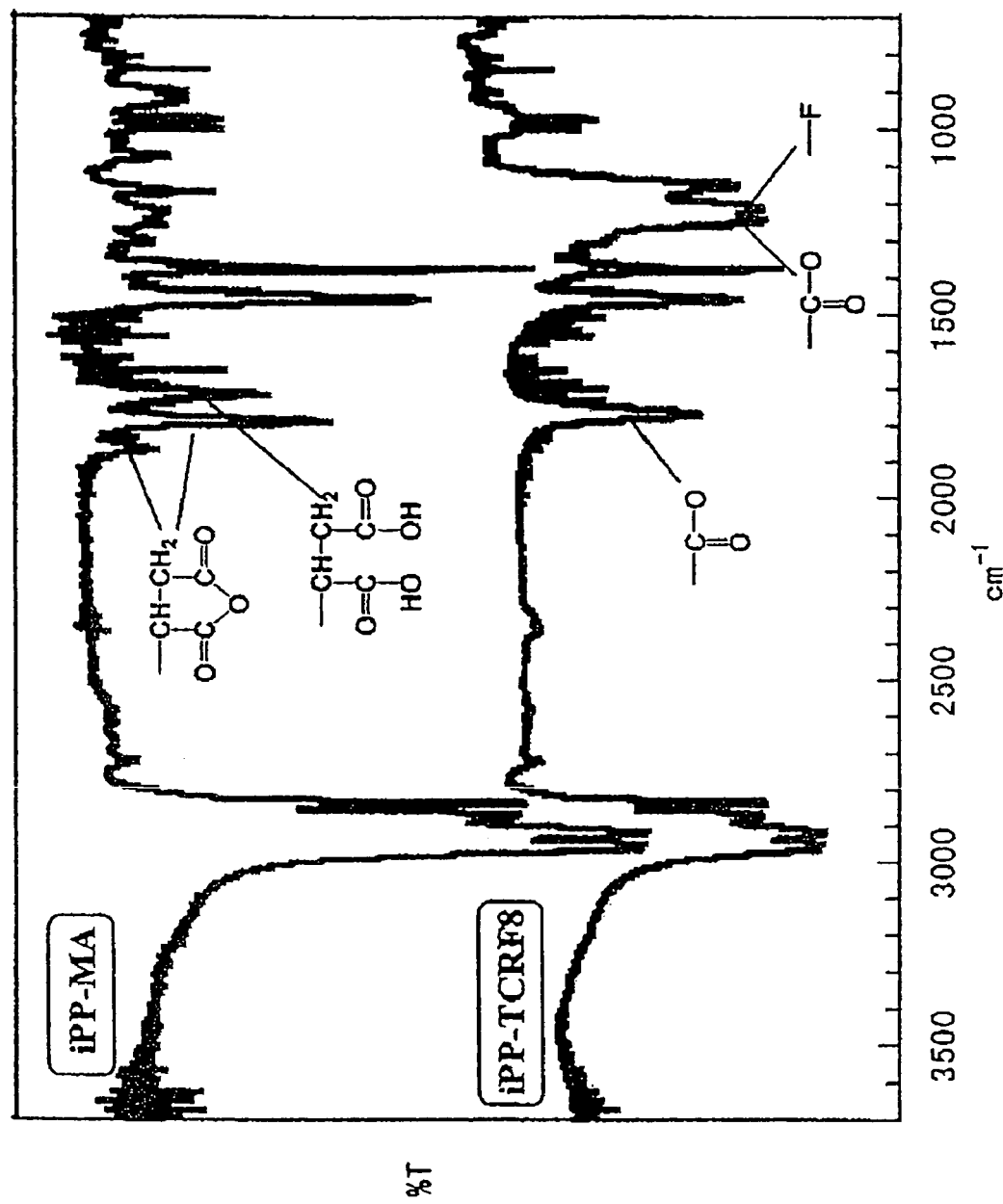
FIG. 12 shows IR spectra of iPP-MA synthesized in Example 3-2 and iPP-TCRF8 synthesized in Example 4-2.
Figure 13:
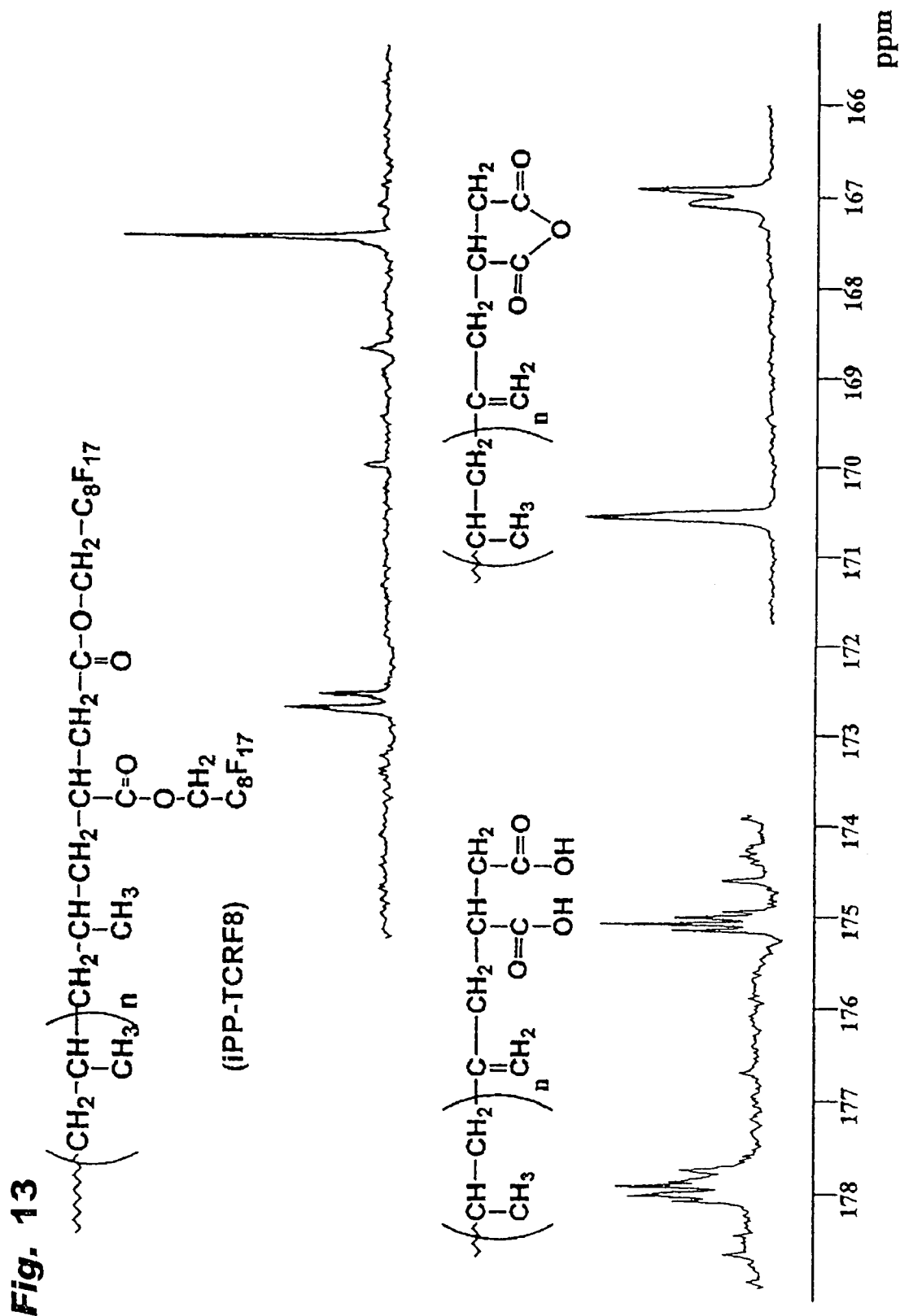
FIG. 13 shows $^{13}$C-NMR spectra of the iPP-MA synthesized in Example 3-2 and the iPP-TCRF8 synthesized in Example 4-2.
Figure 14:
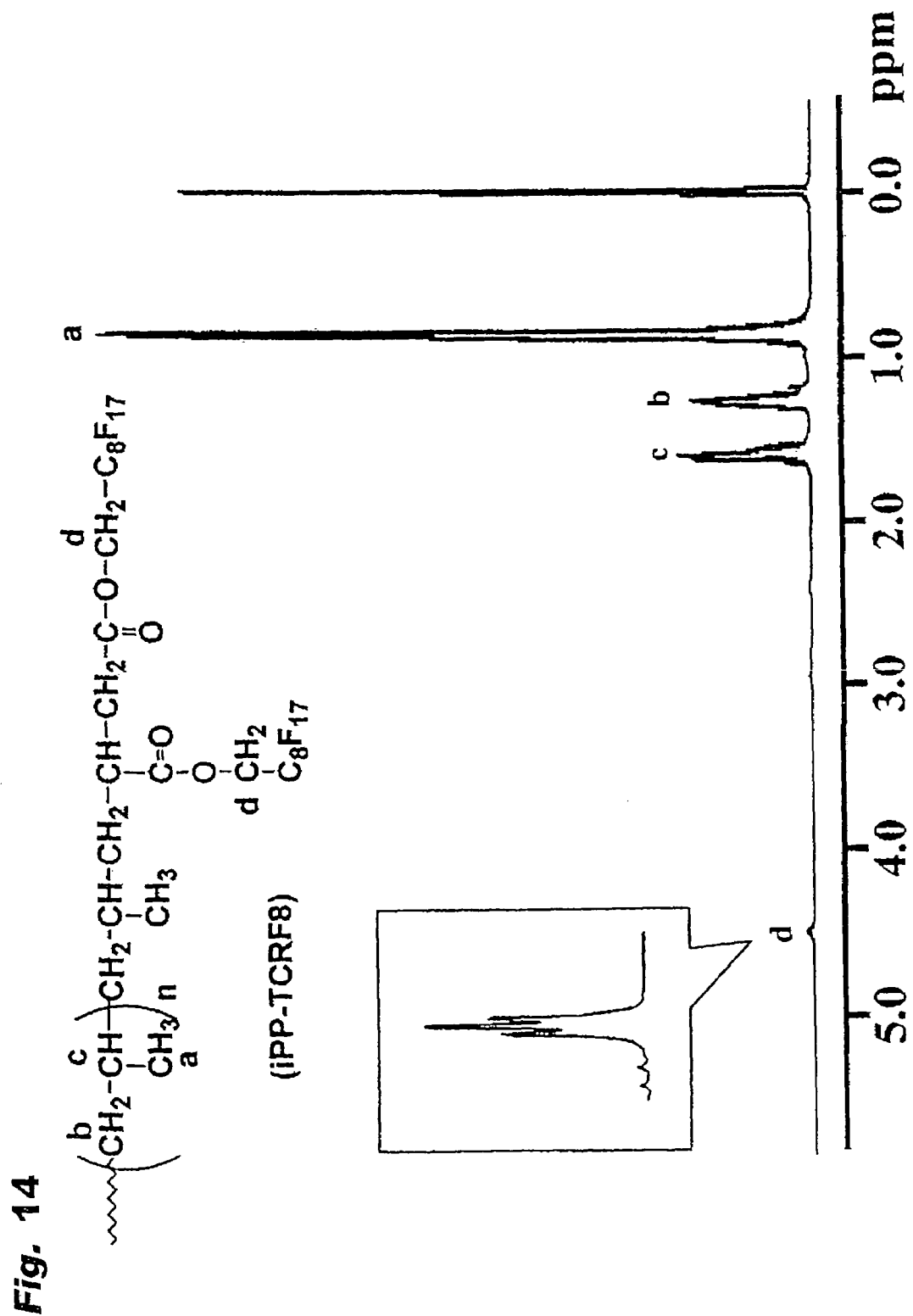
FIG. 14 shows a $^1$H-NMR spectrum of the iPP-TCRF8 synthesized in Example 4-2.

FIG. 12 shows the IR spectra of iPP-MA-1 used and iPP-TCRF8 formed and FIG. 13 shows their $^{13}$C-NMR spectra. FIG. 14 shows the $^1$H-NMR spectrum of iPP-TCRF8.

Example 4-3

Oligopropylene Containing Perfluoroalkyl Groups at Two Ends Thereof (iPP-DCRF8)

[4-3-1] Except that the reaction medium toluene in Example 4-2 was substituted with benzene for use and the reaction temperature was lowered, reaction was carried out under the same conditions as those for Example 4-2.

[4-3-2] Except that benzene was used as the reaction medium and twofold molar (per one carbonyl of iPP-MA-1) equivalents of n-$C_8F_{17}CH_2OH$ (CRF8) was used, reaction was carried out similarly to Example 4-2.

[4-3-3] Except that reflux was conducted throughout without water removal during reaction, reaction was carried out similarly to Example 4-3-1.

The results of reaction together with the results from Example 4-2 are shown in Table 1.

TABLE 1

| Example No. | solvent | reaction time (hr) | CRF8/iPP-MA (mol/mol) | percent conversion(%) |
|---|---|---|---|---|
| 4-2 | toluene | 6 | 12 | 100.0 |
| 4-3-1 | benzene | 6 | 12 | 65.5 |
| 4-3-2 | benzene | 6 | 2 | 19.3 |
| 4-3-3 | benzene | 6 | 12 | 9.6 |

The results in Table 1 indicate that the terminal carboxyl group can be retained unreacted by the selection of the combination of reaction conditions such as reaction medium, reaction temperature, reaction molar ratio and dehydration conditions during reaction. It is then possible to introduce into the retained carboxyl group, a group having a different function (e.g., a poly(oxyalkylene) group having hydrophilicity) according to the purpose.

Example 4-4

Oligostyrene Containing a Perfluoroalkyl Group at a Single End Thereof (SD-PEO-Rf and ST-PEO-Rf)

[Ring-Opening Polymerization of Ethylene Oxide]

To the styrene dimer (SD-OH) and trimer (ST-OH) containing an —OH group at a single end thereof as obtained in Example 2-2 were added a sodium methoxide-methanol solution as a polymerization initiator and distilled toluene as solvent. Ethylene oxide (EO) was added dropwise at 130° C. under a nitrogen atmosphere while the internal pressure was controlled; and SD-PEO-1, SD-PEO-2 and ST-PEO were respectively produced as samples.

The results are summarized in Table 2.

TABLE 2

| sample | charged amount S-OH | charged amount EO | molar ratio | yield (wt %) | Mn ($M_w/M_n$) | molar ratio of polymer styrene monomer:EO |
|---|---|---|---|---|---|---|
| SD-PEO-1 | 5.0 g | 5.0 g | 1:5 | 40 | 480 (1.13) | 2:5 |
| SD-PEO-2 | 5.0 g | 10.5 g | 1:10 | 61 | 930 (1.11) | 2:17 |
| ST-PEO | 5.0 g | 5.0 g | 1:7 | 73 | 970 (.15) | 3:29 |

It was found out from the GPC measurement of each sample that each of SD-PEO-1, SD-PEO-2 and ST-PEO showed a large increase in molecular weight as compared to the starting materials (SD-OH and ST-OH).

SD-PEO-1 displayed elution peaks at around Mn: 1500 and Mn: 400, and at around Mn: 220 which was believed to be the staring SD-H. The elution peaks at around Mn: 1500 and Mn: 400 were separated by recycle type GPC and structurally analyzed with IR spectroscopy. Consequently, the elution peak at around Mn: 1500 can be ascribed to PEO homopolymer that had been generated from the initiation point of the —OH group of methanol used as the solvent for sodium methoxide and the elution peak at around Mn: 400 can be ascribed to SD-PEO.

SD-PEO-2 similarly displayed a peak of PEO homopolymer at around Mn: 2800, a peak of SD-PEO at around Mn: 900 and a peak of SD-OH at around Mn: 220; and they were separated and purified.

SD-PEO similarly displayed a peak of ST-PEO at around Mn: 970 and a peak of SD-OH at around Mn: 320; and they were separated and purified.

Based on the respective IR spectroscopic measurements of PEO homopolymer and SD-PEO-1, the peak presumably ascribed to PEO homopolymer was separated in SD-PEO-1 and analyzed. Consequently, absorption at around 1100 $cm^{-1}$ due to an ester linkage clearly appeared and absorption at around 1800-2000 $cm^{-1}$ due to the phenyl group of a styrene unit notably decreased. The peak presumably ascribed to SD-PEO-1 was also separated and analyzed. The result was, on the contrary, that the absorption at around 1100 $cm^{-1}$ due to the ester linkage clearly appeared and the absorption at around 1800-2000 $cm^{-1}$ due to the phenyl group of a styrene unit did not decrease notably. In addition, similar results were obtained with SD-PEO-2 and ST-PEO. This has ascertained that the objective copolymers were synthesized.

Figure 15:
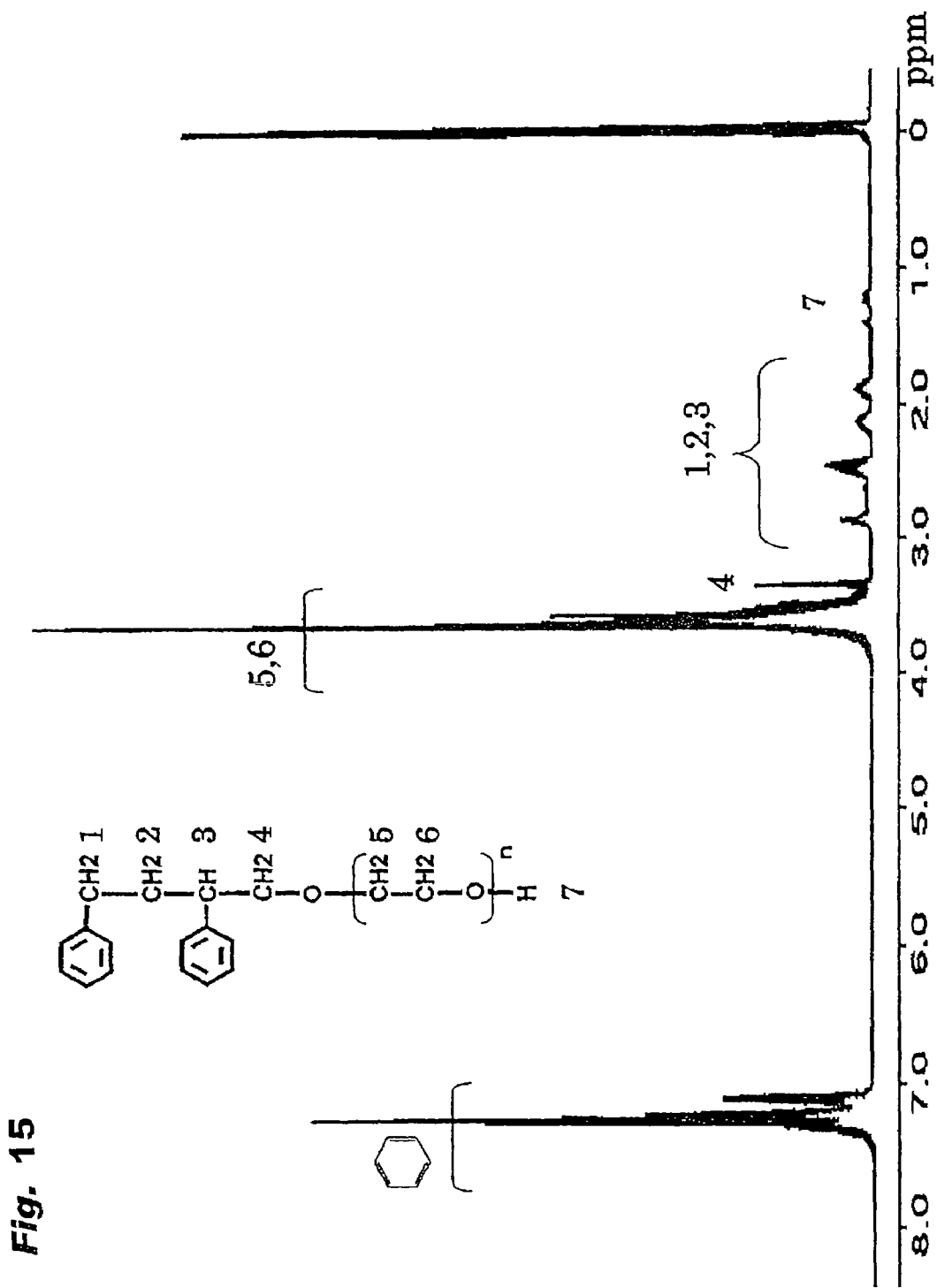
FIG. 15 shows a $^1$H-NMR spectrum of SD-PEO-1 synthesized in Example 4-4.

FIG. 15 shows the $^1$H-NMR spectrum of SD-PEO-1. There were appeared signals due to the aliphatic portion of a styrene monomer unit at around 1.5-3 ppm, peaks due to the styrene monomer unit adjacent to the ether linkage at around 3.5 ppm, signals due to the aromatic portion of the styrene monomer unit and peaks due to an EO monomer unit, respectively.

The molar composition ratio of styrene monomer unit to EO monomer unit was calculated from the integration intensities in the $^1$H-NMR spectrum, providing 2:5. Similar results to those for SD-PEO-1 were obtained for SD-PEO-2 and ST-PEO. The molar composition ratio of styrene monomer unit to EO monomer unit was 2:17 for SD-PEO-2 and 3:29 for ST-PEO. The foregoing has ascertained that the objective copolymers were synthesized.

Surface Tension Measurement in Copolymer Aqueous Dispersions

Aqueous dispersions of each synthesized polymer were prepared so as to provide concentrations of from $10^{-4}$(g/L) to 0.5(g/L), and they were measured using a fully automated surface tension measuring device according to the plate method (automated surface tensiometer CBVP-Z available from Kyowa Surface Science Co. Ltd.)

Figure 16:
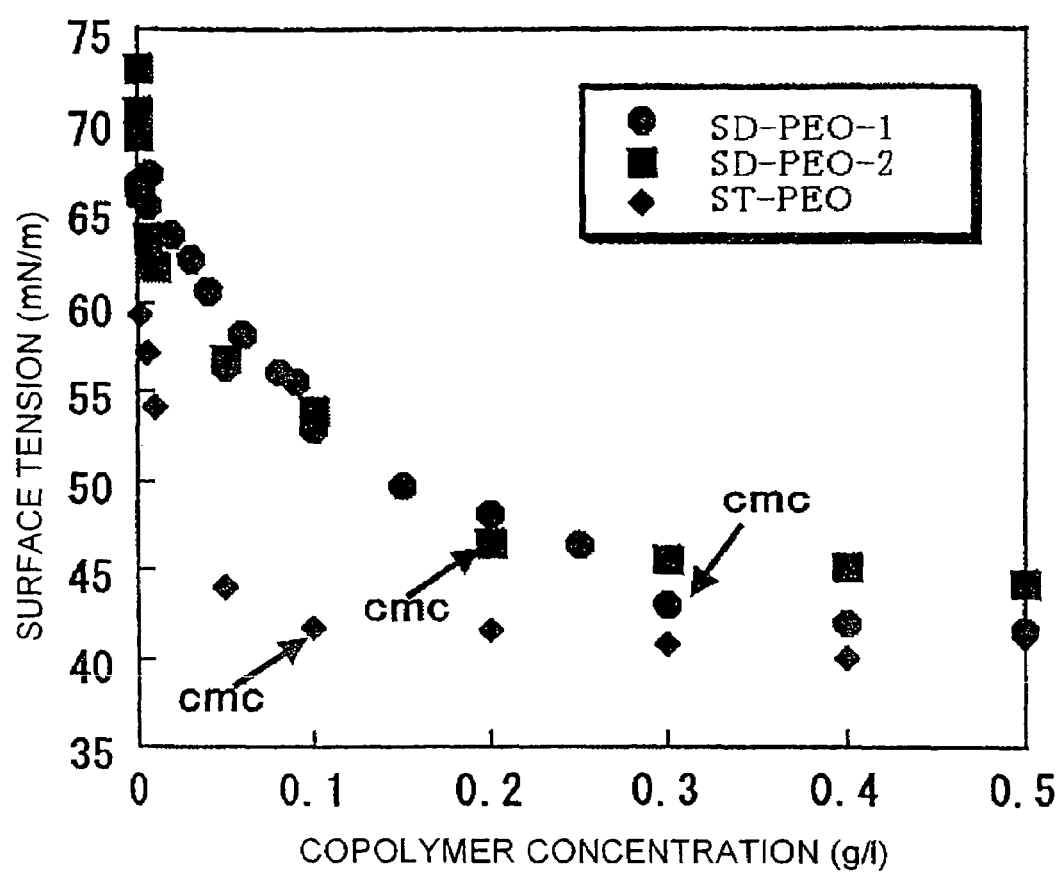
FIG. 16 shows curves representing surface tension/copolymer concentration for the SD-PEO samples obtained in Example 4-4.

FIG. 16 shows the concentration-dependency of surface tension of the respective copolymer aqueous dispersions. In each copolymer the surface tension decreased as the concentration increased. The presence of critical micelle concentration (CMC) was confirmed at 0.3 g/L in SD-PEO-1, at 0.2 g/L in SD-PEO and at 0.1 g/L in ST-PEO. When a comparison was made between SD-PEO-1 and SD-PEO-2 which are at a similar level in the styrene monomer unit, it is understood that the one more abundant in EO unit per molecule has superior ability to lower surface tension in the low concentration region. When a comparison was made between SD-PEO-2 and ST-PEO which are at a similar level in the compositional ratio of the respective monomer units, it is understood that the one more abundant in styrene unit has superior ability to lower surface tension in the low concentration region.

These indicate that the compositional ratio of the respective monomer units affects the ability to lower surface tension.

Micellar Particle Size Measurement in Copolymer Aqueous Dispersions

Aqueous dispersions of each synthesized polymer were prepared so as to provide concentrations of from 0.1 g/L to 0.5(g/L), and they were measured using a dynamic light scattering spectrophotometer (DLS7000 series available from Ostuka Electronics Co. Ltd.).

Figure 17:
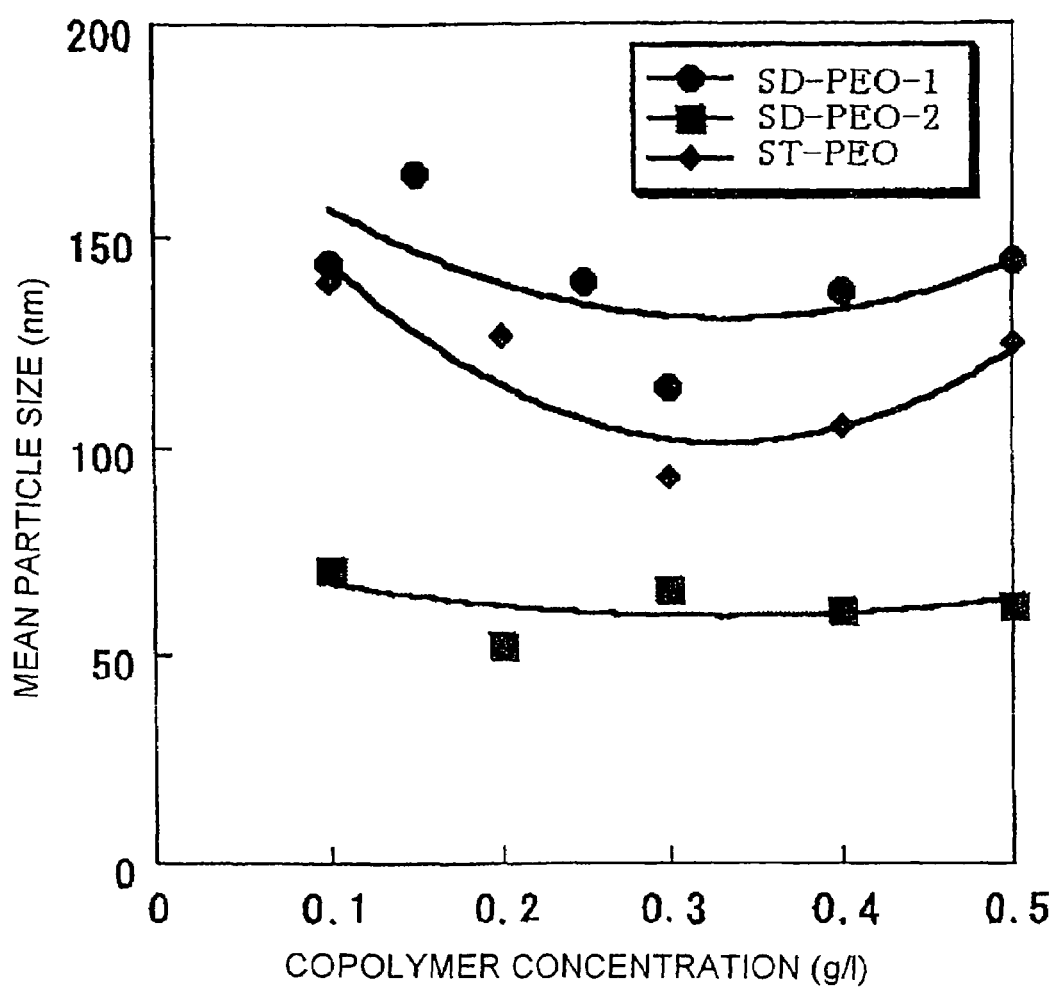
FIG. 17 shows curves representing micellar mean particle size/copolymer concentration for the SD-PEO samples obtained in Example 4-4.
Figure 18:
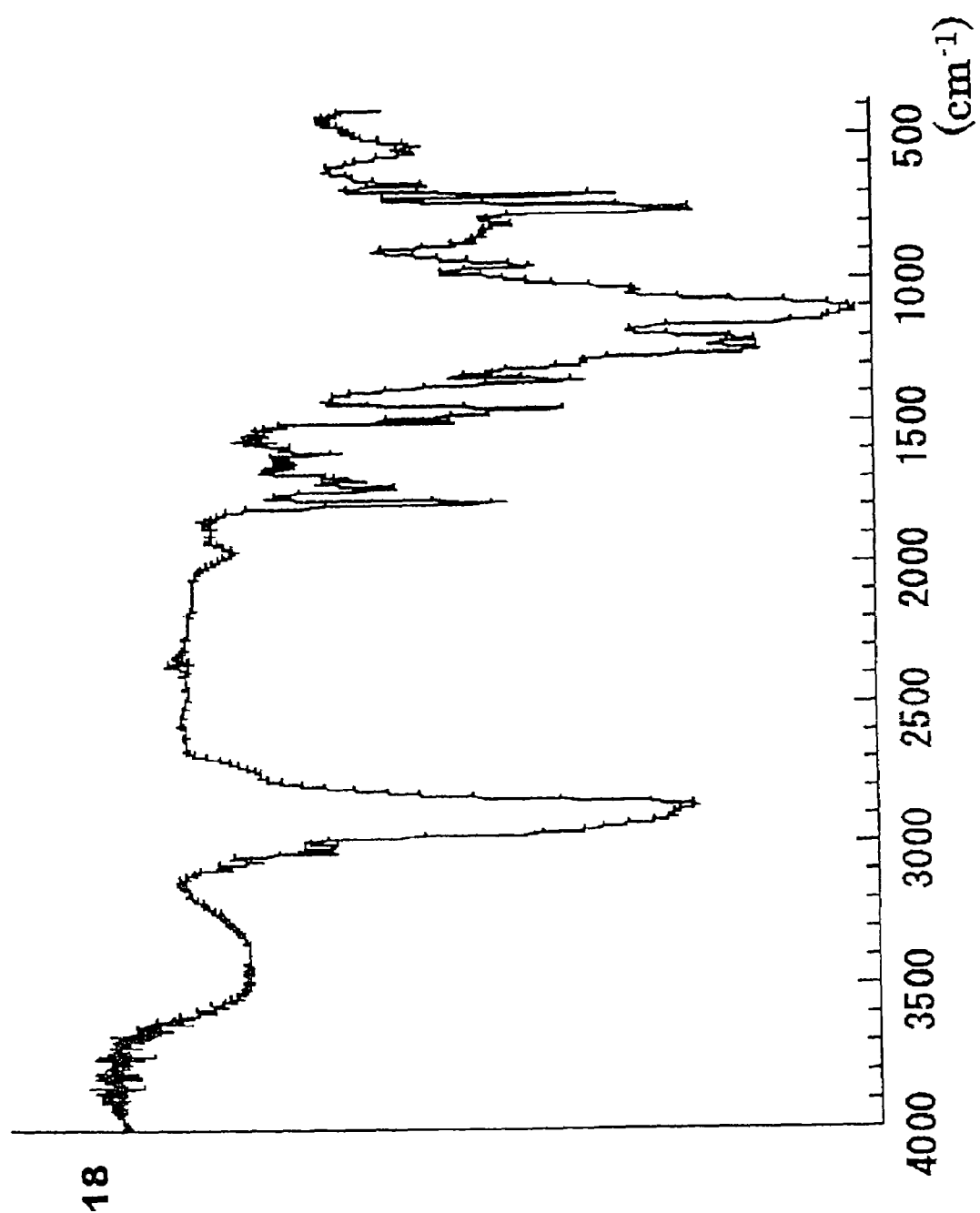
FIG. 18 shows an IR spectrum of the SD-PEO-Rf obtained in Example 4-4.

FIG. 17 shows the concentration-dependency of the mean particle size of micelle of the respective copolymer aqueous dispersions. In each copolymer the particle size decreased but turned to increase past CMC as the concentration increased. The average micellar particle sizes in the respective copolymer dispersions are about 140 nm for SD-PEO-1, about 70 nm for SD-PEO-2, and about 130 nm for ST-PEO. It is thus thought that very large molecular aggregates have formed since their particle sizes are 27 times, 5 times and 6 times the elongated segment of each copolymer molecule. Based on the results from particle size measurement it is thought that the formed molecular aggregate is not a simple micellar structure but a very large one formed, since the hydrophobic interaction of the styrene units serves as a factor to make hydrophilic groups and hydrophobic groups overlap many folds. The structure is believed to be a bimolecular layer or a greater multi-molecular layer form.

Styrene Dimer Containing a Terminal Perfluoroalkyl Group (SD-PEO-Rf)

Esterification between SD-PEO prepared separately and shown in Table 3 and a perfluoroalkylcarboxylic acid (Rf-COOH) of from 7 to 18 carbon atoms was carried out to esterify the terminus of SD-PEO with the perfluoroalkyl group, producing the styrene dimmer containing a terminal perfluoroalkyl group. The reaction proceeded nearly quantitatively.

The SD-PEO used was such that its Mn was $0.91 \times 10^3$ and its $M_w/M_n$ was 1.09.

The IR spectrum of SD-PEO displayed clear appearance of absorption due to an ether linkage at around 1100 cm$^{-1}$, its $^1$H-NMR spectrum displayed signals due to an EO monomer unit at around 3.5-4.0 ppm, and its $^{13}$C-NMR spectrum displayed signals due to the styrene monomer unit adjacent to the ether linkage at around 60 ppm, respectively. The molar composition ratio of the styrene monomer unit to the EO monomer unit was 2:17.

TABLE 3

| sample | $M_n$ | $M_w/M_n$ |
|---|---|---|
| SD | 210 | 1.01 |
| SD-OH | 230 | 1.06 |
| SD-PEO | 910 | 1.09 |
| SD-PEO-Rf | 1280 | 1.07 |

The molecular weight distribution of the obtained SD-PEO-Rf was unimodal and it was wholly shifted to the high molecular weight side as compared to SD-PEO. As Table 3 shows, its $M_n$ was $1.28 \times 10^3$ and its $M_w/M_n$ was 1.07. In addition, the IR spectrum of SD-PEO-Rf showed a decrease in the broad absorption due to a hydroxyl group at around 3400 cm$^{-1}$, as well as the appearance of absorption peaks due to an ester group at around 1240 and 1780 cm$^{-1}$ and of absorption due to a fluoro group at around 1210 cm$^{-1}$.

Surface Tension

Figure 19:
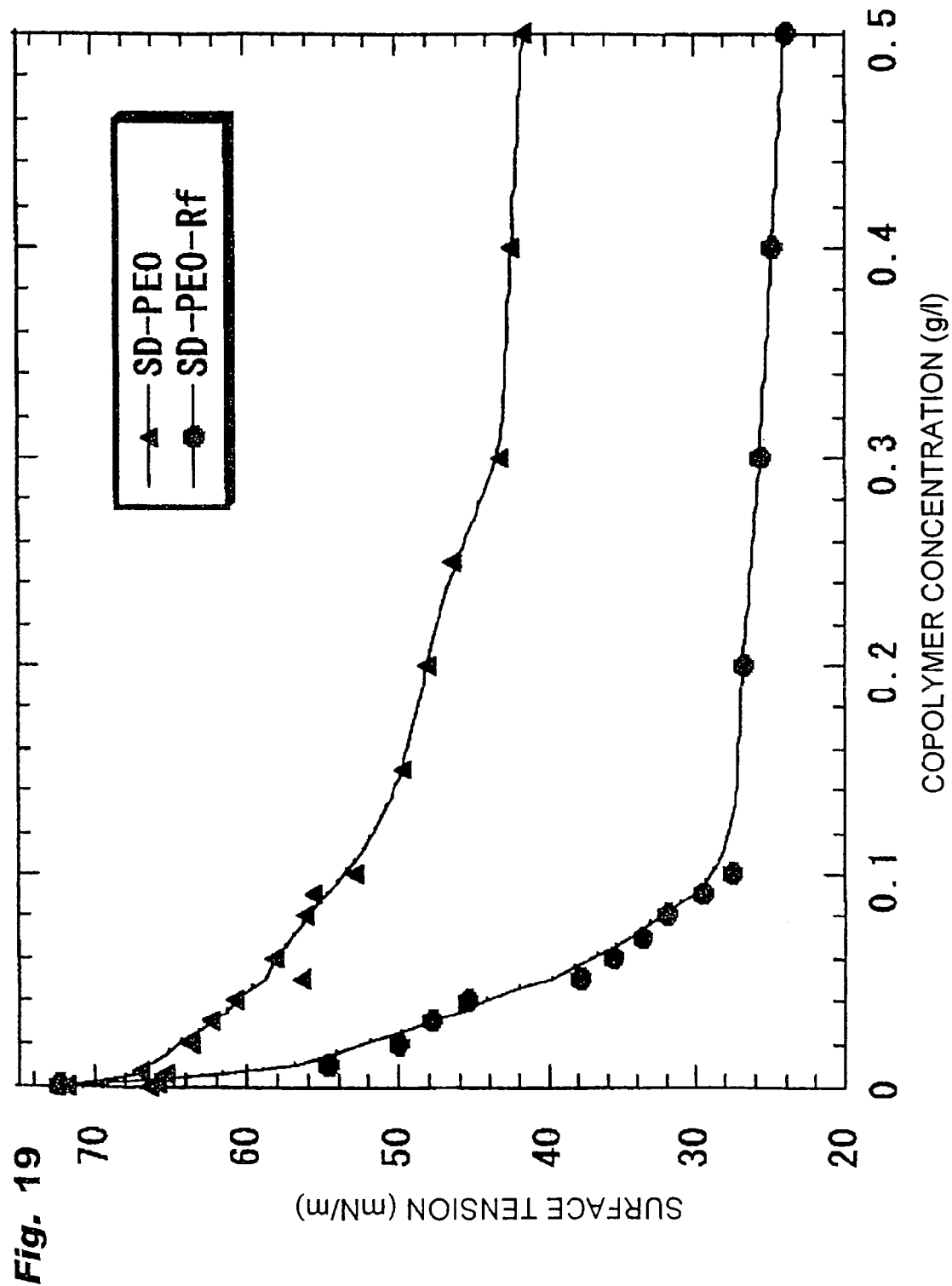
FIG. 19 shows a curve representing surface tension/copolymer concentration for the SD-PEO-Rf sample obtained in Example 4-4.

FIG. 19 shows surface tension of the SD-PEO and SD-PEO-Rf aqueous dispersions. As the concentration increased, the surface tension lowered and the critical micelle concentration (CMC) was confirmed in either case. CMC was in the vicinity of 0.3 g/L for SD-PEO and in the vicinity of 0.1 g/L for SD-PEO-Rf, and their surface tension was about 44 and about 28 mN/m, respectively. Large hydrophobic interaction of the terminal Rf group was noted in lowering the surface tension.

Example 4-5

Oligopropylene/Polyethylene Triblock Copolymer Containing Perfluoroalkyl Groups at Both Ends Thereof (iPP-b-PEO-Rf)

Ring-Opening Polymerization of Ethylene Oxide

To a toluene solution of the oligopropylene containing —OH groups at both ends thereof (iPP-OH-2) as synthesized in Example 2-3 was dispersed sodium methoxide as catalyst. Ethylene oxide per one mole of the olefin polymer was added dropwise at a reaction temperature of 130° C. under a nitrogen atmosphere while the internal pressure was controlled, and reaction was allowed to proceed. After the resulting reaction product was heated under acetone reflux, an acetone soluble component and an acetone insoluble component were separated. Subsequently, polymer was fractionated from the acetone soluble component by recycle type GPC.

The IR spectrum of the obtained polymer displayed the appearance of absorption due to the ether linkage of ethylene oxide at 1100 cm$^{-1}$ and its NMR spectra displayed the appearance of $^1$H signals at 3.5-4.0 ppm and $^{13}$C signals at 70-71 ppm (TMS as standard) due to the methylene of an oxyethylene block. This confirmed that the polymer was a propylene/poly(oxyethylene)triblock copolymer (iPP-b-PEO).

The $^1$H-NMR integration intensity ratio of the obtained triblock polymer was based to calculate the ratio (2p/n) of the propylene unit to the oxyethylene unit, which was 0.86. Further, the number-average molecular weight ($M_n$) by GPC (as converted to polystyrene) was $2.15 \times 10^3$, $M_w/M_n$ was 1.07 and the melting point ($T_m$) by DSC was 104-124° C.

The results of characteristic evaluation of the obtained triblock copolymer (iPP-b-PEO) by GPC, DSC and $^{13}$C-NMR are shown in Table 4 together with the evaluation results of the starting polypropylene (iPP), the oligopropylene containing vinylidene groups at both ends thereof (iPPV) and the oligopropylene containing —OH groups at both ends thereof (iPPOH).

Figure 20:
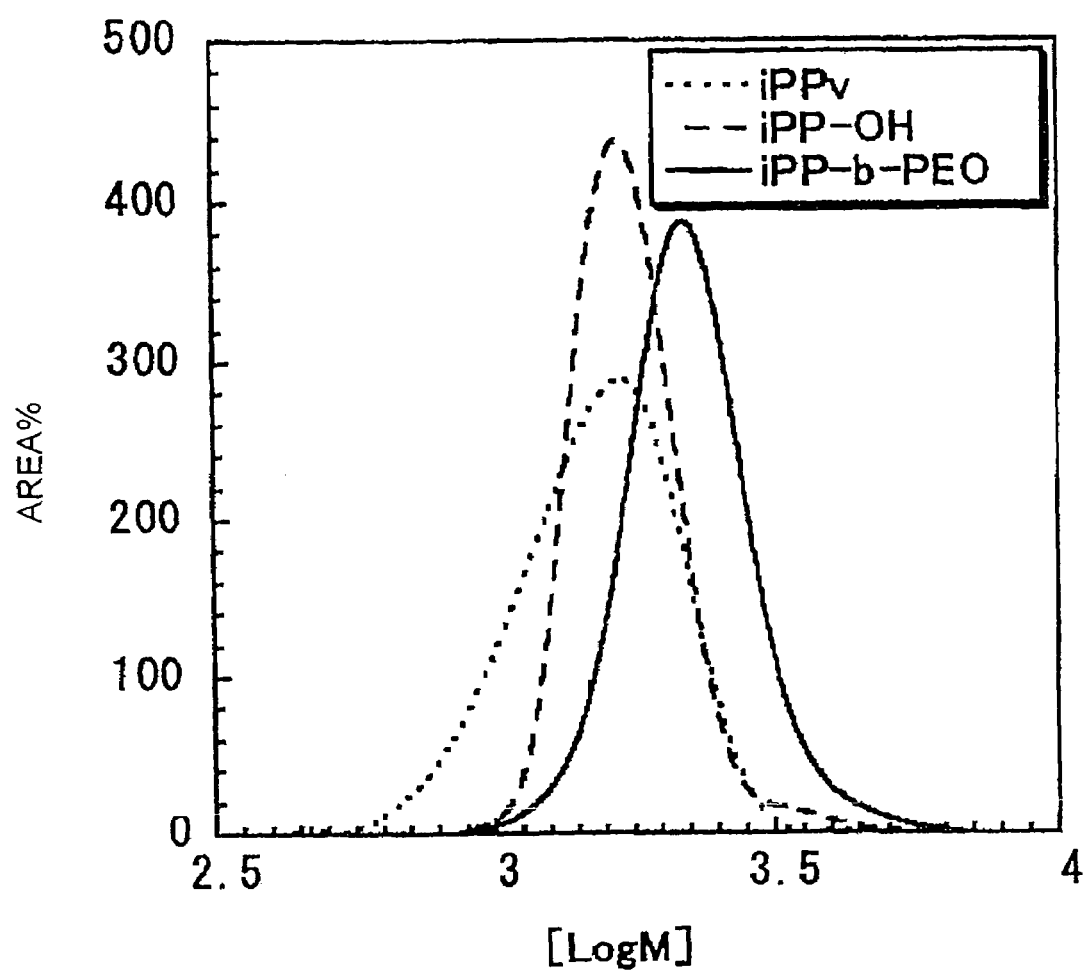
FIG. 20 shows GPLC curves measured in Example 4-5, wherein the solid line represents a triblock copolymer (iPP-b-PEO), the chain line represents a polypropylene containing hydroxyl groups at both ends thereof (iPP-OH) and the dot line represents a polypropylene containing vinyl groups at both ends thereof (iPPv).
Figure 21:
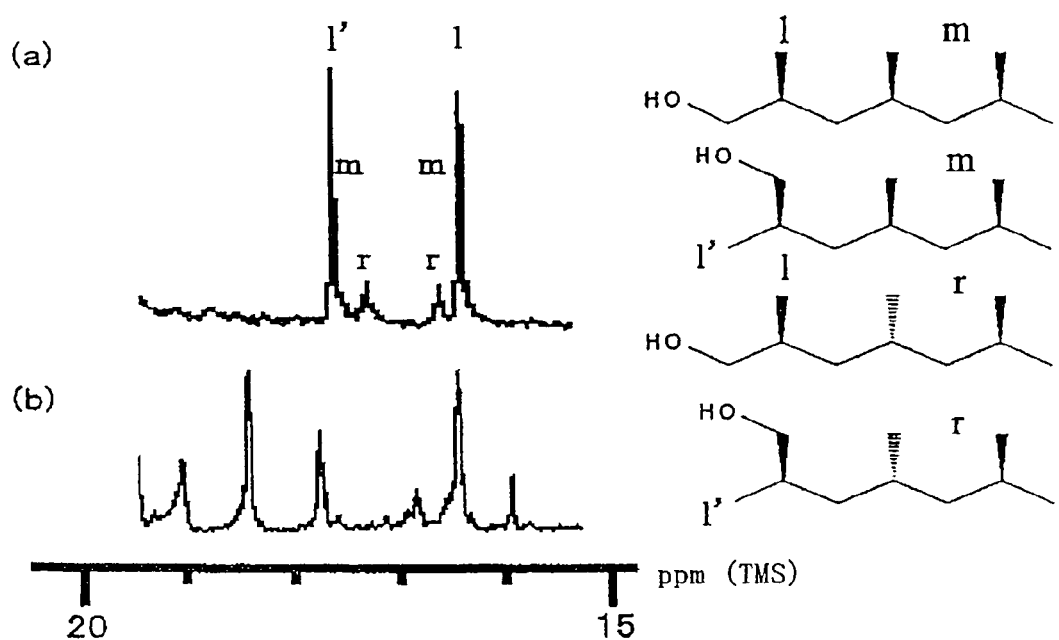
FIG. 21 shows $^{13}$C-NMR spectra obtained in Example 4-6, wherein (a) represents the polypropylene containing hydroxyl groups at both ends thereof (iPP-OH) and (b) represents the triblock copolymer (iPP-b-PEO).

FIG. 20 shows GPC curves of iPP-b-PEO, iPPV and iPPOH; and FIG. 21 shows the $^{13}$C-NMR spectrum of iPP-b-PEO.

TABLE 4

| evaluation sample | Number-average Molecular weight $M_n \times 10^{-3}$ | poly-dispersity $M_w/M_n$ | tacticity mm | tacticity mr | tacticity rr | melting point Tm (° C.) |
|---|---|---|---|---|---|---|
| iPP | 111 | 8.36 | 98 | 1 | 1 | 166 |
| iPPV | 1.43 | 1.11 | 78 | 13 | 9 | 80-105 |
| iPP-OH | 1.70 | 1.05 | 82 | 11 | 7 | 92-119 |
| iPP-b-PEO | 2.15 | 1.07 | 84 | 7 | 9 | 104-124 |

Evaluation for Amphiphilic Substance

In order to make a characteristic evaluation of the triblock copolymer (iPP-b-PEO) as obtained above for an amphiphilic substance, the surface tension of its aqueous diluted solution and its particle size distribution in an aqueous medium were determined.

Figure 22:
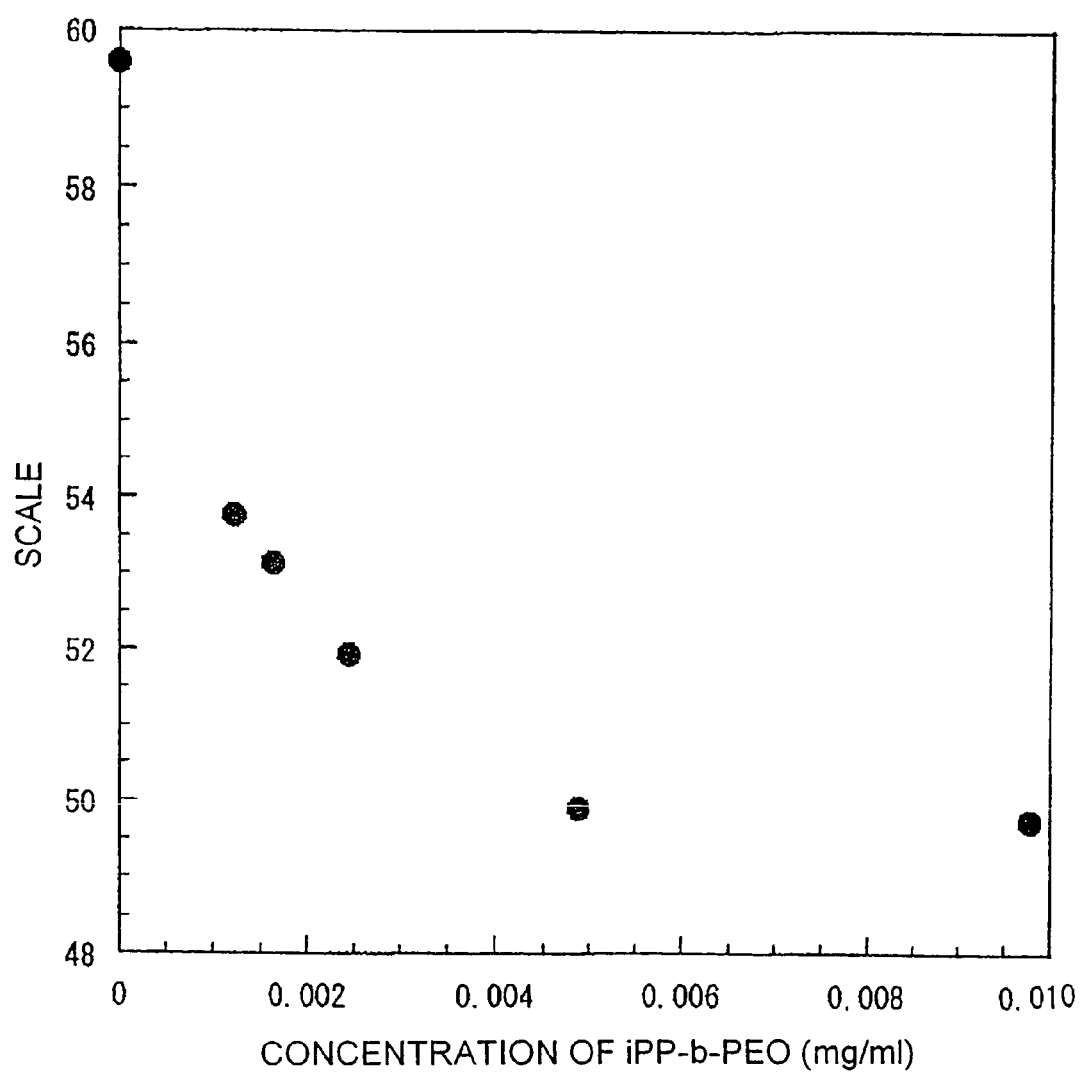
FIG. 22 shows surface tension of a diluted aqueous solution of the triblock copolymer (iPP-b-PEO) obtained in Example 4-6.

Surface tension: a du Nouy tensiometer was used to measure surface tension at 20° C., which is shown in FIG. 22.

In FIG. 22 the vertical axis represents the reading of scale of the tensiometer and the horizontal axis represents the concentration (mg/ml) of the triblock copolymer in an aqueous solution.

The vertical axis in FIG. 22 indicates the surface tension relative to water as standard and displays a large fall in the surface tension of the aqueous solution as a result of a little amount of the triblock copolymer.

Particle size distribution: The particle size distribution of the triblock copolymer dispersant in an aqueous medium was determined at 25° C. according to the cumulant method wherein dynamic light scattering was measured with a He—Ne laser, which is shown in FIG. 23.

Figure 23:
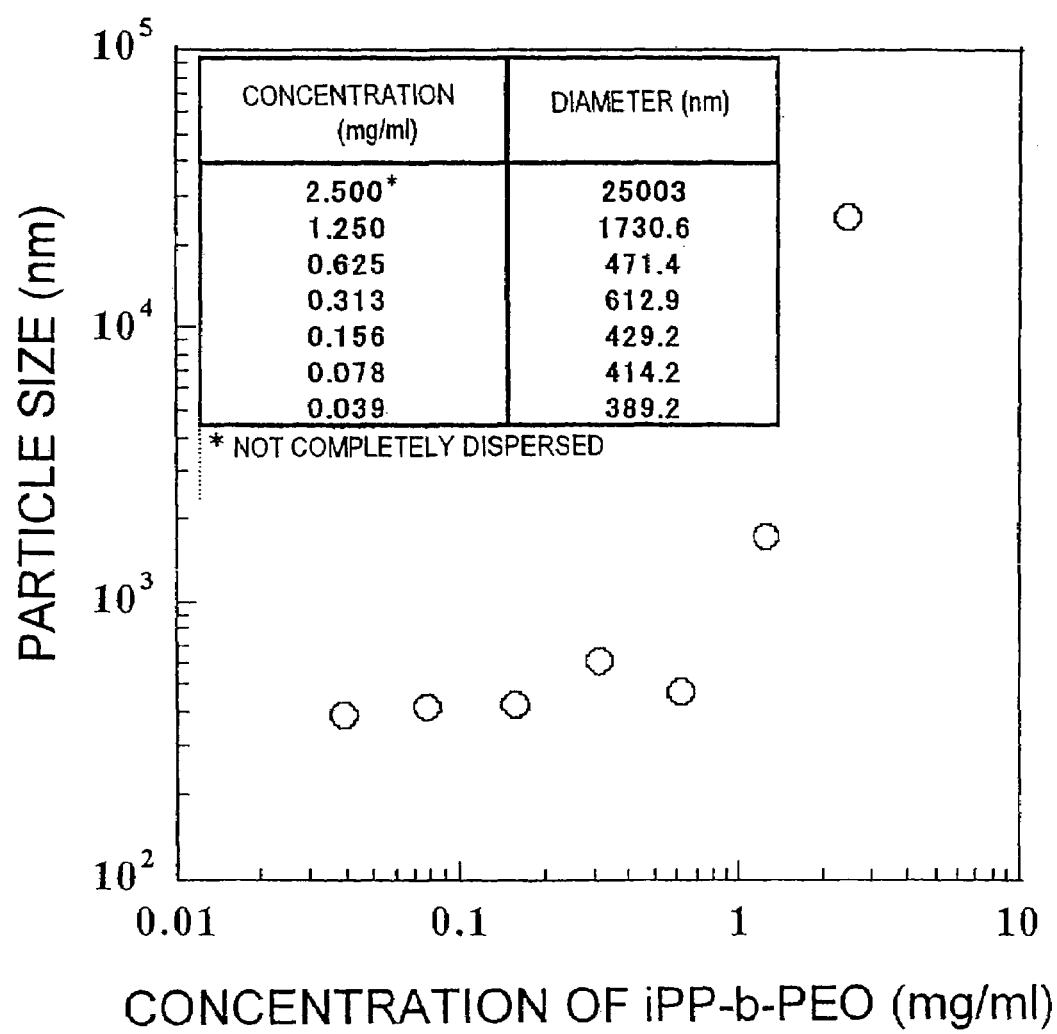
FIG. 23 shows particle size distribution of the triblock copolymer (iPP-b-PEO) in an aqueous medium as measured in Example 4-6.

The results in FIGS. 22 and 23 indicate that the critical micelle concentration (CMC) of the triblock copolymer is approximately 0.04 mg/ml.

Example 4-6

Ring-Opening Polymerization of Oligopropylene/Poly(Oxyethylene)Triblock Copolymer 2 (iPP-b-PEO-Rf)Ethylene Oxide Containing a Perfluoroalkyl Group An eggplant type flask was charged with 1.00 g ($6.5 \times 10^4$ mol) of iPP-b-PEO ($M_n$:1600, $M_w/M_n$:1.20), 1.24 g ($2.7 \times 10^{-3}$ mol) of RfCOOH, 0.01 g ($5.3 \times 10^{-5}$ mol) of p-toluenesulfonic acid (p-TSA) and 20 ml of distilled toluene as solvent (taken so as to give iPP-b-PEO:RfCOOH:p-TSA=1: 4.1:0.08 (molar ratio)). This was further fitted with a water content measuring receiver, a dimroth condenser tube and a nitrogen gas balloon. Reaction was allowed to proceed at a reaction temperature of 140° C. for 12 hours while the water formed was removed out from the reaction system.

After the resulting reaction solution was allowed to stand for 24 hours, it was filtered and a toluene soluble component and a toluene insoluble component were separated. Toluene was distilled off from the soluble component. After the resulting synthetic mixture was dissolved in chloroform, it was separated and purified by recycle type GPC to produce iPP-b-PEO:Rf ($M_n$: 1800, $M_w/M_n$: 1.15).

Evaluation for Amphiphilic Substance

The triblock copolymer comprising isotactic oligopropylene and oligo(ethyleneoxide) (iPP-b-PEO, $M_n$:1.5×10$^3$, $M_w/M_n$:1.18) formed a gigantic molecular aggregate in an aqueous dispersion system. The particle size measured by DLS tended to increase as the portion of the EO segment increased.

Triblock Copolymer 2 (iPP-b-PEO-Rf)

Esterification between iPP-b-PEO mentioned above and $C_8F_{17}$COOH produced a triblock copolymer 2 (iPP-b-PEO-Rf) wherein a perfluoroalkyl group had been esterified to the terminus of iPP-b-PEO.

Figure 24:
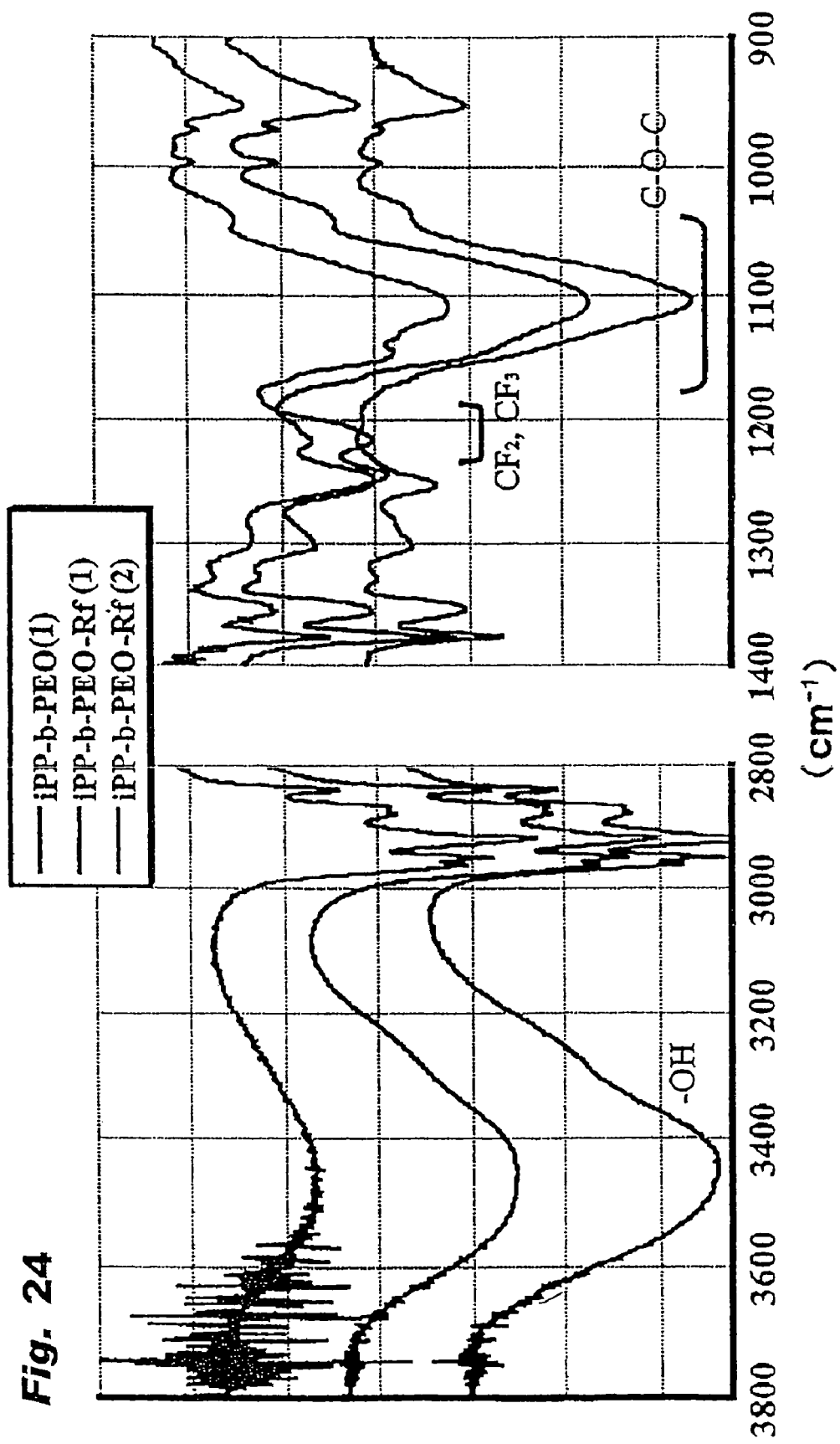
FIG. 24 shows IR spectra of samples measured in Example 4-6.

The IR spectrum of the obtained iPP-b-PEO-Rf displayed a marked decrease in the absorption due to its terminal hydroxyl group (around 3400 cm$^{-1}$), and displayed appearance of the absorption due to carbonyl (around 1800 cm$^{-1}$) and the absorption due to a fluoro group (around 1200 cm$^{-1}$). FIG. 24 shows the IR spectrum of the triblock copolymer 2 (iPP-b-PEO-Rf).

Figure 25:
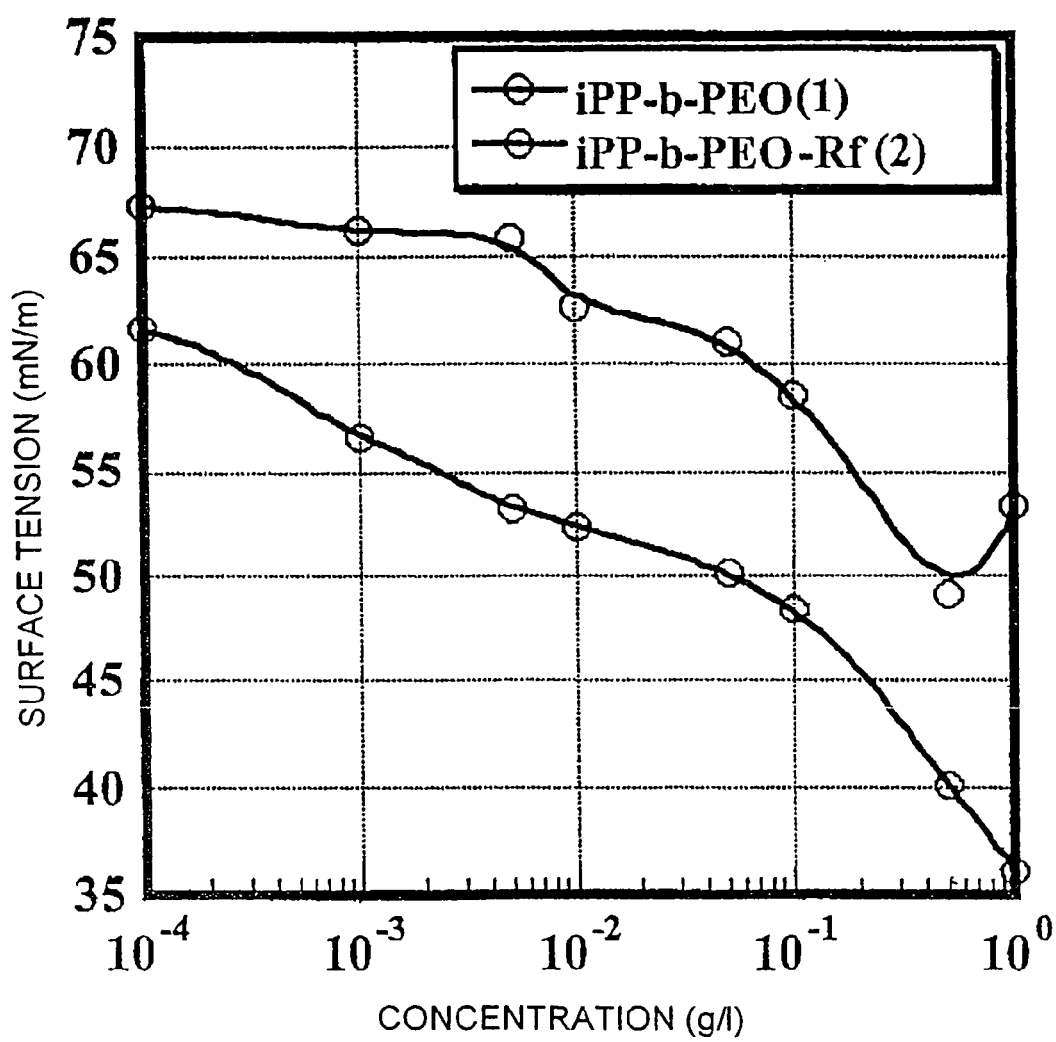
FIG. 25 shows curves representing surface tension/copolymer concentration for samples measured in Example 4-6.

An increase in the molecular weight was also observed in GPC. This could confirm the formation of the triblock copolymer 2 (iPP-b-PEO-Rf) through the esterification. iPP-b-PEO-Rf was well dispersed in water similarly to iPP-b-PEO and maintained its status for a long period. As FIG. 25 shows, the surface tension of iPP-b-PEO-Rf markedly decreased as compared to iPP-b-PEO in this system.

Example 4-7

Telechelic Oligomer with Terminal Anthracene (iPPv-AT)

Synthesis of iPPv-AT

To a THF dispersion of iPPv-OH/triethylamine as prepared in Example 2-4 was added dropwise a THF dispersion of anthronic acid chloride at room temperature under a nitrogen atmosphere, and reaction was further sufficiently allowed to proceed for 2 hours. Subsequently, THF was distilled off from the reaction solution and dissolution was effected at reflux by addition of xylene. Filtration while hot and dropping into methanol caused precipitation and then recovery by filtration. The yield of the precipitate was about 90 weight %. The $^1$H-NMR spectrum of the resulting precipitate displayed the complete disappearance of the peak belonging to the methylene protons found in the spectrum of iPPv-OH and displayed the clear appearance of signals belonging to the respective protons of the anthronic acid ester structure instead. This, therefore, confirmed that the precipitate was iPPv-AT.

Figure 26:
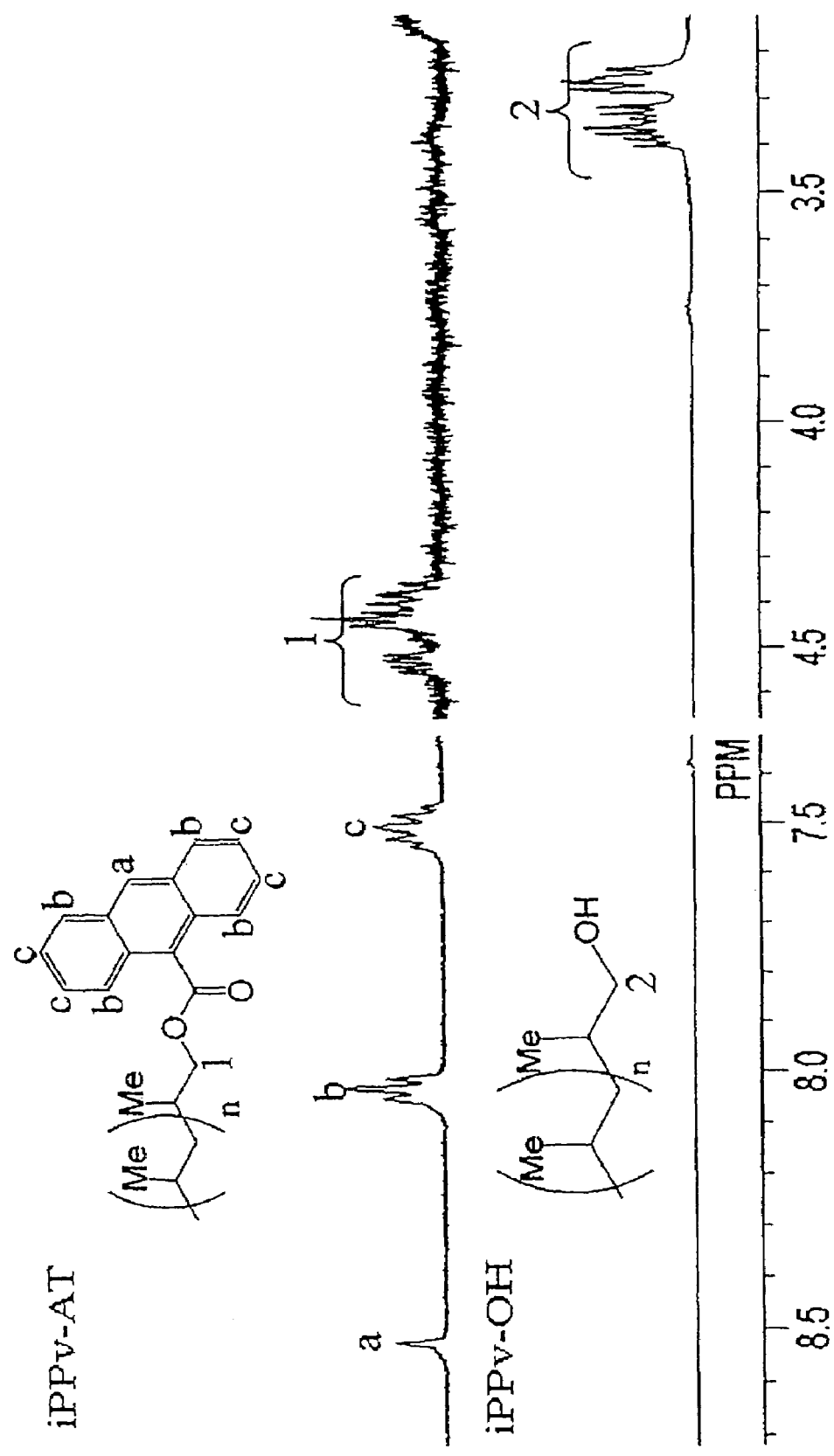
FIG. 26 shows $^1$H-NMR spectra of a telechelic propylene oligomer synthesized in Example 4-7 and a propylene oligomer containing hydroxyl groups at both ends thereof used in the synthesis of the foregoing.

FIG. 26 shows the $^1$H-NMR spectra of iPPv-AR and iPPv-OH.

Photopolymerization of iPPv-AT

A solution of 0,2 g iPPv-AT dissolved in 10 ml of THF was irradiated with light having a wavelength of 300 nm or greater wherein light of less than 300 nm had been cut with a filter of naphthalene/hexane solution, by using a high pressure mercury lamp, which allowed iPPv-AT to polymerize.

The reaction solution showed white turbidness with the lapse of time but it turned clear by addition of more THF.

Figure 27:
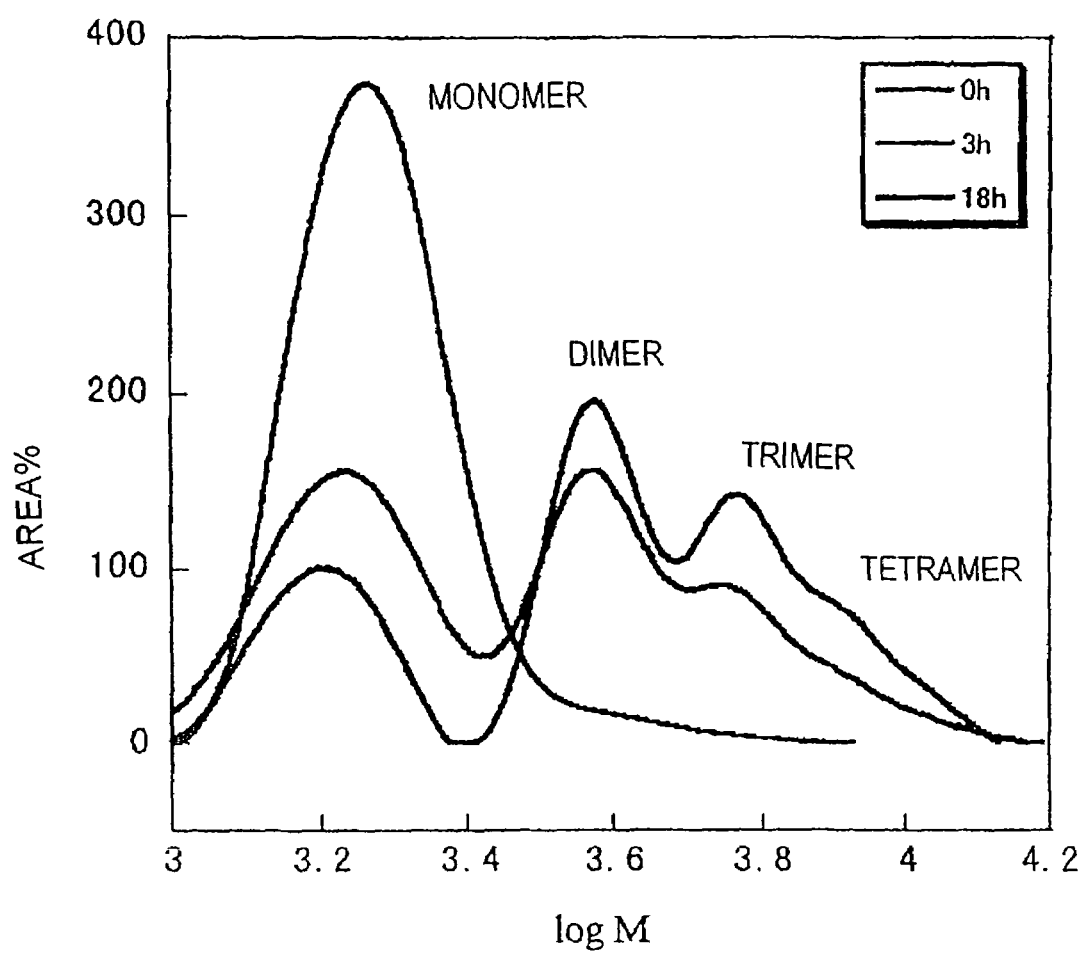
FIG. 27 shows GPC curves of the telechelic propylene oligomeric polymers obtained in Example 4-8.

FIG. 27 shows GPC curves of the reaction mixture. As is apparent from FIG. 27, the peak of monomer lowers as time has elapsed, and the peaks showing the generation of dimer, trimer and tetramer appear. The rate of polymerization was calculated from the area ratio 18 hours after photoirradiation, which was 86%.

Photodissociation of iPPv-AT Polymer

A solution of iPPv-AT polymer obtained after the lapse of photopolymerization time above was irradiated with light having a wavelength of 300 nm or greater wherein light of less than 300 nm had been cut with an optical filter, by using a high pressure mercury lamp, which allowed the polymer to be dissociated.

The GPC curve of this solution showed only the peak of monomer.

Example 4-8

Telechelic Oligomer with Terminal Anthracene (sPPv-AT)

Synthesis of sPPv-AT

To a THF dispersion of sPPv-OH/triethylamine as prepared in Example 2-5 was added dropwise a THF dispersion of anthronic acid chloride at room temperature under a nitrogen atmosphere, and reaction was further sufficiently allowed to proceed for 2 hours. Subsequently, THF was distilled off from the reaction solution and dissolution was effected at reflux by addition of xylene. Filtration while hot and dropping into methanol caused precipitation and then recovery by filtration. The yield of the precipitate was about 90 weight %. The $^1$H-NMR spectrum of the resulting precipitate displayed the complete disappearance of the peak belonging to the methylene protons found in the spectrum of sPPv-OH and displayed the clear appearance of signals belonging to the respective protons of the anthronic acid ester structure instead. This, therefore, confirmed that the precipitate was sPPv-AT.

Photopolymerization of sPPv-AT

A solution of 0,2 g sPPv-AT dissolved in 10 ml of THF was irradiated with light having a wavelength of 300 nm or greater wherein light of less than 300 nm had been cut with a filter of naphthalene/hexane solution, by using a high pressure mercury lamp, which allowed sPPv-AT to polymerize.

The reaction solution showed white turbidness with the lapse of time but it turned clear by addition of more THF.

Figure 28:
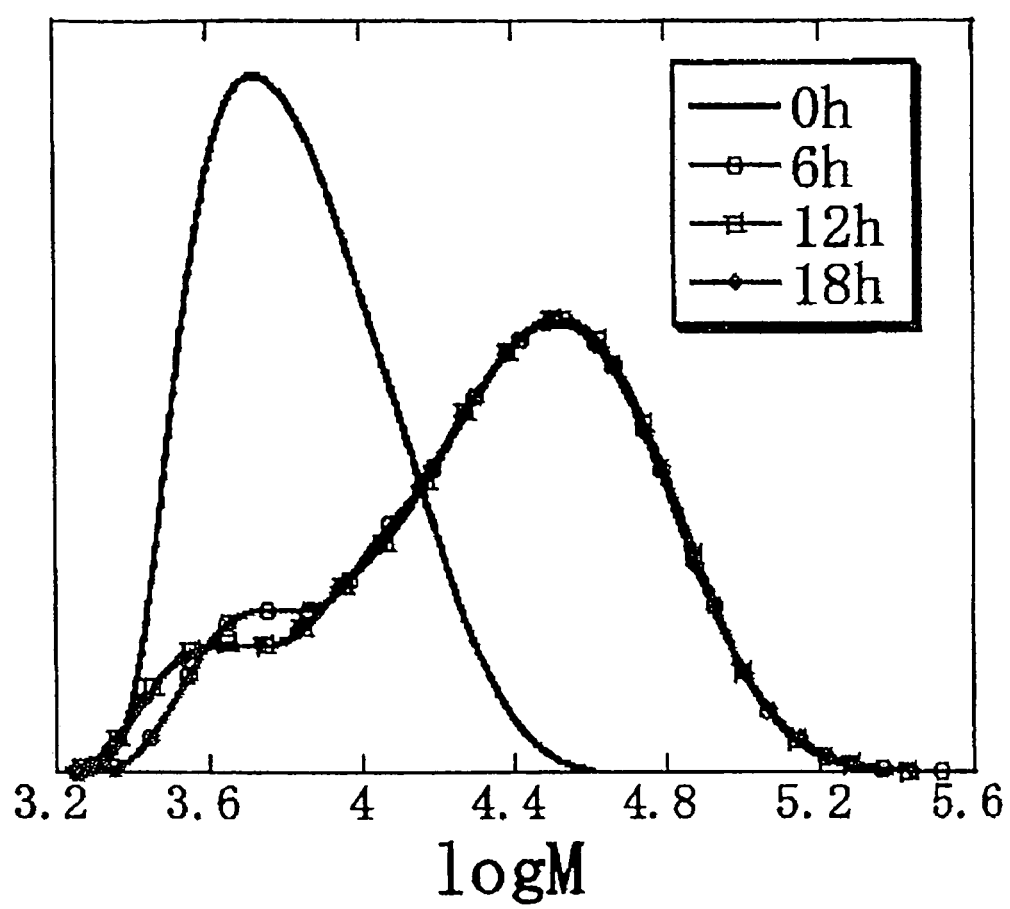
FIG. 28 shows GPC curves of the reaction mixture obtained in Example 4-8.

FIG. 28 shows GPC curves of the reaction mixture. The molecular weight gradually increased as the reaction time increased. The molecular weight distribution of sPPv-AT no longer varied with irradiation for 12 hours or more and successive photopolymerization terminated. When the peak tops and the number-average molecular weights obtained at 0 hour and 12 hours were compared, the comparison showed about 6-fold in the peak top and about 3-fold in the number-average molecular weight. This revealed that the anthracene groups at both ends of sPPv-AT underwent successive polymerization by light.

Thermal Dissociation of sPPv-AT Polymer

Figure 29:
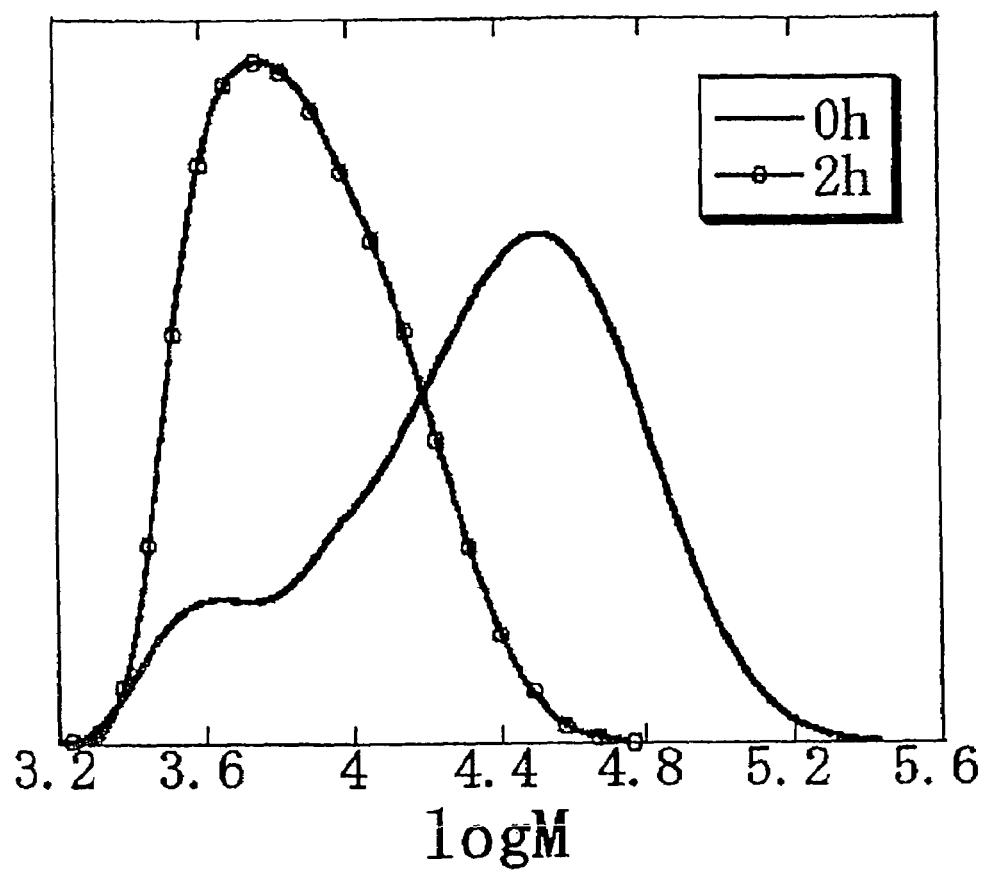
FIG. 29 shows GPC curves of the reaction mixture obtained in Example 4-8.

The polymer obtained by successive photopolymerization of sPPv-AT for 18 hours was collected into a polymerization tube, sealed under nitrogen and heated at 140° C. for 2 hours. FIG. 29 shows GPC curves of the thus obtained polymer. The graph indicates that the polymer from successive photopolymerization has been completely dissociated into sPPv-AT by heat.

Example 4-9

Oligopropylene/Oligopropylene Block Copolymer (iPP-b-iPP)

A mixture of the oligopropylene containing —OH groups at both ends thereof as prepared in Example 2-1 (iPP-OH)/ the oligopropylene with maleic acid modifications at both ends thereof as prepared in Example 3-2 (iPP-MA)/toluene-sulfonic acid (catalyst) in a molar ratio of 1/1/0.5 was retained for reaction at stirring in toluene as solvent at 120° C. for 6, 24 and 48 hours. After the reaction was complete, the reaction solution was dropped into methanol. The resulting precipitate was collected by suction filtration and dried at reduced pressure.

The IR spectra of the resulting products confirmed an ester linkage; and their $^{13}$C-NMR spectra also confirmed that the products were the objective block copolymer iPP-b-iPP.

Figure 30:
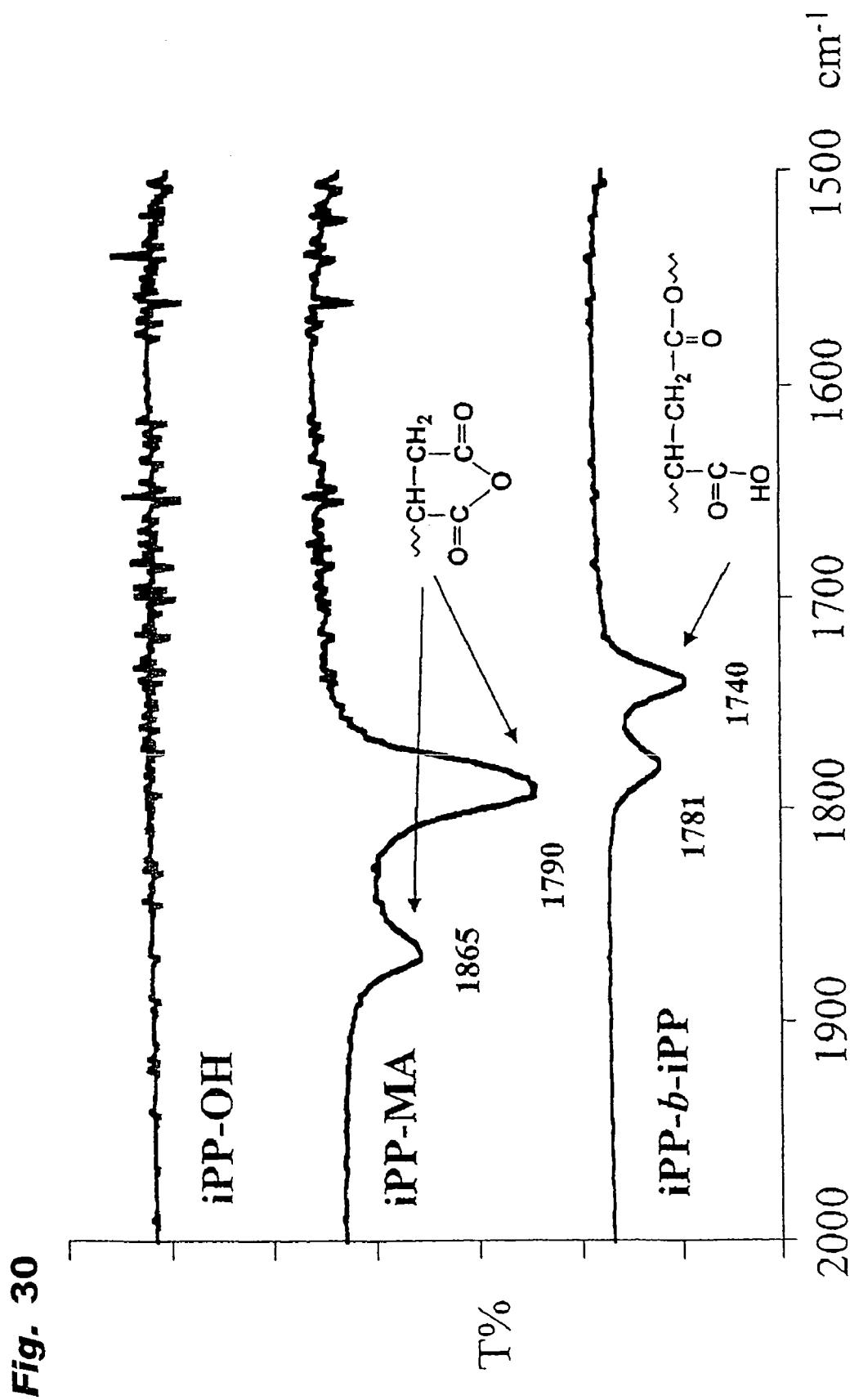
FIG. 30 shows an IR spectrum of iPP-b-iPP synthesized in Example 4-9.
Figure 31:
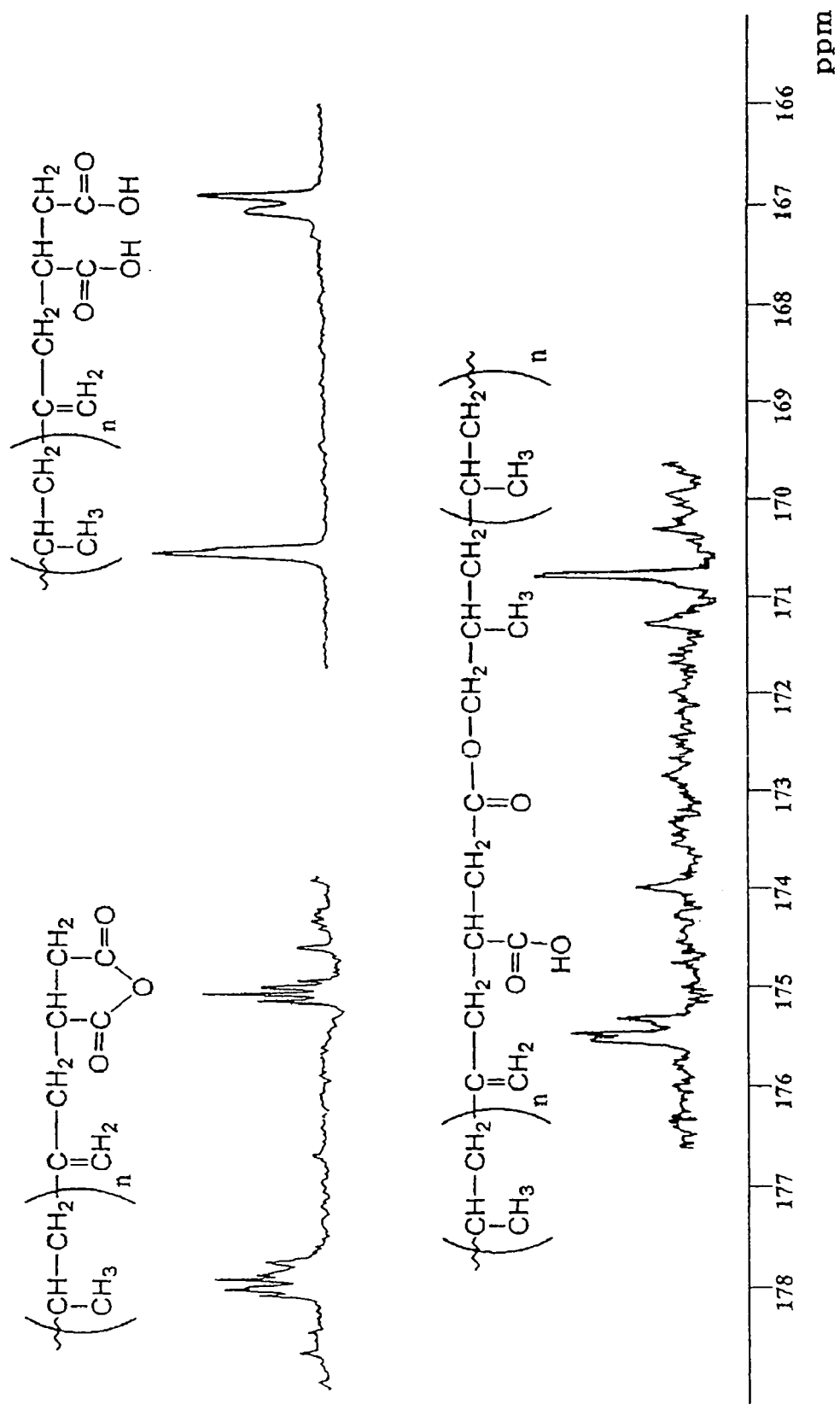
FIG. 31 shows a $^{13}$C-NMR spectrum of the iPP-b-iPP synthesized in Example 4-9.

FIG. 30 shows IR spectra of iPP-OH, iPP-MA and iPP-b-iPP and FIG. 31 shows NMR spectra of iPP-MA and iPP-b-iPP.

Figure 32:
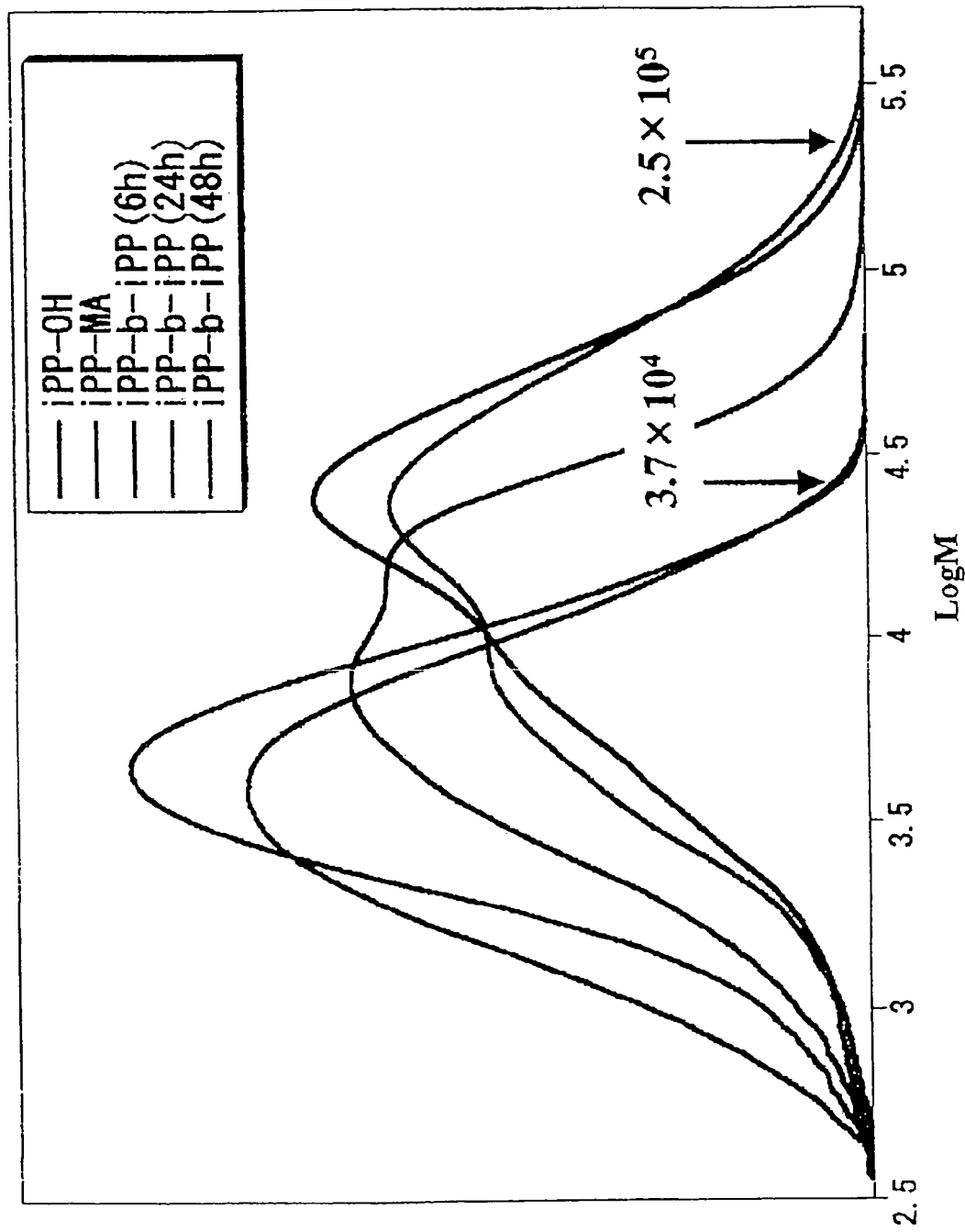
FIG. 32 shows GPC curves of the iPP-b-iPP synthesized in Example 4-9.

FIG. 32 shows GPC curves of iPP-OH, iPP-MA and iPP-b-iPP with differing reaction times.

Example 4-10

Oligopropylene/Dimethylsiloxane Multiblock Copolymer (iPP-PDMS)

Synthesis of Multiblock Copolymer (iPP-PDMS)

iPP-MA synthesized in Example 3-3 and diaminoalkylpolydimethylsiloxane (PDMS) having a number-average molecular weight of 5,000 obtained by treating commercial diaminoalkylpolydimethylsiloxane with methanol to remove low molecular weight components were adjusted in a molar ratio of 1/1 and retained at stirring in decaline as solvent at 60° C. for 10 minutes under a nitrogen atmosphere. They were then retained at stirring at 190° C. for 0.5, 6, 24 and 48 hours to effect imide modification. After the reaction was complete, acetone was poured into the reaction solution. The precipitate was filtered and dried at reduced pressure to yield the product.

The $^1$H-NMR spectrum confirmed that the product was the multiblock copolymer (iPP-PDMS). The signal intensities of iPP unit/PDMS unit were used to calculate the molar ratio of iPP unit/PDMS unit, which was 44.6/55.4 in the 24-hour reaction and 40.3/59.7 in the 48-hour reaction.

Figure 33:
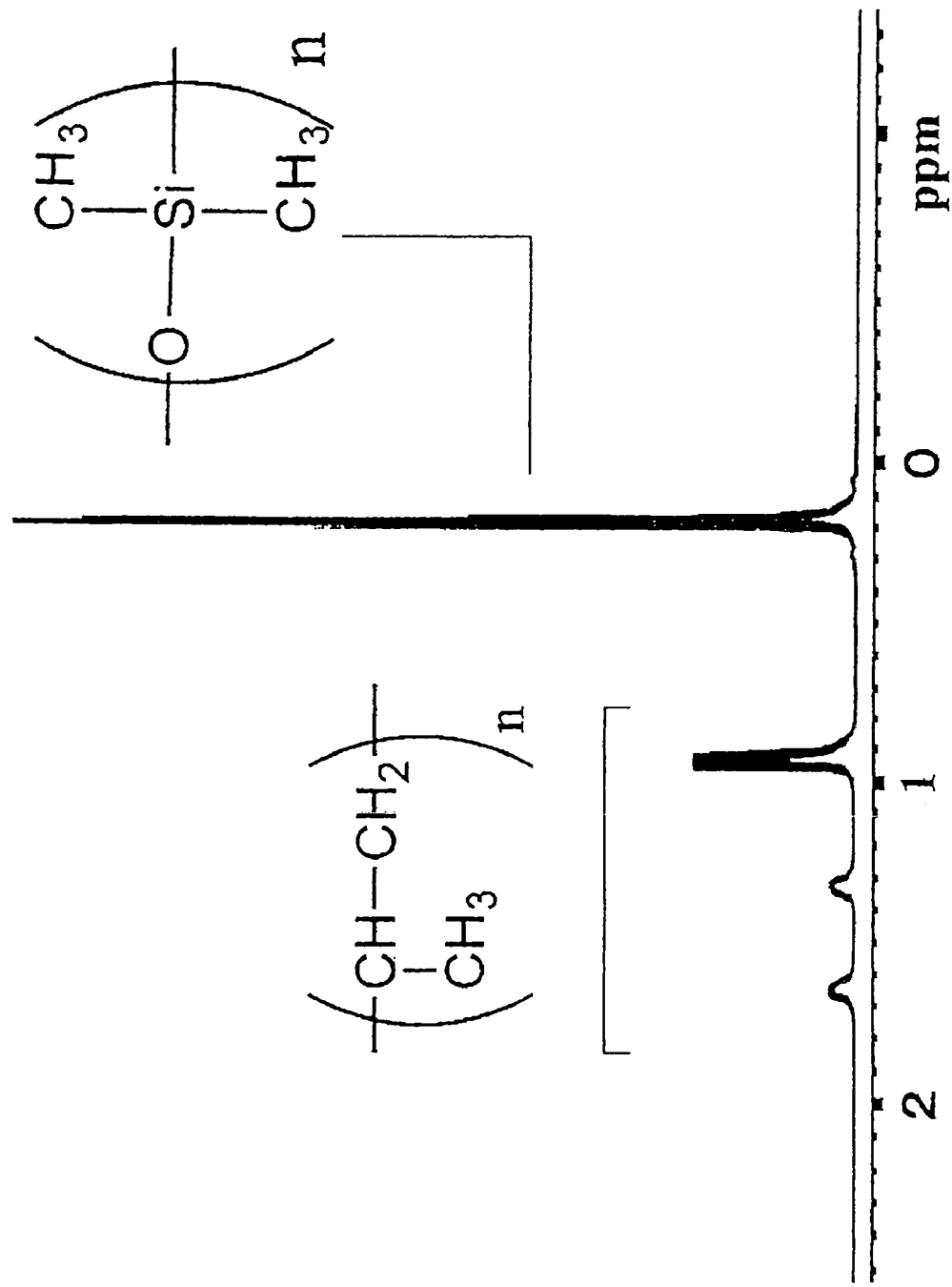
FIG. 33 shows a $^1$H-NMR spectrum of iPP-PDMS obtained in Example 4-10.

FIG. 33 shows the $^1$H-NMR spectrum of iPP-PDMS.

Figure 34:
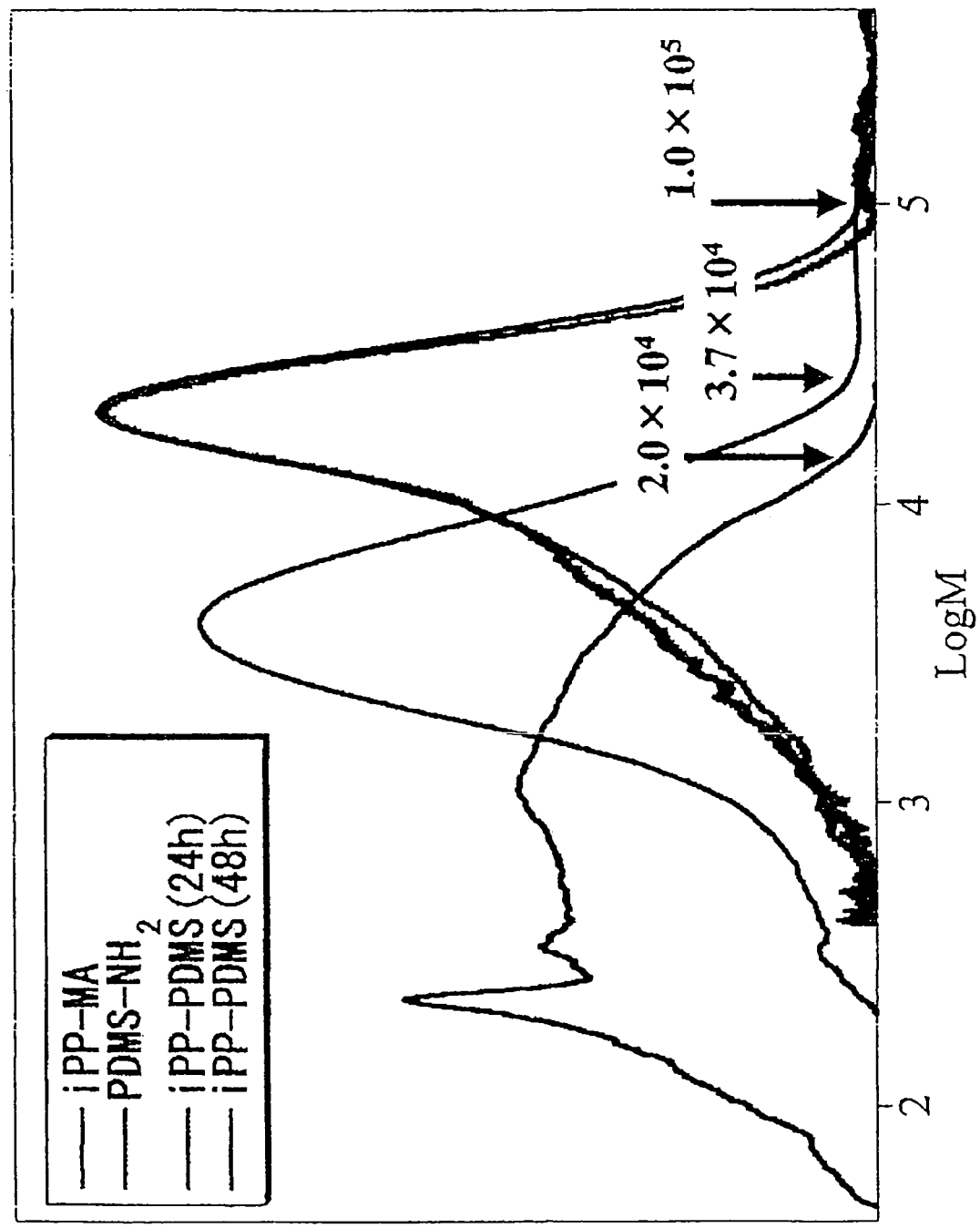
FIG. 34 shows GPC curves of the iPP-PDMS obtained in Example 4-10.

GPC curves of iPP-PDMS produced in the 24-hour and 48-hour reactions were shown to be unimodal; the number-average molecular weight was shown to be about 8,000; and the polydispersity ($M_w/M_n$) was shown to be 1.87. FIG. 34 shows GPC curves of iPP-PDMS, iPP-MA and PDMS on top of one another.

In the DSC curve a crystal melting endotherm peak (melting point, Tm) is observed at 129° C. and the enthalpy of melting confirms that iPP-PDMS has a microphase separation structure.

Figure 35:
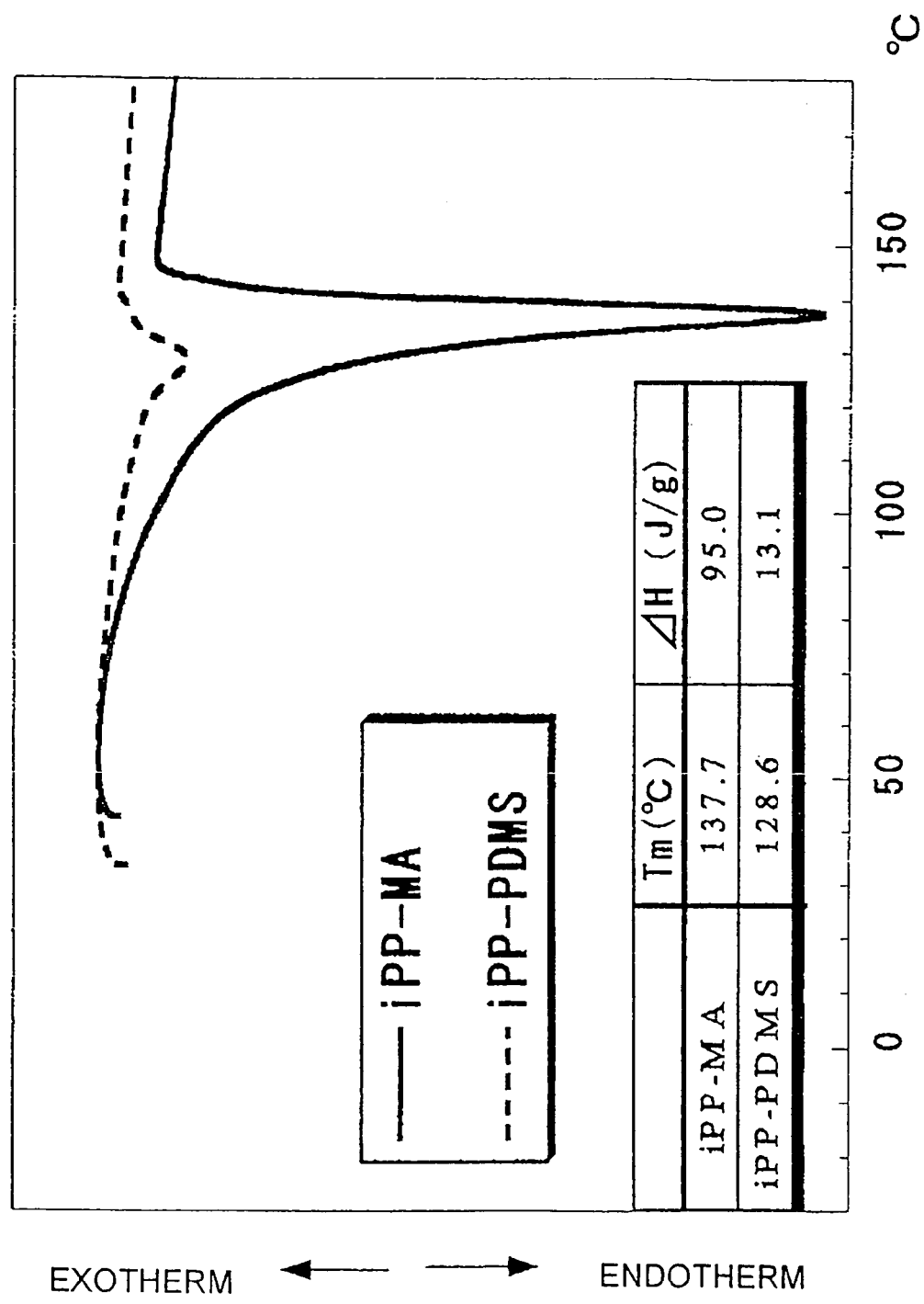
FIG. 35 shows a DSC curve of the iPP-PDMS obtained in Example 4-10.

FIG. 35 shows the DSC curves of iPP-PDMS and iPP-MA.

INDUSTRIAL APPLICABILITY

The functional substances of this invention include an amphiphilic functional substance with lipophilicity, affinity for supercritical $CO_2$, and if necessary hydrophilicity comprising an oligoolefin chain and a perfluoroalkyl group(s) at a single end thereof or at both ends thereof with or without the intervention of a poly(oxyalkylene) chain, a photopolymerizable functional substance comprising an oligoolefin chain and a reversible photopolymerization/dissociation group(s) at a single end thereof or at both ends thereof, a functional substance comprising a photo- and thermodissociable polymer obtained by photopolymerization of the photopolymerizable functional substance, a hydrolyzable functional substance comprising a polymer obtained by chain-elongating plural oligoolefin chains through ester linkages and a functional substance capable of forming a microphase separation structure comprising a polymaleimide comprising an oligoolefin chain and a polydimethylsiloxane chain which are bonded to form an imide.

The amphiphilic functional substances not only enable supercritical $CO_2$ to be utilized as reaction medium, but also can be widely used as different surfactants in conventional fields.

The functional substances containing a reversible photopolymerization/dissociation group, the photo- and/or thermodissociable functional substances comprising a polymer of the foregoing and hydrolysable functional substances not only can be utilized as recycle polymers, but also can be utilized as molded products having the characteristics similar to those of the starting polyolefins.

The functional substances capable of forming microphase separation structures can be utilized as functional products such as electronic materials.

These groups of functional substances are characterized that they contain segments comprising oligoolefin chains. This segment is derived from an oligoolefin with a terminal functional group(s): the terminal double bond of an oligoolefin containing a vinyl group at an end thereof obtainable from the highly controlled thermal decomposition of a polyolefin is modified to introduce a functional group. Consequently, the groups of functional substances are all provided with the properties reflecting the characteristics of the starting polyolefins.

The oligo(1-butene) containing a terminal vinylidene group according to this invention can be utilized as the synthetic material for the functional substances of this invention.

The polyolefins that are the starting materials do not need to be fresh polyolefins, and the waste pellets that present environmental problems may be utilized, for example. This invention provides novel utilities of polyolefins and those mentioned above are merely a representation of a portion of the utilities. The development of more of the functional substances can be expected.

What is claimed is:

1. Oligo(1-butene), which is a thermal decomposition product of poly(1-butene), having an average terminal vinylidene group number per molecule ($f_{TVD}$ value) of from 1.53 to 1.75, a number-average molecular weight ($M_n$) of from 1,000 to 5,000, and polydispersity ($M_w/M_n$) of 2.5 or less and comprising oligo(1-butene) containing vinylidene groups at both ends thereof and oligo(1-butene) containing a vinylidene group at a single end thereof, said oligo(1-butene) represented by the following formula (1a):

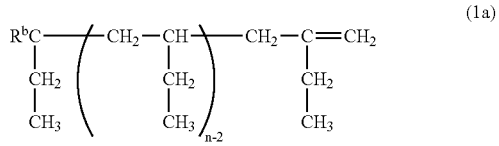

(1a)

wherein $R^b$ represents $H_2$— or $H_2C$= and n is an integer of from 15 to 100.

* * * * *